United States Patent
Mainali et al.

(10) Patent No.: US 9,042,645 B2
(45) Date of Patent: May 26, 2015

(54) FEATURE DETECTION IN NUMERIC DATA

(71) Applicants: IMEC, Leuven (BE); Katholieke Universiteit Leuven, K.U. LEUVEN R&D, Leuven (BE)

(72) Inventors: Pradip Mainali, Leuven (BE); Gauthier LaFruit, St. Lambrechts Woluwe (BE)

(73) Assignees: IMEC, Leuven (BE); Katholieke Universiteit Leuven, K.U. Leuven R&D, Leuven (BE)

( * ) Notice: Subject to any disclaimer, the term of this patent is extended or adjusted under 35 U.S.C. 154(b) by 78 days.

(21) Appl. No.: 13/896,111

(22) Filed: May 16, 2013

(65) Prior Publication Data

US 2013/0308860 A1   Nov. 21, 2013

Related U.S. Application Data

(60) Provisional application No. 61/647,769, filed on May 16, 2012.

(51) Int. Cl.
| | |
|---|---|
| *G06K 9/00* | (2006.01) |
| *G06K 9/46* | (2006.01) |
| *G06K 9/62* | (2006.01) |

(52) U.S. Cl.
CPC .......... *G06K 9/4671* (2013.01); *G06K 9/4619* (2013.01); *G06K 9/6211* (2013.01)

(58) Field of Classification Search
CPC . G06K 9/4623; G06K 9/4628; G06K 9/6267; G06N 3/049; Y10S 707/99931; Y10S 707/99933; Y10S 707/99934; Y10S 707/99948; Y10S 715/968; G06F 17/246; G06F 17/30333; G06F 17/30572; G06F 17/30592; G06Q 30/22
See application file for complete search history.

(56) References Cited

U.S. PATENT DOCUMENTS 8,160,354 B2 * 4/2012 Paquier ................... 382/155

* cited by examiner

*Primary Examiner* — Jose Couso
(74) *Attorney, Agent, or Firm* — McDonnell Boehnen Hulbert & Berghoff LLP

(57) ABSTRACT

A method for detecting features in digital numeric data comprises obtaining digital numeric data comprising values corresponding to a plurality of sampling points over a domain space having at least one dimension, computing a plurality of scale-space data comprising filtering said digital numeric data using a filter bank, determining a plurality of feature regions each corresponding to a local extremum in scale and location of the scale-space data; and determining a feature region descriptor for each of said plurality of feature regions. The filter bank is a Cosine Modulated Gaussian filter bank in which the standard deviation parameter of the Gaussian equals $$\frac{1}{\pi}\sqrt{\frac{\ln(2)}{2}\frac{2^b+1}{2^b-1}}$$

multiplied by the cosine wavelength, in which b is in the range of 0.75 to 1.25, or said filter bank is an $N^{th}$-order Gaussian Derivative filter bank with N being in the range of 5 to 20.

16 Claims, 25 Drawing Sheets

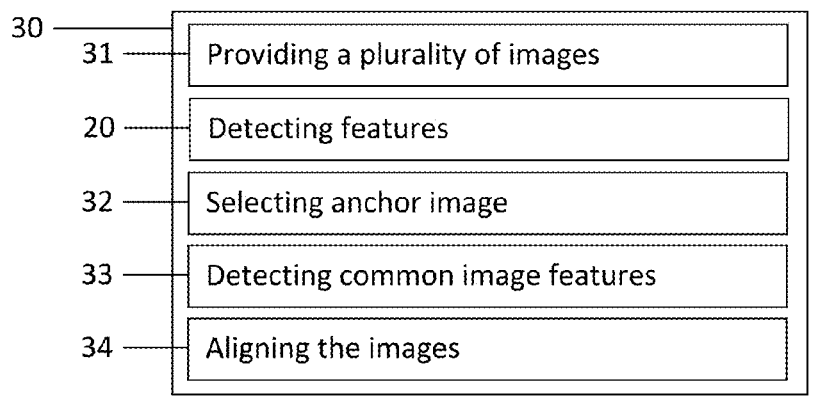
FIG. 3
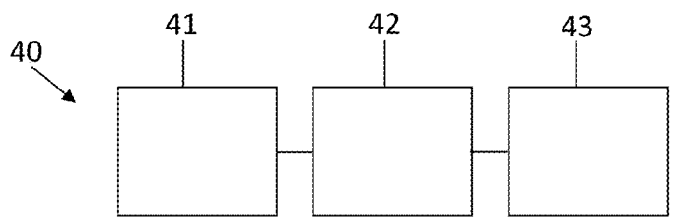
FIG. 4
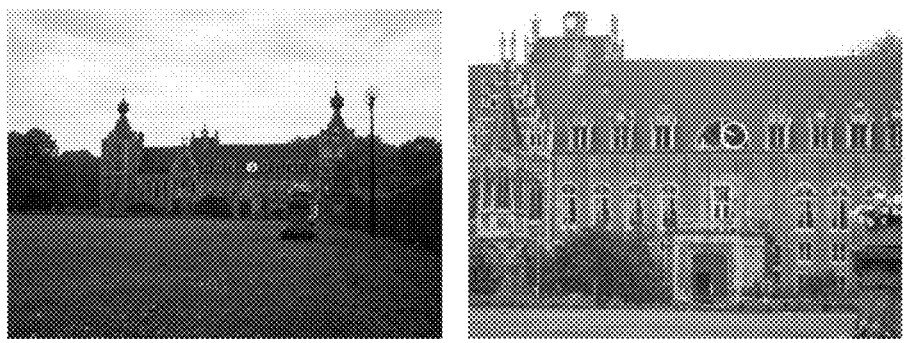
FIG. 5          FIG. 6

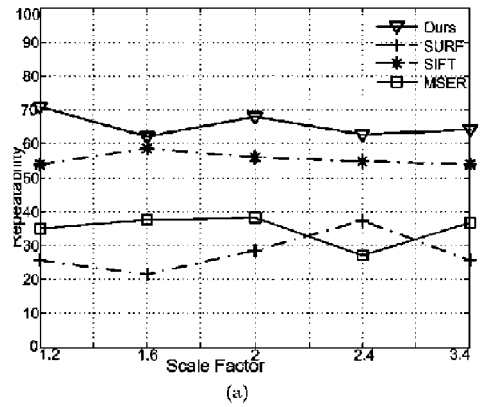
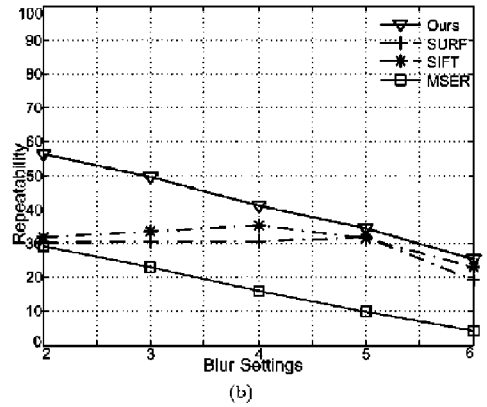
FIG. 30  FIG. 31
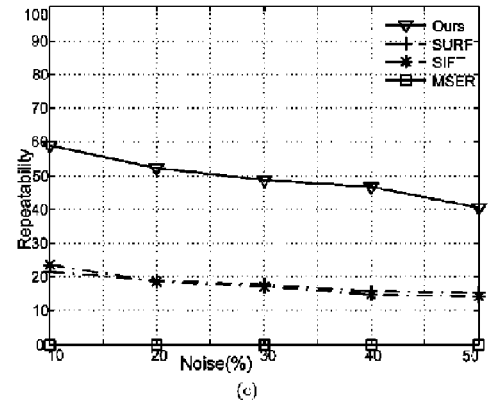
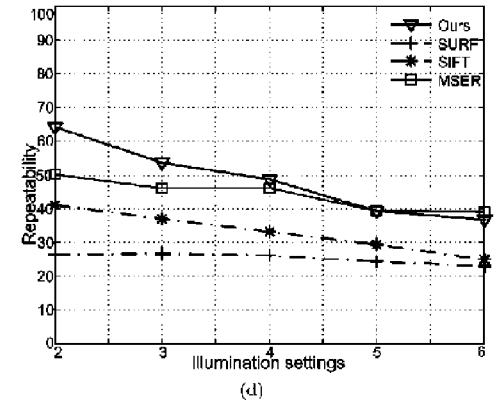
FIG. 32  FIG. 33

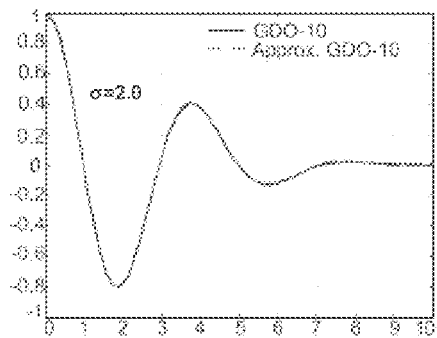
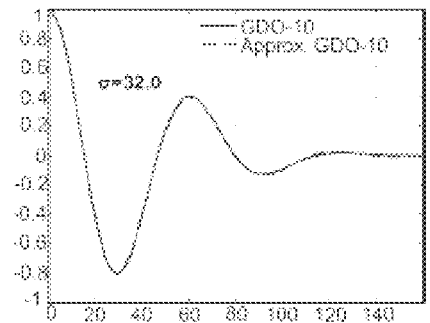
FIG. 47　　　　　　　　FIG. 48
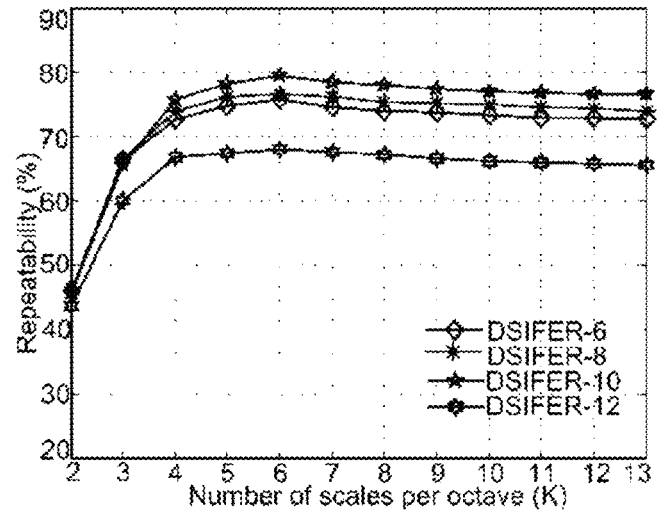
FIG. 49
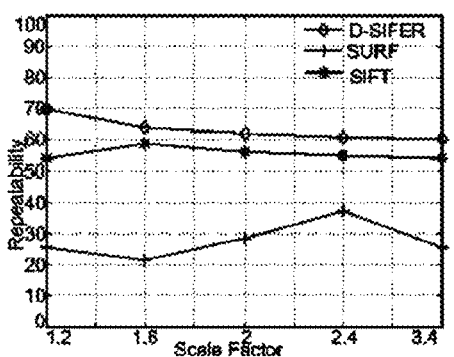
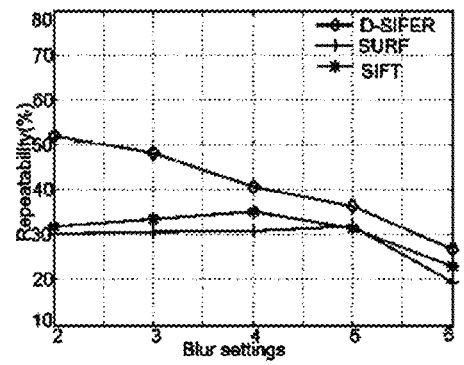
FIG. 50　　　　　　　　FIG. 51

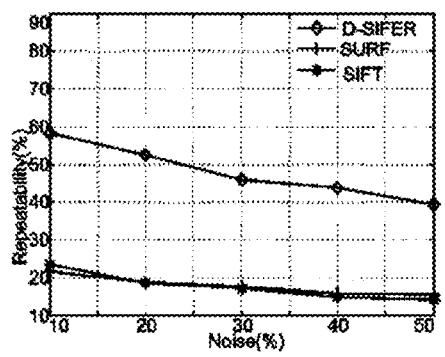
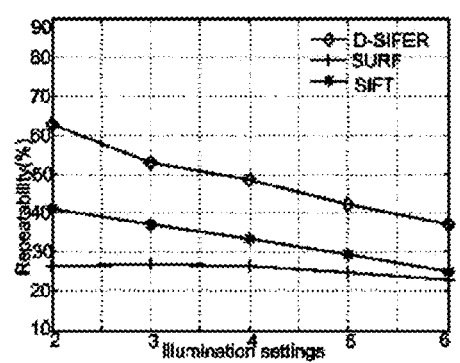
FIG. 52  FIG. 53
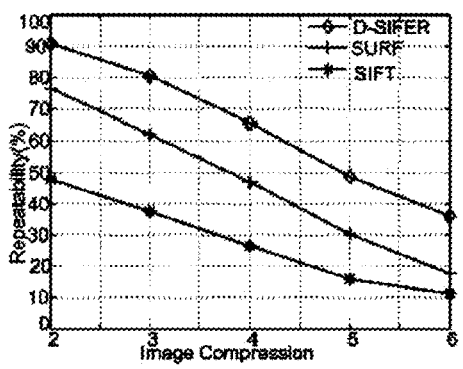
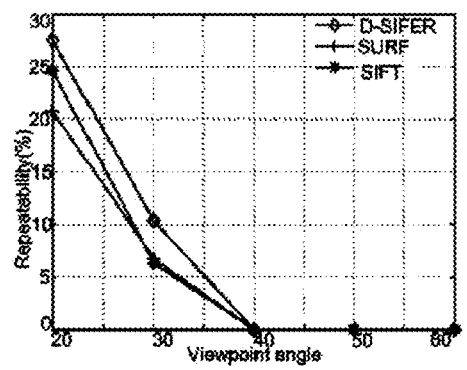
FIG. 54  FIG. 55

FEATURE DETECTION IN NUMERIC DATA

CROSS-REFERENCE TO RELATED APPLICATIONS

This application claims priority to U.S. Provisional Application No. 61/647,769 filed in the United States Patent and Trademark Office on May 16, 2012, the entire contents of which are herein incorporated by reference.

FIELD

The invention relates to the field of numeric data processing. More specifically it relates to a method for feature detection in digital numeric data, e.g. in uniformly sampled temporal and/or spatial data such as time series or digital images.

BACKGROUND

Feature point detection and matching of detected features are a preliminary stage in numeric data processing, for example in image processing and computer vision applications such as image registration, panorama creation, 3D reconstruction, object recognition, camera calibration or robot navigation. Corners and blobs are typical local image features which can be used for this purpose.

Several feature detection algorithms are known in the art. Much effort has been spent in making algorithms robust to various image artifacts, such as illumination variation, noise, blur, rotation, scale, affine transformation etc., and to improve the execution time performance. For example, most feature detector filters known in the art, such as Laplacian-of-Gaussian, Difference-of-Gaussian, Hessian or Harris' corner-less function, use first or second order Gaussian derivative filters, thereby emphasizing on planar rotational invariance.

However, detection algorithms known in the art have their disadvantages. For instance, some known detection algorithms do not detect the scale information of the image features. Generally, they are fast in computation when compared to multi-scale based methods, but are slower or have similar speed compared to direct-intensity based methods. Although they are generally invariant to image artifacts such as illumination variation, noise or rotation, they are unfortunately not invariant to scale changes.

Other state of the art detection algorithms operate directly on the intensities in the image patch to detect and localize the feature points. Since no image filtering is applied, such algorithms are generally fast to compute compared to other categories. Some drawbacks of these algorithms are that typically fewer feature points are detected compared to other methods and that such algorithms may be less reliable in the presence of image noise and less invariant to scale.

Some state of the art detection algorithms filter the image using a filter bank with different filters over different scales. Such algorithms may apply, for example, multi-scale filter banks. However, the use of different filters to obtain multi-scale filtering typically implies an increased computation time.

Hence, there exists a need for a method for efficiently detecting features that is strongly resistant to variation of scale, resolution, zoom, blur, motion-blur, limited viewpoint rotation, illumination, image compression and noise.

As state of the art detection algorithms may not perform optimally in reliably detecting features under realistic conditions, e.g. under scale variations and blurring, such algorithms may also not be optimal for reliably aligning images based on detected corresponding features in images to be co-registered.

SUMMARY

It is an object of embodiments of the present invention to provide good and efficient feature detection in numeric data, e.g. in uniformly sampled temporal and/or spatial data such as time series or digital images.

It is an advantage of methods according to embodiments of the present invention that scale invariant features may be detected by using a Cosine Modulated Gaussian (CM-Gaussian) filter with a balanced time-frequency atom. This balanced time-frequency atom nature with minimal spread in time and frequency advantageously leads to a good quality of feature detection, both on sharp and distributed features like corners and blobs. Features can therefore be reliably detected, irrespective of camera parameter variations and image artifacts. Thus, the scale-space filters denoted as CM-Gaussian filters according to embodiments of the present invention may be particularly suitable for scale-invariant feature detection. The detected local image features may be described with location, orientation, scale or size, and shape information by their eigendistributions. The approach to feature detection according to embodiments of the present invention may also be denoted by the acronym "SIFER". In such approach the image features of different granularities may be sieved with minimum error and such approach may be strongly resistant to image artifacts.

In embodiments according to the present invention, the CM-Gaussian filter may be approximated with a sum of exponentials, as a single fixed-length filter over all scales, with equal approximation error over all the scales, providing constant time, and low-cost image filtering implementations. The approximation error of the corresponding Digital Signal Processing may be below the noise threshold and can be scalable with the filter order, providing many quality-complexity trade-off working points.

The method to extract scale-invariant features from an image can be used for aligning a plurality of images whereby features in a plurality of images are detected and based on the matching of the features, the images can be aligned. By using the method to extract scale-invariant features of an image, the alignment of images can be performed in a very efficient and precise way.

Advantages of embodiments of the present invention, e.g. of a herein presented new method of feature detection, are summarized hereinafter.

It is an advantage of embodiments according to the present invention that a balanced scale-space filter is provided. For example, the time-frequency atom of a CM-Gaussian filter according to embodiments is shown in comparison to a classical Gaussian Second Derivative (GSD) filter. The majority of alternative methods known in the art use such GSD filter. It will be shown that the time-frequency atom of the CM Gaussian filter is balanced and has minimal spread in space ($\sigma_t$) and scale ($\sigma_\lambda$), reaching the lower bound of Heisenberg's uncertainty $\sigma_t \sigma_\lambda = 0.5$ with $\sigma_t = \sigma_\lambda$. On the other hand, the GSD filter has an unbalanced time-frequency atom with $\sigma_t < \sigma_\lambda$. The feature location detection accuracy is reflected in the space or time behavior and the scale detection precision corresponds to the scale or frequency behavior of the filter. The balanced and minimal spread time-frequency atom has the benefit of minimizing the uncertainty/error of the feature scale detection and feature localization jointly, which results in precise feature localization and feature scale detection.

It is an advantage of embodiments according to the present invention that feature localization and feature scale detection is provided with high precision. The scale-invariant feature detection is a matched system, where the feature is detected when the scale of the filter in the filterbank is matched with the intrinsic scale of the image feature. For high precision feature localization and scale detection, theoretically individual highly selective filters with the compact support in space may be needed, for each discrete scale of the image feature in each octave of the filterbank to build a perfectly matched system. However, such highly selective practical filters have large size of their atom in space producing erroneous feature localization. With the balanced time-frequency atom we find the optimal number of scales per octave (K) filtering in the filterbank to build an optimally matched filterbank system or scale-space balanced filterbank system. The size of an atom in scale determines the consecutive scales that can be distinguished by the filter and hence determines the value of K in each octave. With our optimal filter-bank system, the quality of the feature detection over the noise margin can be improved by a factor of 3.

It is an advantage of embodiments according to the present invention that methods according to such embodiments may be perfectly digitally implementable. The balancing of the time-frequency atom of the CM-Gaussian filter may result in a spread in space with a sufficiently large spatial extent. For digital implementation, the spatial extent of the filter should be sufficiently large to discretize the filter with sufficiently accuracy. Hence, we can discretize the CM-Gaussian filter with sufficient accuracy even for those σ's detecting small sized features.

It is an advantage of embodiments according to the present invention that constant-time filtering is provided. The approximation of the CM-Gaussian filter according to embodiments of the present invention can tackle the increased complexity due to its large atom size in space. Such approximation can result in a constant length filter which is independent of the scale of the filter. Only the filter coefficients change for the other scales of the filters.

It is an advantage of embodiments according to the present invention that a good accurate/scalable approximation is provided. The approximation can be performed in σ-independent space X with X=X/σ, which allows designing a single filter independent of the scales (σ). The approximation filter is a highly accurate fixed-length filter and allows filtering the image in constant time, regardless of the scale (σ). The approximation error is the same over all scales and can be sufficiently small ($1.3243 \times 10^{-4}$) to be negligible. Moreover, by changing the order of the approximation, the trade-off in quality and complexity is done without changing the feature detection algorithm framework. For example, by decreasing the order of the approximation, a low complexity algorithm can be built by sacrificing some quality.

It is an advantage of embodiments according to the present invention that many features can be extracted, for example, an algorithm according to embodiments may be designed to detect both blob and corner local feature types, as well as to extract the shape of the underlying features.

The above objective is accomplished by a method and/or device according to embodiments of the present invention.

The present invention relates to a method for detecting features in digital numeric data, said method comprising obtaining digital numeric data comprising values corresponding to a plurality of sampling points over a domain space having at least one dimension, computing a plurality of scale-space data, each of said plurality of scale-space data comprising data over said domain space at a corresponding scale in said domain space, in which the computing of the plurality of scale-space data comprises filtering said digital numeric data using a filter bank, determining a plurality of feature regions in said plurality of scale-space data, each feature region corresponding to a local extremum in scale and location of the scale-space data; and determining a feature region descriptor for each of said plurality of feature regions, wherein said filter bank is a Cosine Modulated Gaussian filter bank in which the standard deviation parameter of the Gaussian equals $$\frac{1}{\pi}\sqrt{\frac{\ln(2)}{2}\frac{2^b+1}{2^b-1}}$$

multiplied by the cosine wavelength, in which b is in the range of 0.75 to 1.25, or said filter bank is an Nth-order Gaussian Derivative filter bank with N being in the range of 5 to 20.

The filter bank may comprise a plurality of infinite impulse response filters, each infinite impulse response filter corresponding to a different scale parameter value for a common mathematical filter kernel having a controllable scale parameter, the common mathematical filter kernel being either:

$$e^{-\frac{x^2}{2\sigma^2}} \cdot \cos\left(\frac{2\pi x \cdot \hat{e}}{\lambda}\right),$$

in which $$\sigma = \frac{1}{\pi}\sqrt{\frac{\ln(2)}{2}\frac{2^b+1}{2^b-1}}\lambda$$

with b in the range of 0.75 to 1.25; or $$\frac{\partial^N}{\partial x^N}e^{-\frac{x^2}{2\sigma^2}},$$

in which N is in the range of 5 to 20.

The filter bank may be constructed by approximating said common mathematical filter kernel by a sum of exponentials.

Computing the plurality of scale-space data furthermore may comprise filtering said digital numeric data along a plurality of directions in said domain space, and for each scale aggregating the filtered digital numeric data over the plurality of directions in said domain space.

Aggregating the filtered digital numeric data may comprise summing corresponding data over the plurality of directions.

Determining the feature region descriptor may comprise computing a histogram of gradient orientations or sum of gradients.

Obtaining digital numeric data may comprise providing an image.

Computing the plurality of scale-space data may comprise creating a plurality of filtered images by filtering said image in a plurality of directions, such as for example horizontal and vertical, or for example some or all of horizontal, vertical, diagonal over any angle, using said Cosine Modulated Gaussian filter bank or said Nth-order Gaussian Derivative filter bank to compute a Cosine Modulated Gaussian response or Nth-order Gaussian Derivative response for each direction; and computing a Cosine Modulated Gaussian Summation or Nth-order Gaussian Derivative Summation response for each filtered image representing a scale.

Determining said feature regions may comprise extracting of each Cosine Modulated Gaussian Summation or Nth-order Gaussian Derivative Summation response a maximal/minimal point corresponding to a scale and location of a feature region.

The method furthermore may comprise performing edge suppression and shape detection on each of said feature regions, performing interpolation to fine-tune determined location and scale and assigning an orientation to each of said plurality of feature regions.

The present invention also relates to a method for aligning a plurality of images of a scene, said method comprising providing a plurality of images, detecting scale-invariant image features of each of said plurality of images using a method as described above, selecting an anchor image from said plurality of images, detecting common image features between said plurality of images and said anchor image and aligning said plurality of images based on said detected common image features.

Aligning said plurality of images may be executed by performing a scaling, rotation and translation on said plurality of images.

Selecting the anchor image from said plurality of images may comprise selecting an image from the plurality of images comprising a largest number of image features.

Selecting the anchor image from said plurality of images may comprise selecting an image from the plurality of image featuring the least optical errors.

The present invention also relates to a device for detecting features in digital numeric data, the device comprising an input means for obtaining digital numeric data comprising values corresponding to a plurality of sampling points over a domain space having at least one dimension, a processing means adapted for computing a plurality of scale-space data, each of said plurality of scale-space data comprising data over said domain space at a corresponding scale in said domain space, in which the computing of the plurality of scale-space data comprises filtering said digital numeric data using a filter bank, adapted for determining a plurality of feature regions in said plurality of scale-space data, each feature region corresponding to a local extremum in scale and location of the scale-space data; and adapted for determining a feature region descriptor for each of said plurality of feature regions and an output means for outputting said feature region descriptor for each of said plurality of feature regions, wherein the filter bank is a Cosine Modulated Gaussian filter bank in which the standard deviation parameter of the Gaussian equals $$\frac{1}{\pi}\sqrt{\frac{\ln(2)}{2}\frac{2^b+1}{2^b-1}}$$

multiplied by the cosine wavelength, in which b is in the range of 0.75 to 1.25, or said filter bank is an Nth-order Gaussian Derivative filter bank with N being in the range of 5 to 20.

The present invention also relates to a computer program product for, when executing on a programmable computer, performing a method as described above.

In another aspect, the present invention provides a method for detecting features in an image. This method comprises: providing an image; creating a Cosine Modulated Gaussian filterbank tuned to various wavelengths; creating a plurality of filtered images by filtering said image in plurality of directions (horizontal, vertical, diagonal over any angle, etc.) using said Cosine Modulated Gaussian filterbank to compute a Cosine Modulated Gaussian response for each direction and computing a Cosine Modulated Gaussian Summation response for each filtered image representing a scale; extracting of each CM-Gaussian Summation response a maximal/minimal point, each point corresponding to a scale and location of a feature region; performing edge suppression and shape detection on each of said feature regions; performing interpolation to fine-tune said determined location and scale and assigning orientation of each of said plurality of feature regions; computing a feature region descriptor vector of each of said plurality of feature regions by using the filter responses in the filterbank; and storing location, scale, orientation, feature region descriptor vector and shape information of each of said feature regions of said image.

In an embodiment of the invention, the creating of the Cosine Modulated Gaussian filterbank may comprise calculating a plurality of wavelength positions and corresponding filter size wherein each filter of said filterbank has a different wavelength position. Scale invariant feature detection is possible whereby the feature is detected when the scale of the filter in the filterbank is matched with the intrinsic scale of the image feature.

In an embodiment of the invention, a time-frequency atom of each Cosine Modulated Gaussian filter of the Cosine Modulated Gaussian filterbank may be balanced and may have minimal spreading in space $\sigma_t$ and scale $\sigma_w$ such that the lower bound of Heisenberg's uncertainty $\sigma_t\sigma_w=0.5$ may be reached with $\sigma_t=\sigma_w$. With the balanced time-frequency atom, the optimal number of scales per octave (K) filtering in the filterbank can be found to build an optimally matched filterbank system or scale-space balanced filterbank system. With this optimal filterbank system, the quality of the feature detection over the noise margin is improved by a factor of 3. Furthermore, the balancing of the time-frequency atom of the CM-Gaussian filter results in a spread in space with a sufficiently large spatial extent. For a digital implementation, the spatial extent of the filter has to be sufficiently large to discretize the filter with sufficient accuracy. The CM-Gaussian filter can be discretized with sufficient accuracy at low complexity (limited number of filter coefficients) even for those $\sigma$'s detecting small sized features.

In an embodiment of the invention, each Cosine Modulated Gaussian filter of the Cosine Modulated Gaussian filterbank is approximated with a sum of exponentials as a single fixed-length filter over all scales, with equal approximation error over all scales. By decreasing or increasing the approximation, a lower of a higher complexity algorithm can be built coupled to a higher or lower quality level. For example, by decreasing the order of the approximation, a low complexity algorithm can be built by sacrificing some quality. Also, by changing the order of the approximation, the trade-off in quality and complexity is done without changing the feature detection algorithm framework.

In an embodiment of the invention, the approximation is performed in a-independent space X with $X=x/\sigma$, wherein $\sigma$ is defined as a scale of a filter, X is defined as a filter sampling point with respect to the scale of the filter and X is defined as a filter sampling point independent to the scale of the filter. This may allow designing a single filter independent of the scales ($\sigma$). The approximation filter can be a highly accurate fixed-length filter and may allow filtering the image in constant time, regardless of the scale ($\sigma$). The approximation error is the same over all scales and can be sufficiently small, e.g. $1.3243\times10^{-4}$, that it is negligible.

In an embodiment of the invention, the shape detection may comprise detection of blob and corner local feature regions and extracting a shape of the underlying features. In an example embodiment, blob and corner detection may be performed at the same time, resulting in a better extraction of shape.

In an embodiment of the invention, assigning the orientation of each of the plurality of feature regions may be determined using eigenvectors of each of the plurality of feature regions.

In an embodiment of the invention, assigning the orientation of the plurality of feature regions may comprise detecting peaks of a histogram of orientation of responses computed using the horizontal and vertical direction Cosine Modulated Gaussian filter scale that detected the feature.

In an embodiment of the invention computing a feature descriptor for each of said plurality of feature regions may comprise computing the histogram of gradient orientations or sum of gradients; the gradients or responses may be computed by the scale of the filter which detected the feature.

A method according to embodiments of the invention will be further referred to as "SIFER".

The present invention also relates to a method to align a plurality of images of different spectral bands of a scene using the method for detecting features in an image as described above, said method comprising: providing a plurality of images, each image being related to a different spectral band; detecting scale-invariant image features of each of said plurality of images using a method according to the first aspect of the invention, selecting an anchor image from said plurality of images; detecting common image features between said plurality of images and said anchor image; aligning said plurality of images based on said detected common image features.

In an embodiment of the invention, aligning the plurality of images may be executed by performing a scaling, rotation and translation on the plurality of images.

In an embodiment of the invention, selecting an anchor image from the plurality of images may comprise selecting an image from the plurality of images comprising a largest number of image features. The number of features matching with the anchor image may thus be increased, thereby increasing the sensitivity of the system.

In an embodiment of the invention, selecting an anchor image from the plurality of images may comprise selecting an image from the plurality of image featuring the least optical errors. Images at extreme wavelengths in a 3D hypercube might have a limited number of features matching with the anchor image, in which case the algorithm may automatically select a more appropriate intermediate wavelength image as an intermediate anchor image.

For example a 3D hypercube may be composed of 2D images to be aligned taken over different wavelengths corresponding to the third dimension of the hypercube, such that images at extreme wavelengths such as 400 nm or 1000 nm may have few features matching with the anchor image.

In some embodiments, the anchor image which is most appropriate to perform feature matching is chosen in an adaptive manner.

In an embodiment of the present invention, the step of detecting common image features may comprise identifying a plurality of feature correspondences by estimating an image transformation between different views of the plurality of images; computing a first set of best features matches by applying a model for scaling, rotation, translation and perspective transformation on the identified plurality of feature correspondences; and computing a second set of feature matches by applying a model for lens distortion on the first set of best feature matches.

Additionally, results from both models may be fine-tuned by applying an optimization algorithm such as Levenberg-Marquardt (LM) optimization.

In an embodiment of the invention, estimating the transformation may comprise determining matches between image features of the plurality of images using a robust model fitting algorithm. For example, good and bad matches from the feature correspondences can be detected.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE FIGURES

FIG. 3 illustrates a third method according to embodiments of the present invention.

FIG. 4 illustrates a device according to embodiments of the present invention.

FIG. 5 shows a feature detected in a first view of a scene by a method according to embodiments of the present invention.

FIG. 6 shows the same feature detected in a second view of the same scene as in FIG. 5, according to embodiments of the present invention.

FIG. 30 shows a repeatability score comparison of a method according to embodiments of the present invention to state-of-the-art methods for scale variation artifacts.

FIG. 31 shows a repeatability score comparison of a method according to embodiments of the present invention to state-of-the-art methods for blur variation artifacts.

FIG. 32 shows a repeatability score comparison of a method according to embodiments of the present invention to state-of-the-art methods for noise variation artifacts.

FIG. 33 shows a repeatability score comparison of a method according to embodiments of the present invention to state-of-the-art methods for illumination variation artifacts.

FIG. 47 shows the approximation filter for GDO-10 at a scale of 2.0 as can be used in embodiments of the present invention.

FIG. 48 shows the approximation filter for GDO-10 at a scale of 32.0 as can be used in embodiments of the present invention.

FIG. 49 shows repeatability for a different number of scales per octave for different versions of D-SIFER according to embodiments of the present invention.

FIG. 50 shows a repeatability score comparison of a method according to embodiments of the present invention to state-of-the-art methods for scale variation artifacts.

FIG. 51 shows a repeatability score comparison of a method according to embodiments of the present invention to state-of-the-art methods for blur variation artifacts.

FIG. 52 shows a repeatability score comparison of a method according to embodiments of the present invention to state-of-the-art methods for noise variation artifacts.

FIG. 53 shows a repeatability score comparison of a method according to embodiments of the present invention to state-of-the-art methods for illumination variation artifacts.

FIG. 54 shows a repeatability score comparison of a method according to embodiments of the present invention to state-of-the-art methods for jpeg compression artifacts.

FIG. 55 shows a repeatability score comparison of a method according to embodiments of the present invention to state-of-the-art methods for rotation artifacts.

Figure 1:
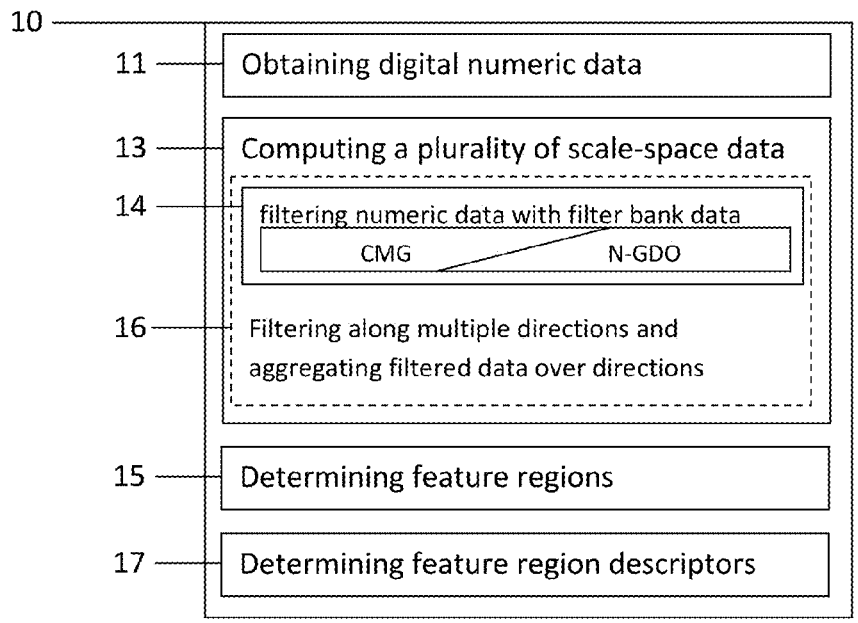
FIG. 1 illustrates a first method according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

While the present invention provides specific details on the digital filtering of two-dimensional images and numerous examples are provided herein relating to the digital processing of images, it will be understood by the person skilled in the art that embodiments of the present invention may also relate to other type of numeric data, for example, uniformly sampled time series, three-dimensional images or higher-dimensional data, e.g. scalar values sampled in points of a higher-dimensional vector space.

Where in embodiments of the present invention reference is made to "scale-space data", reference is made to a multi-scale data representation, in which the data is organized over a joint spatial and scale domain, e.g. the spatial domain providing information about a location-specific evolution of a quantity over a one, two, three or higher dimensional domain space, and the scale domain providing information about a scale-specific evolution of the quantity in the underlying spatial domain. For example, the scale-space data may refer to a data representation $[a_{i_1,\ldots,i_N,j}]_{i_1 \in \{1,\ldots,n_1\},\ldots,i_N \in \{1,\ldots,n_N\}, j \in \{1,\ldots,m\}}$, in which the N-dimensional spatial domain space is sampled over $\Pi_{k=1}^{N} n_k$ discrete locations, for each location providing information corresponding to m different scales.

In a first aspect, the present invention relates to a method for detecting features in digital numeric data. This method comprises obtaining digital numeric data comprising values corresponding to a plurality of sampling points over a domain space having at least one dimension. The method further comprises computing a plurality of scale-space data, in which each of this plurality of scale-space data comprises data over the domain space at a corresponding scale in the domain space. This computing of the plurality of scale-space data comprises filtering the digital numeric data using a filter bank, e.g. a filter bank comprising filters for a plurality of scales, e.g. tuned to various wavelengths. Furthermore, this filter bank is a Cosine Modulated Gaussian filter bank in which the standard deviation parameter of the Gaussian is $$\frac{1}{\pi}\sqrt{\frac{\ln(2)}{2}} \frac{2^b + 1}{2^b - 1}$$

multiplied by the cosine wavelength, in which b is in the range of 0.75 to 1.25, and/or said filter bank is an Nth-order Gaussian Derivative filter bank with N being in the range of 5 to 20.

The method also comprises determining a plurality of feature regions in this plurality of scale-space data, in which each feature region corresponds to a local extremum in scale and location of the scale-space data. The method finally comprises determining a feature region descriptor for each of the plurality of feature regions.

Referring to FIG. 1, an exemplary method 10 according to embodiments of the present invention is shown. The method 10 for detecting features in digital numeric data comprises obtaining 11 digital numeric data comprising values corresponding to a plurality of sampling points over a domain space having at least one dimension, e.g. obtaining digital numeric data corresponding to a quantity defined in a plurality of sampling points over a domain space having at least one dimension. For example, obtaining digital numeric data may comprise obtaining digital numeric data corresponding to a scalar quantity uniformly sampled over a regular grid in a one, two or three dimensional domain space, such as a time series of measurements, a two-dimensional image, e.g. comprising intensity values, or a three-dimensional image volume respectively. The digital numeric data may for example be organized in a list of values, a matrix of numeric values or a higher-dimensional generalization of such matrix.

The method further comprises computing 13 a plurality of scale-space data, in which each of this plurality of scale-space data comprises data over the domain space at a corresponding scale of the domain space. For example, the plurality of scale-space data may comprise a plurality of data sets, each data set comprising elements covering the same domain space as the digital numeric data, but each data set corresponding to a different scale in this domain space, e.g. for detecting a different scale of features in the digital numeric data.

The filter bank according to embodiments of the present invention is a Cosine Modulated Gaussian filter bank having a Gaussian standard deviation of $$\frac{1}{\pi}\sqrt{\frac{\ln(2)}{2}\frac{2^b+1}{2^b-1}}$$

multiplied by the cosine wavelength, in which b is in the range of 0.75 to 1.25, e.g. in the range of 0.85 to 1.15, e.g. in the range of 0.95 to 1.05, or e.g. b=1.0. Alternatively, the filter bank according to embodiments of the present invention is an Nth-order Gaussian Derivative filter bank with N being in the range of 5 to 20, for example in the range of 7 to 15, or for example, in the range of 9 to 12. In a preferred embodiment the filter bank is a 10th-order Gaussian Derivative filter bank.

This computing 13 of the plurality of scale-space data comprises filtering 14 the digital numeric data using a filter bank, e.g. a filter bank comprising filters for a plurality of scales, e.g. tuned to various wavelengths. Particularly, the filter bank may comprise a plurality of discrete filters, e.g. a plurality of infinite impulse response (IIR) filters, each discrete filter corresponding to a different scale parameter value for a common mathematical filter kernel, e.g. an analytic convolution kernel expression, having such a controllable scale parameter. The common mathematical filter kernel may be $$e^{-\frac{x^2}{2\sigma^2}}\cdot\cos\left(\frac{2\pi x\cdot\hat{e}}{\lambda}\right),$$

in which $$\sigma=\frac{1}{\pi}\sqrt{\frac{\ln(2)}{2}\frac{2^b+1}{2^b-1}}\lambda$$

with b in the range of 0.75 to 1.25, e.g. preferably in the range of 0.85 to 1.15, e.g. in the range of 0.95 to 1.05, or even more preferred, b=1.0. Here, x refers to a variable, e.g. generally a vectorial variable, representing a location in the domain space, $x\cdot\hat{e}$ refers to a scalar component of this variable, e.g. to a projection of x onto a unit vector $\hat{e}$, and $x^2$ refers to a squared norm of the variable x in the domain space, e.g. the square of the Euclidean L2-norm. Alternatively, the common mathematical filter kernel may be $$\frac{\partial^N}{\partial x^N}e^{-\frac{x^2}{2\sigma^2}},$$

in which N is in the range of 5 to 20, for example in the range of 7 to 15, or preferably, in the range of 9 to 12, or even more preferred N=10.

It is an advantage of embodiments of the present invention that the time-frequency atom of each Cosine Modulated Gaussian filter of the Cosine Modulated Gaussian filter bank may be balanced and may have minimal spreading in space $\sigma_t$ and scale $\sigma_w$ such that the lower bound of Heisenberg's uncertainty $\sigma_t\sigma_w$=0.5 is reached with $\sigma_t$=$\sigma_w$. This advantage can be achieved by the advantageous relationship between the cosine wavelength, e.g. the spatial length of a full period of the modulating cosine function, and the Gaussian standard deviation parameter.

The number of scales per octave (K) in the filterbank can be optimized to build an optimally matched filterbank system or scale-space balanced filterbank system. With this optimal filterbank system, the quality of the feature detection over the noise margin may be improved by a factor of 3 with respect to a second order Gaussian derivative filter. Furthermore, the balancing of the time-frequency atom of the CM-Gaussian filter may result in a spread in space with a sufficiently large spatial extent. For a digital implementation, the spatial extent of the filter is preferably large enough to discretize the filter with sufficient accuracy. The CM-Gaussian filter can advantageously be discretized with sufficient accuracy at low complexity (limited number of filter coefficients) even for those $\sigma$'s detecting small sized features.

The filter bank may be constructed by approximating the common mathematical filter kernel by a sum of exponentials. For example, in an embodiment of the first aspect of the invention, each Cosine Modulated Gaussian filter may be approximated with a sum of exponentials as a single fixed-length filter for all scales, and with equal approximation error over all scales. By decreasing or increasing the approximation, e.g. decreasing or increasing the length of the filter, a lower of a higher complexity algorithm can be built, corresponding to a higher or lower quality level. For example, by decreasing the order of the approximation, a low complexity algorithm can be built by sacrificing some quality. Also, by changing the order of the approximation, the trade-off in quality and complexity can be adjusted without changing the feature detection algorithm framework.

Such approximation may be performed in a scale-independent space X with X=x/$\sigma$, wherein $\sigma$ is defined as a scale of the filter, X is defined as a filter sampling point with respect to the scale of the filter and X is defined as a filter sampling point independent to the scale of the filter. This may allow designing a single filter independent of the scales ($\sigma$). The approximation filter can be a highly accurate fixed-length filter and may allow filtering 14 of the digital numeric data in substantially constant time regardless of the scale ($\sigma$), e.g. without a computational cost penalty which is dependent on the scale. The approximation error may be the same over all scales and can be sufficiently small, e.g. $1.3243\times10^{-4}$, which can be considered negligible.

Furthermore, computing 13 the plurality of scale-space data may furthermore comprise filtering 16 the digital numeric data along a plurality of directions in the domain space, and for each scale aggregating the filtered digital numeric data over the plurality of directions in said domain space. For example, filtering along a plurality of directions may comprise filtering using the Cosine Modulated Gaussian filter bank corresponding to $$e^{-\frac{x^2}{2\sigma^2}}\cdot\cos\left(\frac{2\pi x\cdot\hat{e}}{\lambda}\right)$$

in which the unit basis vector $\hat{e}$ is varied over a number of directions, e.g. over the principal directions of the canonical basis of the domain space. Furthermore, the plurality of directions may be equal to the dimensional cardinality of the domain space, or may differ therefrom. For example, in a two-dimensional domain space, filtering may be performed along two directions aligned with horizontal and vertical axes, but may also be performed along, for example, the horizontal, vertical and diagonal axes. Aggregating the filtered digital numeric data may comprise summing corresponding data over the plurality of directions, e.g. summing the corresponding scale-location data points obtained for the different directions.

The method also comprises determining 15 a plurality of feature regions in this plurality of scale-space data, in which each feature region corresponds to a local extremum in scale and location of the scale-space data.

The method finally comprises determining 17 a feature region descriptor for each of the plurality of feature regions. For example, the method may comprise calculating a feature region descriptor vector for each of the plurality of feature regions. Computing the feature descriptor for each of the plurality of feature regions may comprise computing the histogram of gradient orientations or sum of gradients; the gradients or responses may be computed by the scale of the filter which detected the feature.

Figure 2:
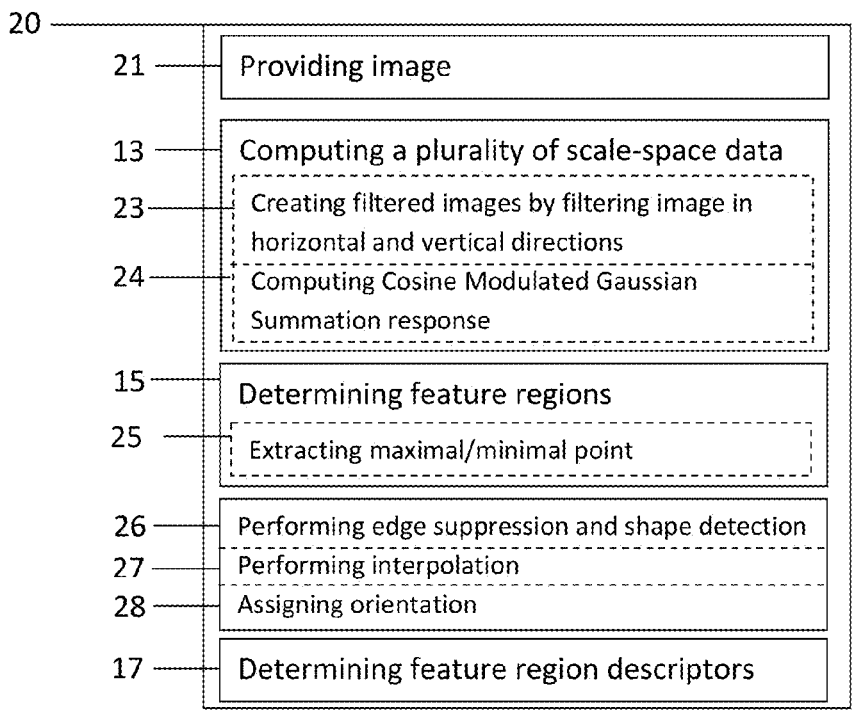
FIG. 2 illustrates a second method according to embodiments of the present invention.

In particular embodiments of the present invention, the digital numeric data may consist of an image, e.g. a two-dimensional image. Thus, in embodiments according to the present invention, e.g. in the exemplary method 20 illustrated in FIG. 2, the method for detecting features in digital numeric data may be a method 20 for detecting features in an image, in which the step of obtaining digital numeric data may accordingly comprise providing 21 an image, e.g. obtaining digital numeric data may consist of providing 21 an image.

Furthermore, the step of computing 13 the plurality of scale-space data may comprise creating a Cosine Modulated Gaussian filterbank tuned to various wavelengths. This creating of the Cosine Modulated Gaussian filterbank may comprise calculating a plurality of wavelength positions and corresponding filter size wherein each filter of the filterbank has a different wavelength position. Scale invariant feature detection is thus possible, in which the feature is detected when the scale of the filter in the filterbank is matched with the intrinsic scale of the image feature.

A time-frequency atom of each Cosine Modulated Gaussian filter of the Cosine Modulated Gaussian filterbank may be balanced and may have minimal spreading in space $\sigma_t$ and scale $\sigma_w$ such that the lower bound of Heisenberg's uncertainty $\sigma_t \sigma_w = 0.5$ may be reached with $\sigma_t = \sigma_w$. With such balanced time-frequency atom, the optimal number of scales per octave (K) filtering in the filterbank can be found to build an optimally matched filterbank system or scale-space balanced filterbank system.

Furthermore, each Cosine Modulated Gaussian filter of the Cosine Modulated Gaussian filterbank may be approximated with a sum of exponentials as a single fixed-length filter over all scales, with equal approximation error over all scales.

This approximation may be performed in a-independent space X with X=x/$\sigma$, wherein $\sigma$ is defined as a scale of a filter, X is defined as a filter sampling point with respect to the scale of the filter and X is defined as a filter sampling point independent to the scale of the filter. This may allow designing a single filter independent of the scales ($\sigma$). The approximation filter can be a highly accurate fixed-length filter and may allow filtering the image in constant time, regardless of the scale ($\sigma$).

Computing of the plurality of scale-space data may comprise filtering the digital numeric data using this filter bank. Thus, computing 13 the plurality of scale-space data may comprise creating 23 a plurality of filtered images by filtering the image in plurality of directions (horizontal, vertical, diagonal over any angle, etc.) using the Cosine Modulated Gaussian (CM-Gaussian) filterbank to compute a Cosine Modulated Gaussian response for each direction.

Alternatively, computing 13 the plurality of scale-space data may comprise creating 23 a plurality of filtered images by filtering the image in plurality of directions (horizontal, vertical, diagonal over any angle, etc.) using the Nth-order Gaussian Derivative filter bank to compute an Nth-order Gaussian Derivative response for each direction.

Furthermore, computing the plurality of scale-space data may comprise computing 24 a Cosine Modulated Gaussian Summation response for each filtered image representing a scale. For example, this Cosine Modulated Gaussian Summation response may comprise an element-by-element-wise sum or average of the one or more directions (e.g. horizontal, vertical, diagonal over any angle, etc.) Cosine Modulated Gaussian response of corresponding scale.

Alternatively, computing the plurality of scale-space data may comprise computing 24 an Nth-order Gaussian Derivative Summation response for each filtered image representing a scale.

Also, in such embodiments, determining 15 the plurality of feature regions in the plurality of scale-space data may comprise extracting 25 of each CM-Gaussian Summation response or Nth order Gaussian Derivative Summation response a maximal/minimal point, each point corresponding to a scale and location of a feature region, e.g. such that each feature region corresponds to a local extremum in scale and location of the scale-space data.

Furthermore, a method 20 according to embodiments of the present invention may comprise performing 26 edge suppression and shape detection on each of the feature regions, e.g. prior to determining the feature region descriptors.

For example, the shape detection may comprise detection of blob and corner local feature regions and extracting a shape of the underlying features. In an example embodiment, blob and corner detection may be performed at the same time, resulting in a better extraction of shape.

Furthermore, the method 20 may comprise performing interpolation 27 to fine-tune the determined location and scale and assigning 28 an orientation to each of the plurality of feature regions, e.g. also prior to computing the feature region descriptors. In embodiments of the invention, assigning the orientation of each of the plurality of feature regions may for example be determined using eigenvectors of each of the plurality of feature regions. Assigning the orientation of the plurality of feature regions may for example comprise detecting peaks of a histogram of orientation of responses computed using the horizontal and vertical direction Cosine Modulated Gaussian filter scale that detected the feature.

Computing 17 the feature region descriptor, e.g. a feature region descriptor vector, of each of the plurality of feature regions may then be performed by using the filter responses in the filterbank and location, scale, orientation, feature region descriptor vector and shape information of each of the feature regions of said image may be stored.

Furthermore, the present invention also relates to a method for aligning a plurality of images of a scene, e.g. the images corresponding to different spectral bands, using the method for detecting features in an image according to embodiments of the present invention, e.g. such as the exemplary method 20 discussed hereinabove.

Referring to FIG. 3, a method 30 for aligning a plurality of images of a scene according to embodiments of the present invention is shown. This method 30 comprises providing 31a plurality of images, e.g. each image being related to a different spectral band. For example, the method 30 may comprise providing 31a plurality of images each image being related to a different spectral band.

The method 30 further comprises detecting 20 scale-invariant image features of each of the plurality of images using a method according to embodiments of the present invention.

Furthermore, the method 30 comprises selecting 32 an anchor image from said plurality of images. For example, selecting 32 the anchor image from the plurality of images may comprise selecting an image from the plurality of images for which a large or the largest number of features were detected, e.g. selecting an image from the plurality of images comprising a largest number of image features. It is an advantage of such anchor image selection, that the number of features matching with the anchor image may be increased, thus increasing the sensitivity of the system. In embodiments according to the present invention, selecting the anchor image from the plurality of images may comprise selecting an image from the plurality of images featuring the least optical errors. Furthermore, images at extreme wavelengths in a 3D hypercube might have a limited number of features matching with the anchor image. For example a 3D hypercube may be composed of 2D images to be aligned taken over different wavelengths corresponding to the third dimension of the hypercube, such that images at extreme wavelengths, e.g. 400 nm or 1000 nm, may have few features matching with the anchor image. Therefore, the method 30 may also comprise selecting a more appropriate intermediate wavelength image as an intermediate anchor image. Thus, in some embodiments, the anchor image which is most appropriate to perform feature matching may be chosen in an adaptive manner.

The method 30 further comprises detecting 33 common image features between the plurality of images and the anchor image. The step of detecting 33 common image features may comprise identifying a plurality of feature correspondences by estimating an image transformation between different views of the plurality of images. Detecting 33 common image features may further comprise computing a first set of best features matches by applying a model for scaling, rotation, translation and perspective transformation on the identified plurality of feature correspondences; and computing a second set of feature matches by applying a model for lens distortion on the first set of best feature matches. Additionally, results from both models may be fine-tuned by applying an optimization algorithm such as Levenberg-Marquardt (LM) optimization.

In an embodiment of the present invention, estimating the transformation may comprise determining matches between image features of the plurality of images using a robust model fitting algorithm. For example, good and bad matches from the feature correspondences can be detected.

The method 30 also comprises aligning 34 the plurality of images based on the detected common image features. In embodiments of the present invention, aligning the plurality of images may be executed by performing a scaling, rotation and translation on the plurality of images. For example, the plurality of images may be resampled, e.g. an image interpolation technique may be applied to the plurality of images such that for each image the original sampling points are replaced by interpolated sampling points in accordance with an affine transformation determined by the detected common image features.

In a further aspect, the present invention also relates to a device for detecting features in digital numeric data. For example, in FIG. 4 such a device 40 according to embodiments of the present invention is shown. The device 40 comprises an input means 41 for obtaining digital numeric data comprising values corresponding to a plurality of sampling points over a domain space having at least one dimension. For example, the input means 41 may comprise wired or wireless communication means for receiving image data from an image sensor, or the input means 41 may comprise an image sensor for providing the digital numeric data.

The device 40 further comprises a processing means 42, e.g. a processor unit. This processing means 42 is adapted for, e.g. programmed for, computing a plurality of scale-space data, each of the plurality of scale-space data comprising data over the domain space at a corresponding scale in the domain space. This computing of the plurality of scale-space data comprises filtering the digital numeric data using a filter bank. This filter bank is a Cosine Modulated Gaussian filter bank in which the standard deviation parameter of the Gaussian equals $$\frac{1}{\pi}\sqrt{\frac{\ln(2)}{2}\frac{2^b+1}{2^b-1}}$$

multiplied by the cosine wavelength, and in which b is in the range of 0.75 to 1.25. Alternatively, this filter bank is an Nth-order Gaussian Derivative filter bank with N being in the range of 5 to 20.

The processing means 42 is further adapted for, e.g. programmed for, determining a plurality of feature regions in the plurality of scale-space data, each feature region corresponding to a local extremum in scale and location of the scale-space data.

The processing means 42 is adapted for determining a feature region descriptor for each of said plurality of feature regions. The device 40 also comprises an output means 43 for outputting this feature region descriptor for each of the plurality of feature regions.

The device for detecting features in digital numeric data may furthermore comprise components adapted for performing a functionality as expressed in method steps of method embodiments of the present invention.

In a further aspect, the present invention also relates to a computer program product for, when executing on a programmable computer, performing a method for detecting features in digital numeric data according to embodiments of the present invention.

Theoretical aspects and working principles of at least some embodiments of the present invention are described further hereinafter. Such considerations are only intended for clarifying features or aspects of embodiments of the present invention, but are not intended to limit the invention in any way.

Figure 7:
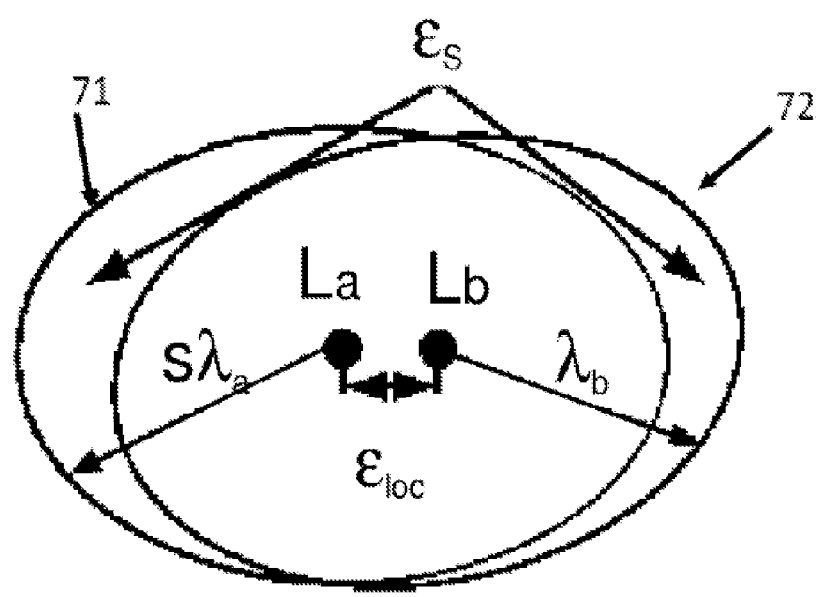
FIG. 7 illustrates repeatability of feature detection in different views according to embodiments of the present invention.

By way of illustration, an exemplary algorithm according to an embodiment of the present invention is disclosed for detecting image feature points that can be strongly resistant to variation of scale, resolution, zoom, blur, motion-blur, limited viewpoint rotation, illumination, image compression, noise etc. These feature points are in the present example detected with a filterbank for achieving scale-invariance. Example images with a scale difference of a factor 3.4 detecting the same features using the CM-Gaussian filter are shown in FIG. 5 and FIG. 6. To match these images perfectly, scale information of the detected features is needed to determine the size of the descriptor to cover the image surface around the feature location, which is $\lambda_a$ in the view of FIG. 5 and $\lambda_b$ in the view of FIG. 6. The view 71 of FIG. 5 and the view 72 of FIG. 6 are schematically depicted in FIG. 7. The scale detection is furthermore shown in FIG. 8. The accurate detection of $\lambda_a$ and $\lambda_b$ allows matching these two feature region descriptors with high correlation. This is possible if the descriptors cover identical image surfaces around feature regions in both images (i.e. with small image surfaces intersection error $\epsilon_s$) as shown in FIG. 7. For scale-invariance, the scale of the CM-Gaussian filter is matched with the intrinsic scale of the image structure, thanks to the use of the filterbank, resulting in an accurate spatial localization of the feature which is La in view 71 and Lb in view 72, due to a minimal spread of CM-Gaussian in space. The mismatch in the scale of the filter and the intrinsic image structure scale results in the errors in feature location and feature scale. Consequently, the scale-invariance is also advantageous to match images without scale variation.

Figure 8:
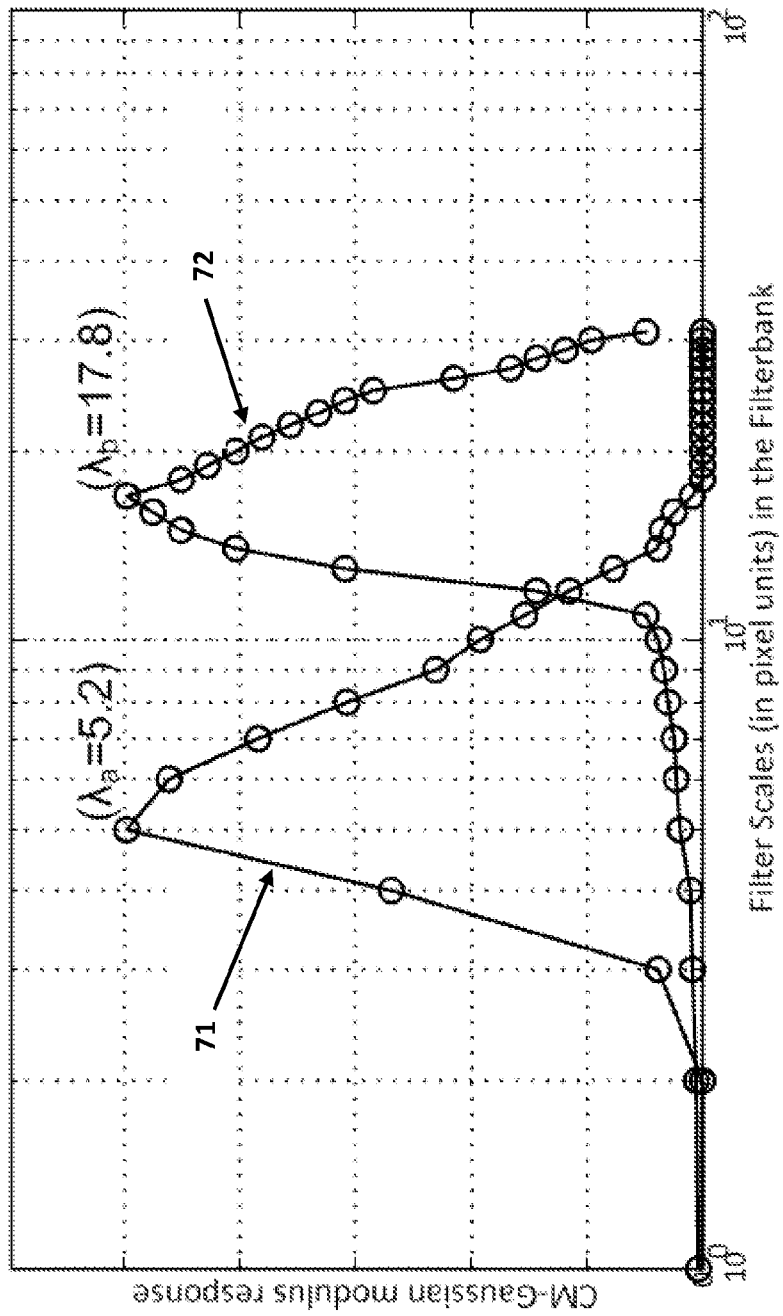
FIG. 8 shows the evolution of cosine modulated Gaussian response computed by filtering according to embodiments of the present invention for the feature as present in the view of FIG. 6 and the view FIG. 7.

FIG. 8 shows the evolution of the CM-Gaussian Modulus response for the same feature location in the images shown in FIG. 5 and FIG. 6 obtained by image filtering with the normalized CM-Gaussian filters of various scales in the optimally matched filter bank system according to embodiments of the present invention. The CM-Gaussian Modulus response reaches its maximum when the intrinsic scale of the image structure matches with the CM-Gaussian filter scale in the filter bank, as shown in FIG. 8. The feature in FIG. 5 is detected by the filter tuned to 5 pixels and the same feature in FIG. 6 is detected by the filter tuned to 17 pixels. The scales of the features are $\lambda_a$=5.2 pixels and $\lambda_b$=17.8 pixels after interpolation around their maxima. The ratio of the detected feature scales matches with the image scale factor s=3.4. The detected feature locations and their scales perfectly match with their intrinsic scale, as exemplified in FIG. 5 and FIG. 6, where the size of the circle indicates the scale of the feature and the center of the circle indicates the location of the feature. Therefore, scale-invariant feature detection may be considered a matched system, when the scale of the filter in the filter bank is matched with the intrinsic scale of the image feature, resulting in high-precision image feature scale detection. The feature localization may furthermore depend on the space behavior of the filter.

Theoretically, one may need individual highly selective filters having a compact support in space for each scale of image feature in the filter bank. However, such highly selective filter with compact support in space may be infeasible to build. Practical filter design results in a finite atom size in the scale domain and hence the filter bank therefore is typically tuned to detect only a few scales per octave (K). The size of an atom in scale/frequency is the corresponding bandwidth of the filter. The value of K is influenced by the bandwidth of the filter, which can be large for a narrow bandwidth filter. On the other hand, a highly selective practical filter also results in a large sized atom in space with erroneous feature localization, thus the highly selective filter that allows large values of K is also not favorable.

The CM-Gaussian filter with its balanced and minimal spread of time-frequency atom may build an optimally matched filter bank system with an optimal number K of scales per octave filtering in the filter bank, thanks to the compact size of the atom in scale that enables good feature detection. On the contrary, a state-of-art GSD filter may have an atom stretched in scale, thus allowing only a small value of K, which may thus also lead to a suboptimal matched filter bank system with less precise feature localization and feature scale detection.

The filter that is used in a filter bank for scale-space filtering for scale-invariant feature detection may be relevant to the detection quality of the detected features. Hence, study of the behavior of the filter in scale and space by its time-frequency atom shown in FIG. 9 can be educational. Theoretically, a compact support in space and a compact support in scale are preferred for high precision feature localization and scale detection. The accuracy of scale or size of the detected feature is dependent on the scale or frequency behavior of the filter, where the center frequency or wavelength of the filter is the size of the detected feature shown with Xa and kb in FIG. 8. The size of an atom in scale determines the precision with which scale is detected and the maximum possible number of scales per octave (K) filtering of scales in the filter bank. On the other hand, the accurate feature localization is a space or time behavior of the filter.

Figure 9:
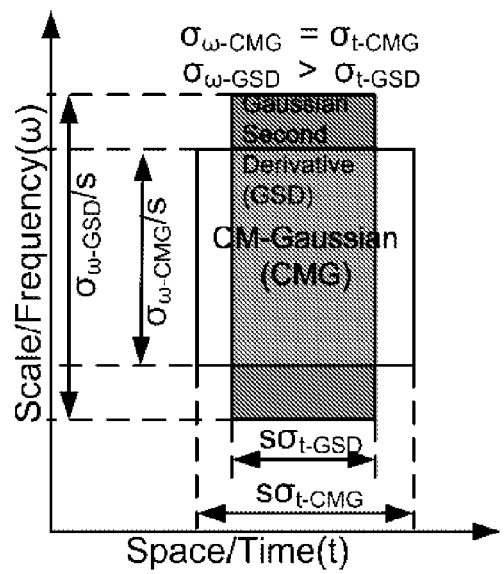
FIG. 9 shows a space-scale atom for a GSD filter and a filter according to embodiments of the present invention.

According to Heisenberg's principle of uncertainty, narrowing the support in scale results in elongation of the support in space and vice-versa. Hence, there exists an inverse relationship in accuracy while computing feature scale ($\lambda_a$ and $\lambda_b$) and feature location ($L_a$ and $L_b$) with the filter. Practically, very compact time-frequency atom filters not exist. But, a filter can be designed, such as the CM-Gaussian filter, having minimal spread $\sigma_t$ and $\sigma_\lambda$ and at the same time achieving the lower bound of Heisenberg's uncertainty $\sigma_t \sigma_\lambda = 0.5$ as shown in FIG. 9, which minimizes the scale and localization errors simultaneously and enables one to build an optimally matched filter bank system. Consequently, the CM-Gaussian filter achieves excellent feature detection due to its high precision computation of the feature location (La) and feature scale ($\lambda_a$). Therefore, a minimum $\epsilon_{loc}$ and $\epsilon_s$ can be achieved for perfect feature matching as shown in FIG. 7. However, the GSD filter has an unbalanced time-frequency atom. The GSD filter therefore may give the impression to have a high precision feature localization due to its small $\sigma_t$, but a poorly matched filter bank system based on the GSD filter may imply both a feature localization error and a feature scale error. The higher uncertainty/error in scale of the GSD filter, as shown in FIG. 9, quantizes many scales to a single scale, which eventually also adds feature localization error as well, due to higher mismatch between the scale of filter and the intrinsic scale of the image features.

Band-pass filters of various scales may be advantageous for scale-invariant feature detection. According to embodiments of the present invention, a band-pass filter may be created by modulating the Gaussian function with the Cosine function. The 1D Cosine Modulated Gaussian (CM-Gaussian) filter can be represented by the equation:

$$CMG(x; \sigma, \lambda) = e^{-(x^2)/2\sigma^2} \cos\left(\frac{2\pi x \cos(\phi)}{\lambda}\right).$$

In this equation, $\lambda$ is the wavelength of the basic sinusoid, $\phi$ is the filter direction and $\sigma$ is the Gaussian window width. Note that the terms frequency, wavelength or scale may all express the size/scale of the feature but in different measurement units. Thus, these terms can be used interchangeably to refer to the scale of the feature. The $\sigma$ determines the size of the filter and the $\lambda$ determines frequency of the signal filtered. By appropriately choosing the relation between $\sigma$ and $\lambda$, the time-frequency atom of the CM-Gaussian filter can be balanced.

The filter responds with a large response, if the signal matches with the wavelength of the sinusoid $\lambda$. The CM-Gaussian filter is a bandpass filter tuned to the wavelength $\lambda$. The size of the image structure that resonates with this filter is known in various measurement units as characteristic scale ($\sigma$) or characteristic wavelength ($\lambda$) or size in pixel units. The scale-invariant feature detector according to embodiments can be constructed by using the CM-Gaussian filter and by explicitly tuning the filters to the various wavelengths, intrinsically present in the image.

The following table 1 shows a high level comparison with state-of-art methods:

|  | SIFT | SURF | SIFER |
|---|---|---|---|
| Space-scale filter | Gaussian second derivative | Gaussian second derivative | Cosine modulated Gaussian |
| Optimality of filter | Not-optimal | Not-optimal | Optimal |
| Detector | Laplacian-of-Gaussian | Hessian | Wavelet modulus maxima |
| Approximation of filter | Difference-of-Gaussian | Box | Sum of exponentials |
| Accuracy of approximation | Less accurate | Less accurate | Highly accurate |
| Error in approximation | Not quantified (dependent on $\sigma$) | Not quantified (dependent on $\sigma$) | $1.3243 \times 10^{-4}$ (same for all $\sigma$) |
| Acceleration of computation | Difference-of-Gaussian | Integral image (constant convolution time) | Constant length filter irrespective of $\sigma$ (constant convolution time) |
| Image upsampling | x2 | x2 | Not required |
| Subsampling | Yes | Yes | No |

In the table above, SIFER refers to a method according to embodiments of the present invention. Regarding optimality, optimal refers to a filter according to Heisenberg's principle of uncertainty, with equal width in time and in frequency, as illustrated by FIG. 9, while not-optimal refers to a width in time and in frequency of the time-frequency atom which are not equal.

The balanced and minimal spread of time-frequency atom has several benefits and simultaneously and efficiently solves several problems. The majority of state-of-art solutions use a GSD filter as a scale-space filter. Embodiments according to the present invention can lead to good scale-invariant feature detection, which may be illustrated by the following advantageous aspects thereof:

Optimal Scale-Space Localization:

The CM-Gaussian filter with its balanced and minimal spread of time-frequency atom has the property of optimally localizing features in space and scale simultaneously, e.g. better than state-of-art methods based on the GSD filter. This is a unique property of the CM-Gaussian filter, thus enabling optimal feature detection.

Figure 10:
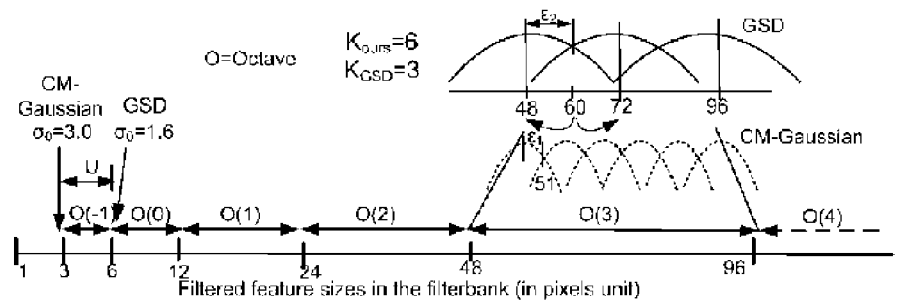
FIG. 10 shows feature sizes divided into octaves and each octave divided in K intervals in accordance with embodiments of the present invention.

Optimally Matched Filter Bank System and/or Scale-Space Balanced Filter Bank System:

Theoretically, for high precision feature localization and scale detection, individual filters are needed for each discrete size of the image feature in each octave of the filter bank shown in FIG. 10. But, in practice, such highly selective filter is hard to implement due to its infinite length. Moreover, a highly selective filter has erroneous feature localization due to the large sized atom in space. Hence, this typically leads to a few scales per octave (K) filtering in the filter bank. The CM-Gaussian filter having its atom balanced and shrunk in frequency compared to the GSD filter allows choosing an optimal K to build an optimally matched filter bank system and/or scale-space balanced filter bank system, as shown in FIG. 10, with K=6, experimentally validated as optimal further below. On the contrary, due to the GSD filter being stretched in frequency as shown in FIG. 9, the value of K is small leading to a poorly matched filter bank system and/or scale-space unbalanced filter bank system shown with O=3 in FIG. 10. Consequently, K=3 is used by GSD based methods. Moreover, the intrinsic scale of the image features lying at scales not filtered by the filter bank are detected at the nearest scale filter. In the example of FIG. 10, for the GSD filter based methods the feature scales lying within 49-59 and 61-71 in O=3 are detected with the nearest interval filter tuned to scales 48 and 72 respectively, whereas the method according to embodiments of the present invention is more selective by detecting a restrictive range of feature scales $\epsilon_1$ (49-51) in the interval filter tuned to scale 48. Detecting the features to the nearest scale filter leads to: a scale detection error and feature localization error. The mismatch of the interval filter scale and intrinsic scale of the image feature leads to delocalization of the feature from its actual location, as can be observed in experiments. Both errors get even worse with increasing octave numbers because the size of $\epsilon_2$ shown in FIG. 10 increases exponentially with the increase in octave. The double of the value of $\epsilon_2$ is the uncertainty in scale which corresponds to the size of an atom in scale as shown in FIG. 9. The large number of scales is quantized as a single scale by the filter and hence large mismatch between the scale of the filter and intrinsic scale of the feature exist, which results in both feature localization error and feature scale error. Consequently, higher uncertainty of the GSD filter in scale induces the feature localization error, despite having compact support in space. Therefore, the unbalanced GSD filter makes both the errors worse. On the contrary, both the errors are minimized jointly by our method due to small uncertainty in scale shown with $\epsilon_1$ in FIG. 10, thanks to CM-Gaussian having balanced and minimal spread time-frequency atom and optimally matched filter bank system.

Distinctive Feature Descriptor:

Once the feature location and scale is identified, the feature descriptor is computed by using the filter responses in the filter bank, which is also known as the gradient. The detected features are described with the feature descriptor vector which computes the histogram of gradient orientations or sum of the gradients, with gradients or responses computed by the scale of the filter which detected the feature. The computed gradients have to be accurate for the descriptor to be more distinctive. More distinctive and invariant feature descriptor is computed by the CM-Gaussian due to more accurate computed gradients because the scale is optimally matched with the intrinsic scale of the feature as shown in FIG. 10. On the contrary, the GSD-based methods having higher uncertainty/error in computing scale, introduce higher uncertainty/error in computing the gradients and hence this contributes to the less distinctive feature descriptors.

Figure 14:
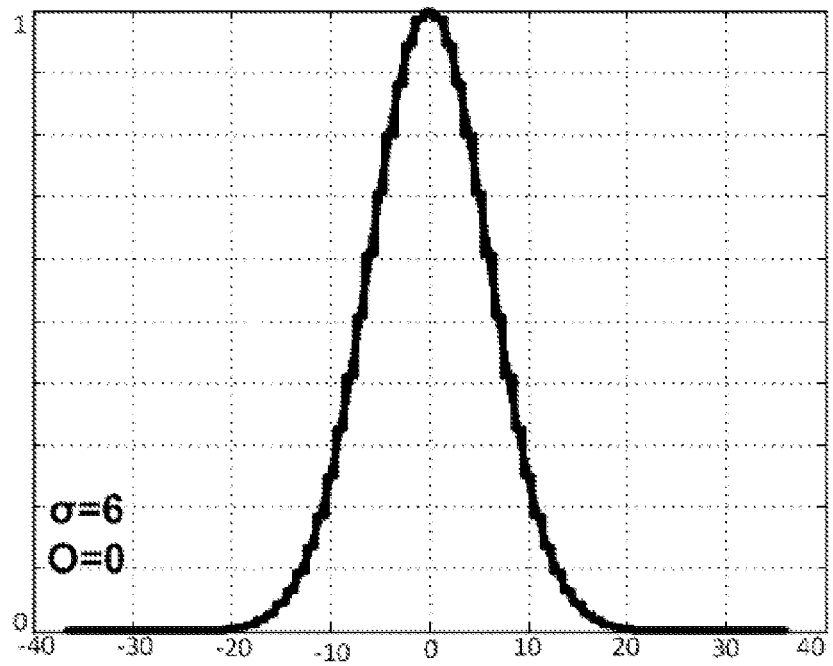
FIG. 14 shows discretization accuracy for the Gaussian function at a scale $\sigma=6$, for illustration of aspects of embodiments of the present invention.
Figure 15:
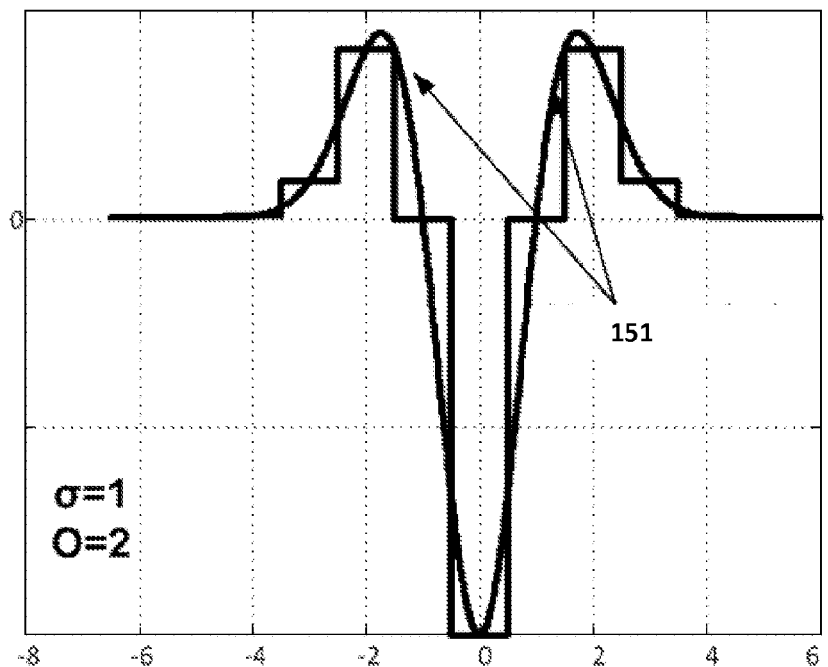
FIG. 15 shows discretization accuracy for the 2nd order Gaussian derivative function at a scale $\sigma=1$, for illustration of aspects of embodiments of the present invention.
Figure 16:
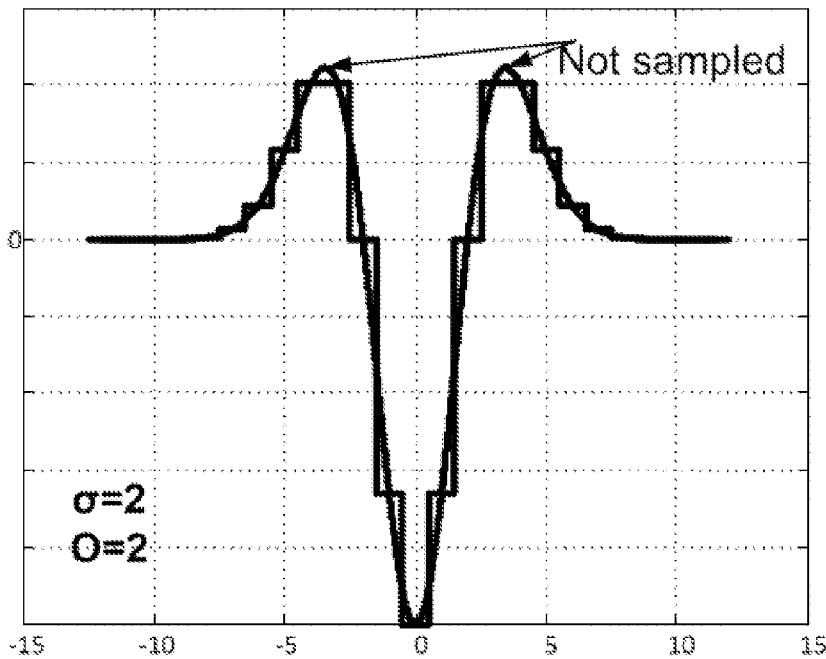
FIG. 16 shows discretization accuracy for the 2nd order Gaussian derivative function at a scale $\sigma=2$, for illustration of aspects of embodiments of the present invention.
Figure 17:
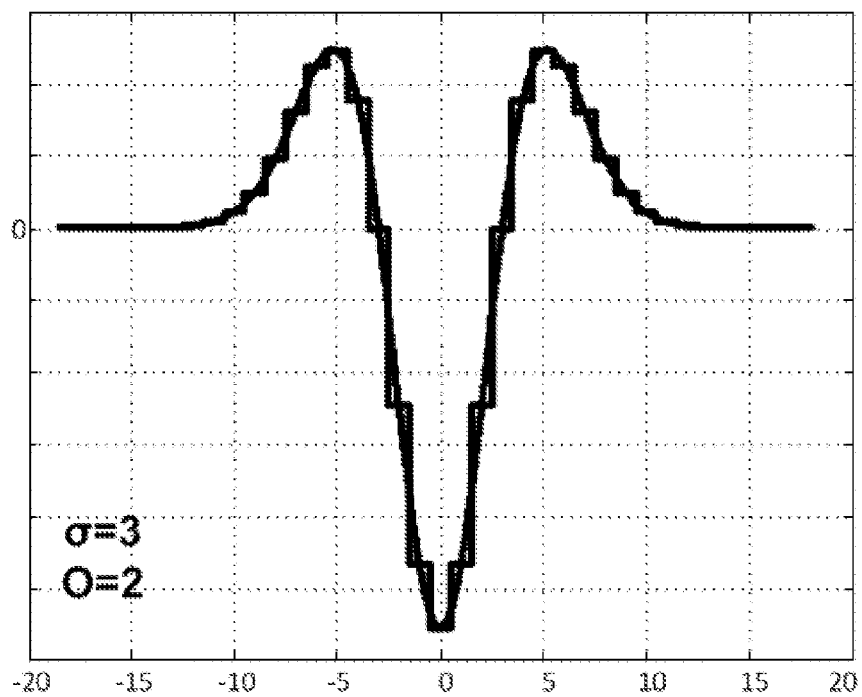
FIG. 17 shows discretization accuracy for the 2nd order Gaussian derivative function at a scale σ=3, for illustration of aspects of embodiments of the present invention.
Figure 18:
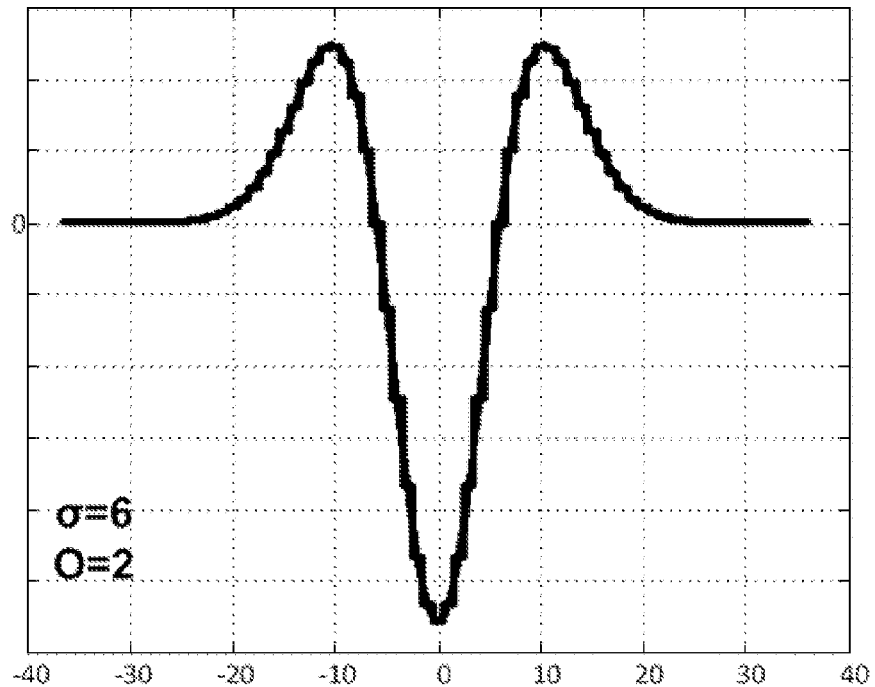
FIG. 18 shows discretization accuracy for the 2nd order Gaussian derivative function at a scale σ=6, for illustration of aspects of embodiments of the present invention.

Complete Feature Scale Detection Range:

The CM-Gaussian filters having their atom stretched in space lead to a perfectly digitally implementable filter even for smaller $\sigma$'s to detect smaller features. For example, to detect the smallest feature of size 3.0 shown in FIG. 10, we need $\sigma_0=3.0$, which can be digitized with sufficient accuracy. FIG. 11 to FIG. 14 show the discretization accuracy for different scales of the Gaussian, and FIG. 15 to FIG. 18 show the same for the second order derivative of the Gaussian. For the GSD filter with its atom shrunk in space, the smaller features cannot be detected because such filters cannot be digitally implemented. Indeed, the convolution filter envelope is not sampled well, as seen in regions 151, if the σ is below 2.0 as shown in FIG. 15. For example, with an initial $\sigma_0$=1.6 as a first scale in the filter bank, only features larger than 6 pixels can be detected. Consequently, as shown in FIG. 10 the non-negligible gap "U" corresponding to one-octave (O=−1) with features sizes in the range 3-6 is created.

Techniques such as SIFT and SURF fill this gap by image upsampling by a factor of 2 in order to detect such small features. It is observed by such techniques that detecting features by image upsampling improved the number of detected stable feature points by a factor of 4. In fact, the features in smaller scales are detected with a higher precision and hence they may be equally important. However, the image upsampling introduces noise due to aliasing and increases the computational complexity as well, without actually introducing any new information in the image. Though the atom's shrinking in space for the GSD filter seems to suggest a reduction in complexity at first glance, its complexity is actually increased due to these image upsampling requirements. On the contrary, methods according to embodiments of the present invention do not require any image upsampling.

Shift-Invariance:

Larger features are detected by embodiments of the present invention by varying the filter size and without image sub-sampling. Therefore, a good shift-invariant and scale-invariant feature detection algorithm can be obtained at comparable complexity with various current solutions performing sub-sampling. Additionally, FIG. 11 to FIG. 18 show that the discrete filter almost converges to a continuous filter for larger σ, thus adding accuracy. The various current solutions which are performing subsampling are not perfectly shift-invariant, contributing partly to feature delocalization in the higher octaves shown in FIG. 10.

Accurate Approximation:

A single filter with X=x/σ was designed in accordance with embodiments of the present invention so that the single approximation filter in X space approximates filters over all scales. Hence, all scale-space filters of various σ bear similar properties such as the same the approximation error of $1.3243 \times 10^{-4}$ for all σ, which is below the noise margin. Our approximation technique results in a constant length filter irrespective of a. The approximation error is not negligible for SIFT and SURF. SIFT approximates the Laplacian-of-Gaussian (LoG) by the Difference-of-Gaussian (DoG) having a non-constant length filter. SURF approximates the GSD filter by a Box filter. Both the SIFT and SURF method of approximation is coarse and the approximation error gets bigger for larger a.

The 2D CM-Gaussian filters for filtering an image in the X and y directions respectively can be expressed by following formulae:

$$CMGX(x,y;\sigma,\lambda) = e^{-(x^2+y^2)/2\sigma^2} \cos(2\pi x/\lambda)$$

$$CMGY(x,y;\sigma,\lambda) = e^{-(x^2+y^2)/2\sigma^2} \cos(2\pi y/\lambda)$$

The relation between σ, λ and half-amplitude bandwidth b is given by following equation:

$$\sigma = \frac{1}{\pi}\sqrt{\frac{\ln(2)}{2}} \frac{2^b+1}{2^b-1} \lambda = A\lambda$$

With σ, b and λ the frequency response (bandwidth or frequency selectivity) and size of the filter can be controlled. Consequently, the size of the time-frequency atom of the CM-Gaussian filter shown in FIG. 9 can be controlled. This relation implies that if a highly frequency selective filter is constructed by reducing b then the size of the filter σ will become large.

For example, to establish the relation between σ and λ, let us consider b=0.8 which gives the relation σ=0.6931×λ.

29 dB attenuation can be attained for the DC term for b=1.0, which is sufficiently large. Hence, the subtraction of the DC term is not required as it has been attenuated sufficiently. Note that due to the cosine term in the filter, the filter begins to respond for the DC if b is more than 1.1. Hence, for larger values of b, subtraction of the DC term is required. Thus, for b=1.0 the filter satisfies the admissibility condition.

Figure 19:
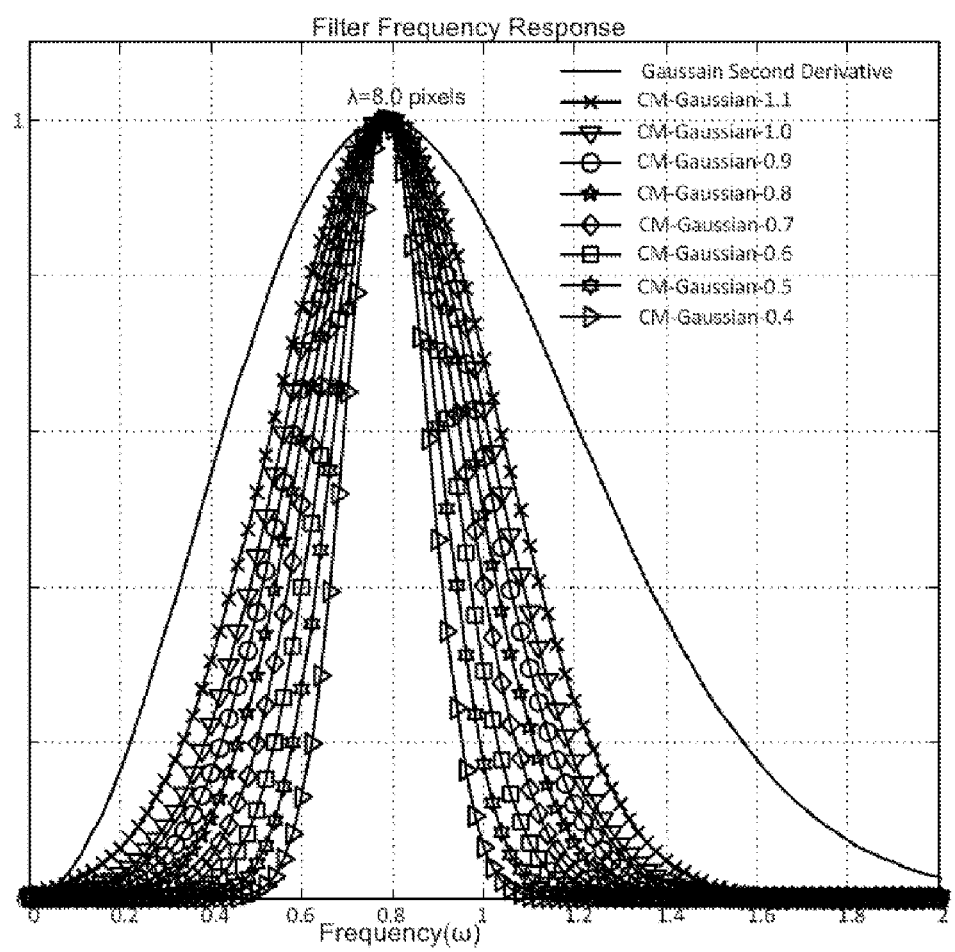
FIG. 19 shows the frequency response of the CM-Gaussian according to embodiments of the present invention for different bandwidths b and for the GSD filter.

Basically, the Derivatives of the Gaussian are also band-pass filters as shown in FIG. 19 and the center frequency is given by:

$$\omega = \sqrt{\frac{O}{\sigma}}$$

$$\lambda = 2\pi\sqrt{\frac{\sigma}{O}}$$

where O is an order of the Gaussian derivative, σ is width of a Gaussian window and λ is wavelength or size of the filtered feature in pixel units.

Figure 20:
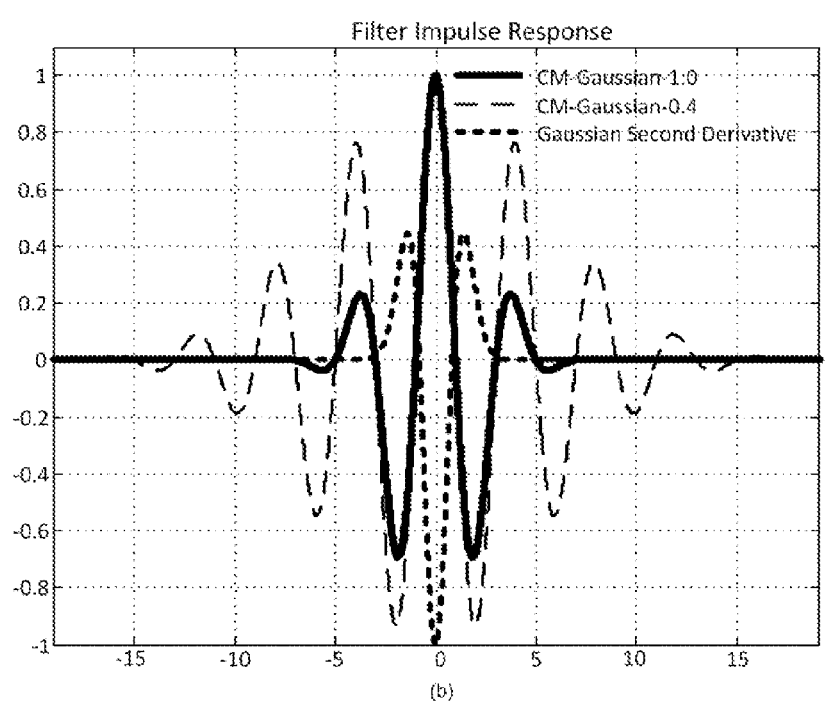
FIG. 20 shows the filter impulse response for the CM-Gaussian of b=1.0 and b=0.4 in accordance with embodiments of embodiments of the present invention and for the GSD filter.

The bandwidth of the CM-Gaussian filter can be controlled by appropriately setting parameter b. Hence, the size of the time-frequency atom in space and frequency for the CM-Gaussian filter shown in FIG. 9 can be controlled. In contrast, the size of the time-frequency atom in space and in frequency for the GSD filter cannot be controlled. FIG. 19 shows the frequency response of the CM-Gaussian filter for various b (b=1.1, 1.0, 0.9, 0.8, 0.7, 0.6, 0.5, 0.4) compared with the GSD filter to detect the feature of size λ=8.0 pixels. The corresponding filter impulse response in space is also shown in FIG. 20. The center frequency of the filter (λ=8) shown in FIG. 19 is the actual size or scale of the feature. If the scale detection precision is improved by narrowing the bandwidth such as shown in FIG. 19 for the highly selective filter with b=0.4, the impulse response appears to have large side-lobes shown in FIG. 20 and hence a larger uncertainty/error to localize the feature location in space. Thus, there is an inverse relationship between the scale detection and the feature spatial location detection property of the scale-space filter as explained earlier hereinabove. Consequently, optimal feature detection with an optimally matched filter bank system with optimal K is only feasible with a CM-Gaussian with compact time-frequency atom having b=1.0. The CM-Gaussian filter with b=1.0, indeed jointly minimizes the uncertainty/error in space (feature localization error) and in frequency (scale detection error). The atom shrunk in frequency for the CM-Gaussian filter with respect to the GSD filter allows increasing K in the filter bank. The stretching of the atom in space with respect to the GSD filter results in a larger spatial filter size. To tackle the problem of computational complexity due to the larger filter size shown in FIG. 19 and FIG. 20, embodiments of the present invention provide a method to filter the image in constant time and independent of scale (σ). FIG. 19 and FIG. 20 show that the GSD filter has a small length filter spatially, but is very poor in detecting the scale of the feature due to its wide bandwidth. The direct impact of its wide bandwidth is its larger uncertainty to detect the scale precisely and only small number of scales per octave (K) filtering possible in the filter bank. Hence, this results in larger uncertainty/error in detecting the scale of the feature and feature location as well, which is due to the small K in the filter bank resulting in a poorly matched filter bank system, as shown in FIG. 10.

Not every CM-Gaussian filter with different b shown in FIG. 19 and FIG. 20 is equally relevant. The b that balances the time-frequency atom with minimal spreading as shown in FIG. 9 may be identified. The time-frequency atom shown in FIG. 9 is balanced at b=1.0. The best b and K are validated empirically in the experimental results hereinafter, which, in this instance, turn out to be b=1.0 and K=6.

Figure 21:
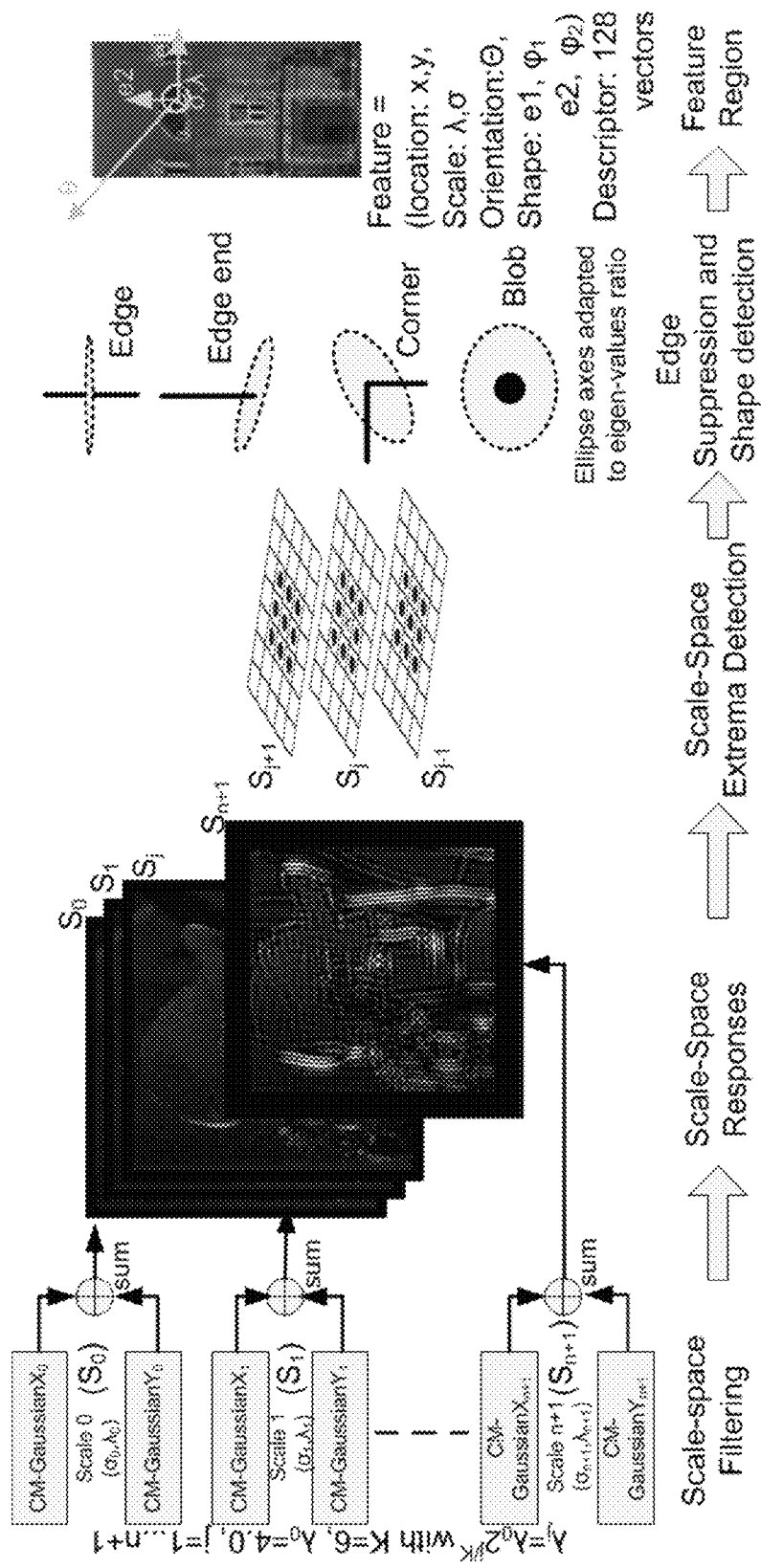
FIG. 21 illustrates an exemplary method "SIFER" for detecting features in accordance with embodiments of the present invention.
Figure 22:
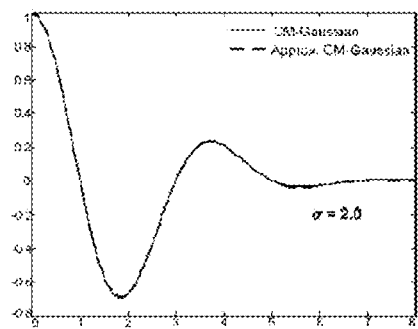
FIG. 22 shows the CM-Gaussian filter and its 4th order approximation (q=4) for σ=2.0, illustrating aspects of embodiments of the present invention.
Figure 23:
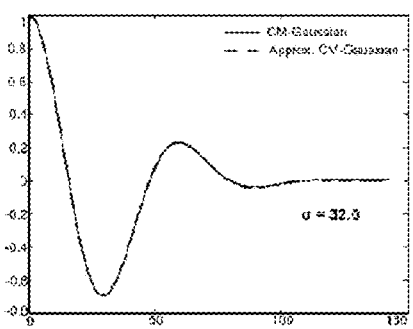
FIG. 23 shows the CM-Gaussian filter and its 4th order approximation (q=4) for σ=32.0, illustrating aspects of embodiments of the present invention.
Figure 24:
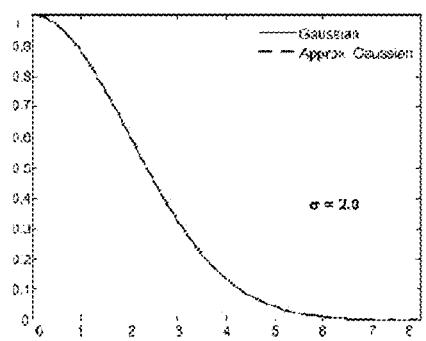
FIG. 24 shows the Gaussian filter and its 3rd order approximation (q=3) for σ=2.0, illustrating aspects of embodiments of the present invention.
Figure 25:
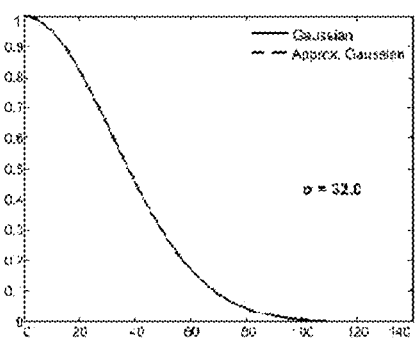
FIG. 25 shows the Gaussian filter and its 3rd order approximation (q=3) for σ=32.0, illustrating aspects of embodiments of the present invention.

An exemplary algorithm is depicted in FIG. 21 and summarized hereinafter to show the different stages of an exemplary CM-Gaussian scale-invariant feature detection algorithm according to embodiments of the present invention.

Exemplary CM-Gaussian Scale Invariant Feature Detection Algorithm:
1. To filter N scales, compute (n+2) wavelength positions using $\lambda_j = 2^{j/K} \times \lambda_0$ for j=1 . . . n+1 by using $\lambda_0$=4.0 and compute the corresponding $\sigma_j$ using $$\sigma = \frac{1}{\pi}\sqrt{\frac{\ln(2)}{2}}\frac{2^b+1}{2^b-1}\lambda = A\lambda,$$

with j=0, . . . , n+1.
2. Compute the CM-Gaussian response, $CMGX_j$ and CMGYj in x and y directions respectively for all the scales $\sigma_j$ using the equations for $CMGX_j$ and $CMGY_j$ hereinabove.
3. Compute the CM-Gaussian Summation response ($S_j$) by using $Sj=CMGY_j+CMGY_j$.
4. Extract the maximal/minimal point in scale-space of the CM-Gaussian Summation response in a 3×3×3 window as shown in FIG. 21.
5. Remove response to the edges and extract shape information.
6. Perform interpolation in scale-space and assign orientation.
7. Compute the histogram of gradient orientations feature descriptor vector of dimension 128 using orientation, CMGX and CMGY, corresponding to the scale of the feature.
8. Store feature location, scale, orientation, shape information and feature descriptor.

The scale-invariant feature point detection algorithm is constructed by using CM-Gaussian filter banks tuned to various wavelengths. Since the CM-Gaussian filter has a higher frequency selectivity due to its narrow bandwidth compared to the GSD as shown in FIG. 19, the filter bank can be created by densely/optimally sampling the scales per octave (K). The scales of the image structure that are sampled are chosen from the smallest possible scale and incremented by some factor. The consecutive wavelengths or scales that are sampled by the filter bank are computed by the relations $\lambda_j = 2^{j/K} \times \lambda_0$ for j=1 . . . n+1 number K of scales per octave sampling. The best K is identified empirically hereinafter, which results K=6.

Now, let's analyze the number of scales n. To analyze N scales the image should be filtered for (n+2) scales. The (n+2) wavelengths positions ($\lambda_0$ . . . $\lambda_{n+1}$) are computed using the previous equation hereinabove. In this example, the starting wavelength was selected as $\lambda_0$=4.0. If the difference of the consecutive wavelengths calculated from the previous equation is smaller than 2 in creating the filter bank, then $\lambda_j$ can be incremented by 2 to avoid sampling wavelengths at sub-pixel level in smaller wavelength positions. The corresponding Gaussian filter scales ($\sigma_0$ . . . $v_{n+1}$) can then be calculated using the relation between b, $\lambda$ and $\sigma$ discussed hereinabove. Since, CM-Gaussian filters can be designed that can be tuned to any wavelength, this method does not require image upsampling. The lowest wavelength of the signal in an image can thus be 2 pixels as constrained by the Nyquist image sampling. Hence, filters can be designed to measure wavelengths that can be as small as 2 pixels. But, while detecting features near the Nyquist frequency the filter will respond to high frequency image noise. Hence image features are not normally detected near the Nyquist frequency i.e. $\lambda_0$=2.0. Consequently, $\lambda_0$=4.0 is used in the remainder of this example.

To compute the scale-space response, the image or data is filtered in one or a plurality of directions (e.g. horizontal, vertical and/or diagonal over any angle, etc.) by using the CMG filters respectively for the (n+2) scales (wavelengths) computed previously. For automatic scale selection, the filter response can be normalized. Unlike normalizing the image response for the scale, the filters can be normalized for unity gain directly for automatic scale selection. Afterwards, the CM-Gaussian Summation response is computed by summing CMGX and CMGY for each scale.

Computing the CM-Gaussian Summation response instead of the CM-Gaussian Modulus response preserves the sign of the region. The positive sign indicates the bright corner or blob or edge in a dark background and vice-versa for a negative sign.

Figure 11:
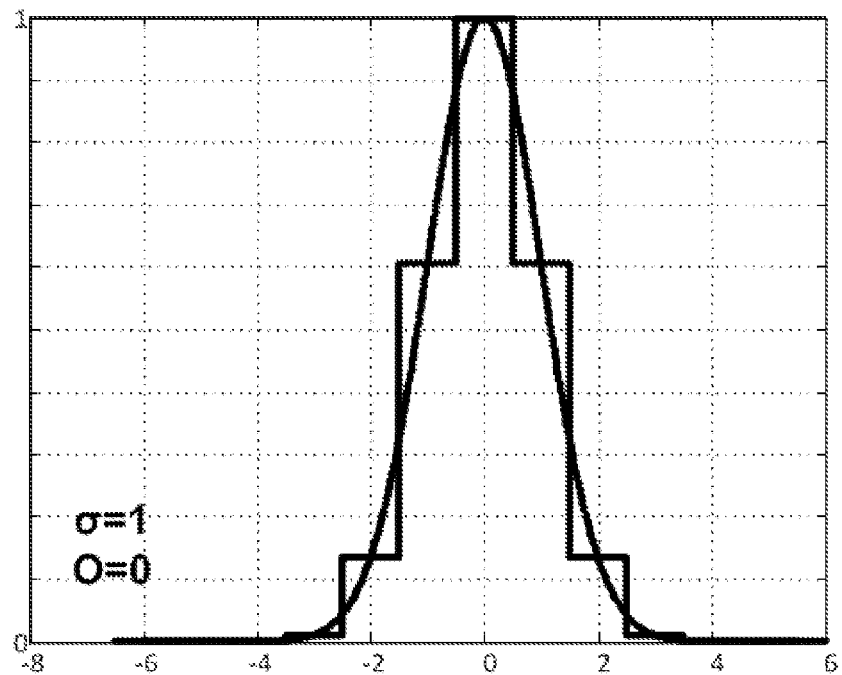
FIG. 11 shows discretization accuracy for the Gaussian function at a scale $\sigma=1$, for illustration of aspects of the present invention.
Figure 12:
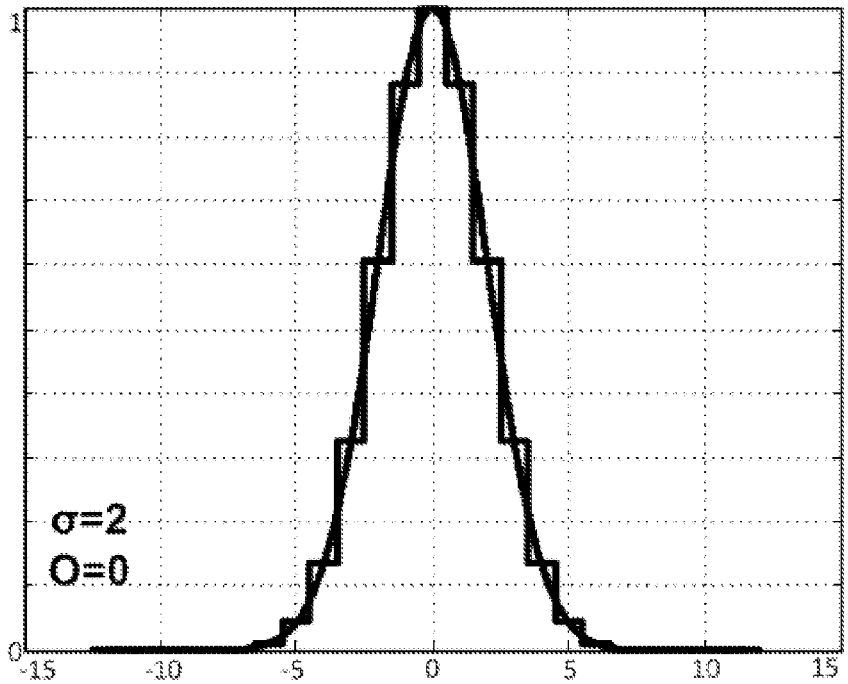
FIG. 12 shows discretization accuracy for the Gaussian function at a scale $\sigma=2$, for illustration of aspects of the present invention.
Figure 13:
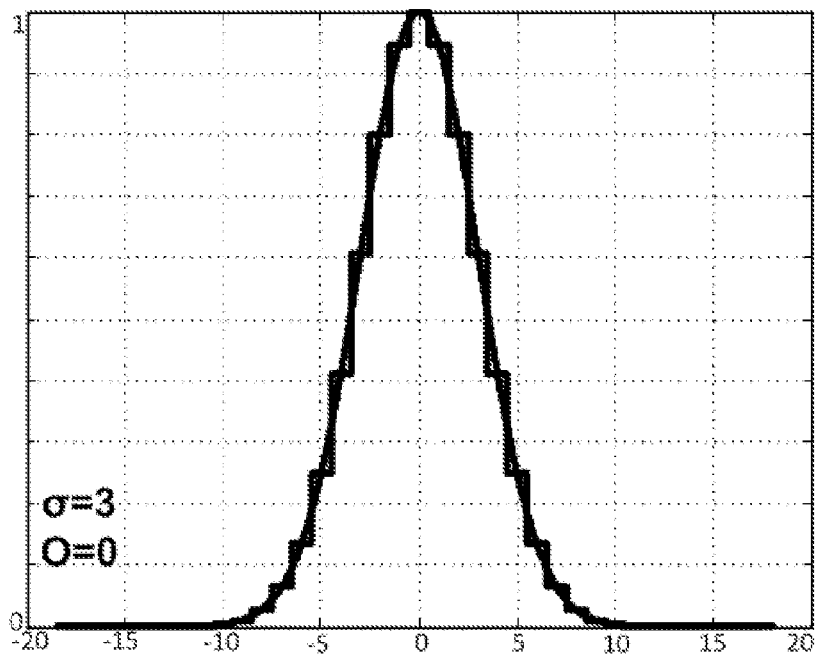
FIG. 13 shows discretization accuracy for the Gaussian function at a scale $\sigma=3$, for illustration of aspects of embodiments of the present invention.

To detect large features, the image does not need to be downsampled, but one can increase the filter length. There are several consequences for the loss of accuracy if the image is downsampled. The first is that there is a loss of accuracy while discretizing the filter near the pixel scale as shown in FIG. 11 to FIG. 18. For a small sigma as shown in FIG. 11 the Gaussian envelope is not sampled well whereas in the case of a large sigma it is sampled more accurately as shown in FIG. 14. Moreover, for the large a the discretized filter almost converges to the continuous domain filter due to a negligible error that occurs from discretization. If the image is downsampled and the same smaller filters are used in each level, every octave is influenced by the loss of accuracy due to the discretization of the filter. The second reason is that there are losses that occur from aliasing as well as from the imperfect downsampling filter. However, image filtering with large a is computationally expensive whereas only the first few scales are impacted by discretization of the filter. Hence, hereinafter a technique is presented to filter the image in constant time and independent of the scale to tackle the problem of computational complexity.

Once the CM-Gaussian Summation response is computed for all the scales, non-maximum suppression is performed on the CM-Gaussian summation responses to extract the scale-space extrema. The scale-space extrema are detected by comparison with 8-neighbors in the current scale, 9 neighbors in the preceding scale and 9 neighbors in the succeeding scale according to the equations hereinafter for j=1 . . . n and shown schematically in FIG. 21. The scale at which the pixel reaches its maximum or minimum is the scale of the feature region. For faster implementation, an efficient non-maximum suppression method can also be adopted.

$S_j(x) > \forall S_j(\bullet), S_j(x) > \forall S_{j-1}(\bullet)$ $S_j(x) > \forall S_{j+1}(\bullet)$ $S_j(x) < \forall S_j(\bullet), S_j(x) < \forall S_{j-1}(\bullet)$ $S_j(x) < \forall S_{j+1}(\bullet)$ where "x" indicates current pixel, "●" indicates the neighboring pixels as shown in FIG. 21 and S is the computed Summation response.

The CM-Gaussian Summation function responds to feature regions such as blobs, corners and edges. Hence, by simply thresholding the CM-Gaussian Summation response, a response to strong edges cannot be avoided. The edge regions are often not good feature locations because they are only well defined in one direction. We hence evaluate the second moment matrix as shown in following equation to identify the blobs and corners, rejecting edge regions.

$$R(x) = \sum_{x \in W} \begin{bmatrix} g_x^2(x) & g_x(x)g_y(x) \\ g_x(x)g_y(x) & g_y^2(x) \end{bmatrix} = \begin{bmatrix} G_{xx} & G_{xy} \\ G_{xy} & G_{yy} \end{bmatrix}$$

where $X=(x,y)$, $g_x=CMGX$, $g_y=CMGY$ and $W=\lambda$ the detected scale for the feature in wavelength units.

The ratio of the eigenvalues of R in the equation hereinabove is computed as:

$$e_{ratio} = \gamma_{max} / \gamma_{min}$$

where, $$\gamma_{min} = \frac{1}{2}\left(G_{xx} + G_{yy} - \sqrt{(G_{xx} - G_{yy})^2 + 4G_{xy}^2}\right)$$

$$\gamma_{max} = \frac{1}{2}\left(G_{xx} + G_{yy} + \sqrt{(G_{xx} - G_{yy})^2 + 4G_{xy}^2}\right)$$

This ratio should be chosen appropriately to detect the corner and blob regions. It is large for blob regions, small for corner regions and very small for edges as shown in FIG. 21. In this example an $e_{ratio}$ of 12 was chosen, which allows to detect both the blob and corner feature regions and reject edges. The candidate points for which $e_{ratio}$ is larger than this are rejected. Furthermore, shape information of the feature region can be extracted which can be used to identify the ellipticity of the region to differentiate between corner and blob regions. The shape information is characterized by eigenvectors and the ratio of the eigenvalues computed from the equation above. The shape information is used to adapt the descriptor to elliptic regions for affine invariance. The computational cost to evaluate the $e_{ratio}$ is also small because it needs only to be evaluated at extremal locations.

The feature points can be interpolated for sub-pixel accuracy of location and scale to detect location and scale more accurately for diffused corners and blobs. Orientation can also be assigned to the feature points.

To describe the feature region, the histogram of orientation of gradients around the feature region can be computed with the size of feature region corresponding to the detected scale of the feature ($\lambda$), resulting in a feature descriptor vector of dimension 128. To compute gradient orientation vectors, the $CMGX_j$ can be used as the gradient in x-direction and $CMGY_j$ as the gradient in y-direction, with j corresponding to the detected scale of the feature. The descriptors such as GLOH and DAISY can also be used by making use of CMGX and CMGY as the gradients. The gradients (CMGX and CMGY) computed by a method according to embodiments of the present invention can be more accurate than state of the art GSD based methods. Consequently, the feature descriptors are also more distinctive.

2D CM-Gaussian filters to filter an image in x and y directions are separable into two 1-D filters, as shown by following equations:

$$CMGX(x, y; \sigma, \lambda) = \underbrace{e^{\frac{-x^2}{2\sigma^2}}\cos\left(\frac{2\pi x}{\lambda}\right)}_{1D-CMG(x-dir.)}\underbrace{e^{\frac{-y^2}{2\sigma^2}}}_{y-dir.}$$

$$CMGY(x, y; \sigma, \lambda) = \underbrace{e^{\frac{-x^2}{2\sigma^2}}}_{x-dir.}\underbrace{e^{\frac{-y^2}{2\sigma^2}}\cos\left(\frac{2\pi y}{\lambda}\right)}_{1D-CMG(y-dir.)}$$

To filter the signal in the x-direction the 1D CM-Gaussian is performed in the x-direction followed by 1D Gaussian filtering in the y-direction. Similarly, the 2D CM-Gaussian filter to filter the signal in the y-direction is separable into two 1D filters.

The image may be filtered with a large σ to detect large features, hence a method to approximate the CM-Gaussian filter with the sum of exponentials for constant convolution time image filtering, irrespective of σ, is provided by embodiments according to the present invention, such that computation may be accelerated.

A direct implementation of the CM-Gaussian filter and the Gaussian filter using a finite impulse response (FIR) filter approach requires a filter length of a least 4σ. As a result, this would lead to a very high computational complexity for a large σ. Therefore, the sum of exponentials approximation approach is extended to approximate the CM-Gaussian filters. The design is performed on σ-independent space X with $X=x/\sigma$. This allows designing and implementing a single filter in X space that approximates the filter over all scales (σ). Consequently, all the scale-space filters of various scales (σ) bear similar properties such as having similar approximation error. The CM-Gaussian and Gaussian filters are approximated by the sum of exponentials given in $$h_\alpha(x; \sigma) = \sum_{i=0}^{q} \alpha_i e^{-\beta_i x/\sigma} = \sum_{i=0}^{q} \alpha_i e^{-\beta_i X}$$

such that in a mean square error sense it approximates the corresponding filter.

The q=4 order approximation is used for the CM-Gaussian filter and the q=3 order approximation for the Gaussian filter. After simplification, the 4th (q=4) order approximation would lead to the expressions below, also written in X operand:

$$h_a(x;\sigma) = (a_0 \cos(\omega_0 x/\sigma) + a_1 \sin(\omega_0 x/\sigma))e^{-b_0 x/\sigma} + (c_0 \cos(\omega_1 x/\sigma) + c_1 \sin(\omega_1 x/\sigma))e^{-b_1 x/\sigma}$$

$$h_a(X) = (a_0 \cos(\omega_0 X) + a_1 \sin(\omega_0 X))e^{-b_0 X} + (c_0 \cos(\omega_1 X) + c_1 \sin(\omega_1 X))e^{-b_1 X}$$

The 3rd (q=3) order approximation would lead to the following expressions also written in X operand:

$$h_a(x;\sigma) = a_0 e^{-b_0 x/\sigma} + (c_0 \cos(\omega_1 x/\sigma) + c_1 \sin(\omega_1 x/\sigma))e^{-b_1 x/\sigma}$$

$$h_a(X) = a_0 e^{-b_0 X} + (c_0 \cos(\omega_1 X) + c_1 \sin(\omega_1 X))e^{-b_1 X}$$

Consequently, it is an optimization problem for variables ($a_0$, $b_0$, $b_1$ ...) in a mean square error sense such that the expressions above approximate respectively the 1D CM-Gaussian filter and 1D Gaussian filter. The design is performed in X space, so that the computed parameters approximate the corresponding function for any scale ($\sigma$) with the same error of approximation for all the scales ($\sigma$'s). The 1D CM-Gaussian filter is expressed as a single filter in X-space given in $$CMG(x; \sigma, \lambda) = e^{-\frac{1}{2}(\frac{x}{\sigma})^2} \cos\left(\frac{2\pi x A}{\sigma}\right)$$

$$CMG(X) = e^{-\frac{1}{2}(X)^2} \cos(2\pi A X)$$

and by using the relation between b, $\lambda$ and $\sigma$ presented hereinabove, which approximates the filter over all the scales $\sigma$.

The normalized mean square error given by $$\epsilon^2 = \sum_{X=0}^{10\sigma_{max}} \frac{(CMG(X) - h_a(X))^2}{CMG(X)^2}$$

can be solved to estimate the parameters of the sum of exponentials to approximate the 1D CM-Gaussian filter. For example, the coefficients for the 4th order approximation of the CM-Gaussian filter for bandwidth b=1.0 are given by $a_0 = 0.267$ $a_1 = 1.0305$ $\omega_0 = 4.4808$ $c_0 = 0.7264$ $c^1 = -1.1576$ $\omega_1 = 2.7935$ $b_0 = 1.3127$ $b_1 = 1.3827$ The result is obtained with $\epsilon^2 = 1.3243 \times 10^{-4}$. The coefficients can be easily computed for other b values. The coefficients for the 3rd order approximation of the Gaussian filter are given by $a_0 = 1.898$ $c_0 = 0.8929$ $c_1 = -1.021$ $\omega_1 1.475$ $b_0 1.556$ $b_1 = 1.512$ and obtained with $\epsilon = 6.4215 \times 10^{-6}$.

These coefficients approximate the CM-Gaussian for any scale ($\sigma$). FIG. 22 to FIG. 25 show the accuracy of the filter approximations for $\sigma = 2.0$ and $\sigma = 32.0$ for b=1.0. The approximated filters for the CM-Gaussian and the Gaussian filters closely follow the original filters for any scale.

Figure 26:
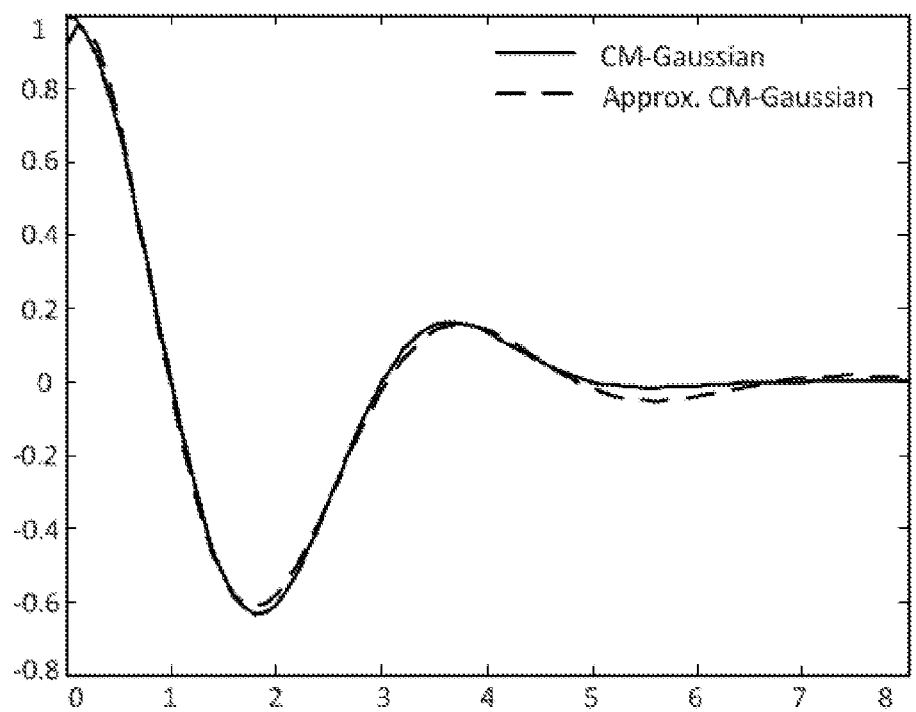
FIG. 26 shows the CM-Gaussian filter and its 3rd order approximation (q=3), illustrating aspects of embodiments of the present invention.
Figure 27:
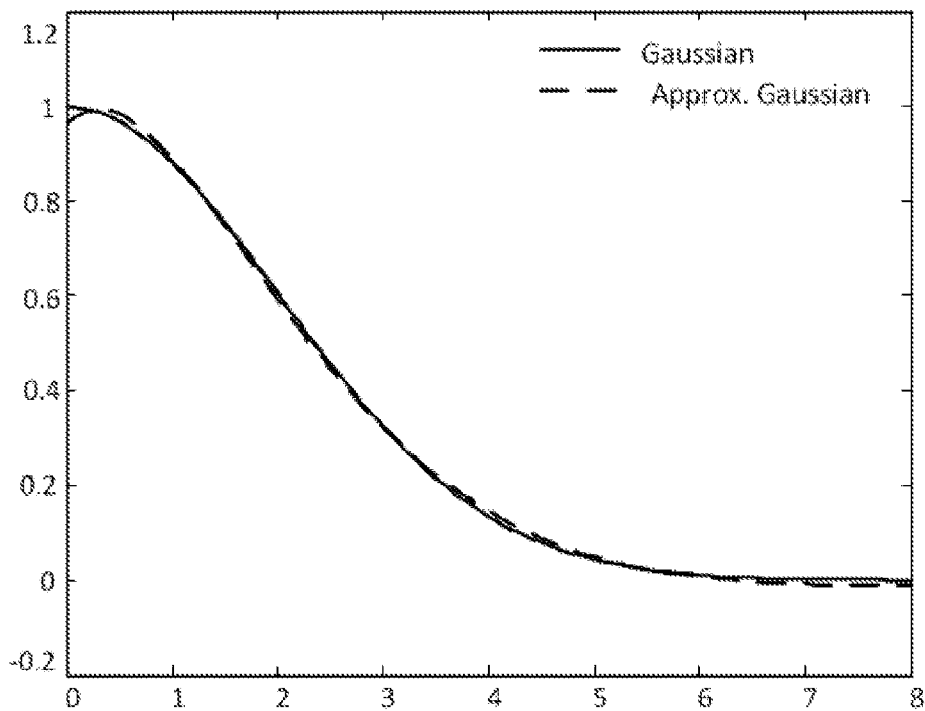
FIG. 27 shows the Gaussian filter and its 2nd order approximation (q=2), illustrating aspects of embodiments of the present invention.

The order-3 (q=2) approximation of the CM-Gaussian filter and the order-2 (q=2) approximation of the Gaussian filter are shown in FIG. 26 and FIG. 27 respectively. This approximation is not accurate. Therefore, low complexity image filtering can be implemented by sacrificing some quality. The order-4 (q=4) approximation for the CM-Gaussian filters and order-3 (q=3) approximation for the Gaussian filters are preferred for more accurate approximation.

Figure 28:
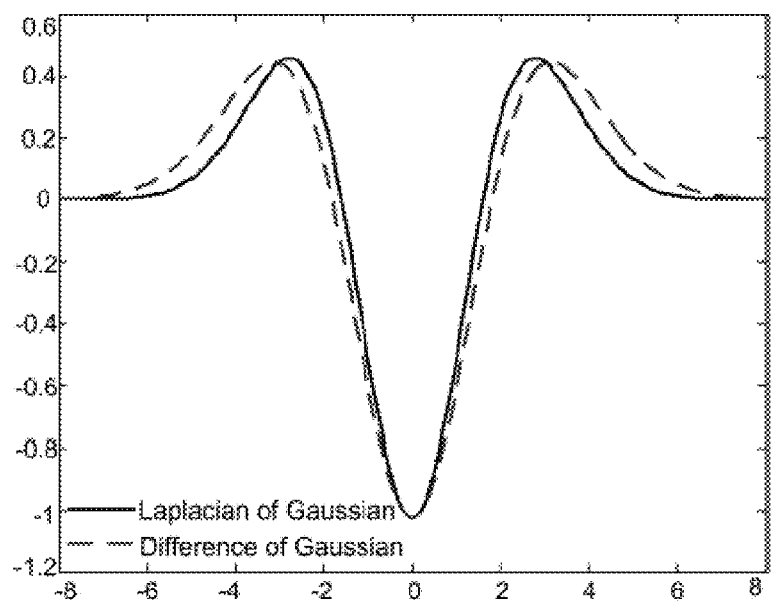
FIG. 28 shows the difference of Gaussian approximation of the Laplacian of Gaussian as known in the art.

For the comparison of the accuracy with SIFT, the difference-of-Gaussian approximation for the Laplacian-of-Gaussian is shown in FIG. 28.

The above steps of filter design are performed for the positive half of the filter. The complete filter impulse response is obtained by summing the causal and the non-causal part $h(x) = h_+(x) + h_-(x)$ as shown in $$h_+(x) = \begin{cases} h_a(x) & x \geq 0 \\ 0 & x < 0 \end{cases}$$

$$h_-(x) = \begin{cases} 0 & x \geq 0 \\ h_a(x) & x < 0 \end{cases}$$

The filter is implemented in parallel form as shown in)

$$H(z) = H_+(z^{-1}) + H_-(z^1)$$

The z-transform of the filter implemented in parallel form for the CM-Gaussian filter with m=4 or Gaussian filter with m=3 can be written in the form:

$$H(z) = \frac{n_{00}^+ + n_{11}^+ z^{-1} + \ldots + n_{(m-1)(m-1)}^+ z^{-(m-1)}}{1 + d_{11}^+ z^{-1} + \ldots + d_{mm}^+ z^{-m}} + \frac{n_{11}^- z^1 + n_{22}^- z^2 \ldots + n_{mm}^- z^m}{1 + d_{11}^- z^1 + d_{22}^- z^2 \ldots + d_{mm}^- z^m}$$

This filter is implemented by the differential equation $$y_k^+ = n_{00}^+ x_k + n_{11}^+ x_{k-1} + \ldots + n_{(m-1)(m-1)}^+ x_{k-(m-1)} - d_{11}^+ y_{k-1}^+ - d_{22}^+ y_{k-2}^+ - \ldots - d_{mm}^+ y_{k-m}^+$$

$K = 1 \ldots N$ $$y_k^- = n_{11}^- x_{k+1} + n_{22}^- x_{k+2} + \ldots + n_{mm}^- x_{k+m} - d_{11}^+ y_{k+1}^+ - d_{22}^+ y_{k+2}^+ - \ldots - d_{mm}^+ y_{k+m}^+$$

$K = N \ldots 1$ $y_k = y_k^+ + y_k^-$ in which the order m is m=4 for the CM-Gaussian filter and m=3 for the Gaussian filter.

The computation of y+ and y− are implemented in parallel. Consequently, this results in a highly parallel friendly implementation such can be implemented in GPUs as well.

The filter coefficients for m=4 for the CM-Gaussian filter are computed by using the expressions given in following table and the coefficient values given hereinabove for b=1.0. The expression for the filter coefficients in this table are obtained by computing the z-transform of the relevant equation hereinabove.

Expressions to compute the coefficients of the 4th order filter:

| Coefficients | Expressions |
| --- | --- |
| $n_{33}^+$ | $e^{-\frac{b_1}{\sigma} - \frac{2b_0}{\sigma}}\left(c_1 \sin\left(\frac{\omega_1}{\sigma}\right) - c_0 \cos\left(\frac{\omega_1}{\sigma}\right)\right) + e^{-\frac{b_0}{\sigma} - \frac{2b_1}{\sigma}}\left(a_1 \sin\left(\frac{\omega_0}{\sigma}\right) - a_0 \cos\left(\frac{\omega_0}{\sigma}\right)\right)$ |
| $n_{22}^+$ | $2e^{-\frac{b_0}{\sigma} - \frac{b_1}{\sigma}}\begin{pmatrix}(a_0 + c_0)\cos\left(\frac{\omega_0}{\sigma}\right) - \\ \cos\left(\frac{\omega_1}{\sigma}\right)a_1 \sin\left(\frac{\omega_0}{\sigma}\right) - \\ \cos\left(\frac{\omega_0}{\sigma}\right)c_1 \sin\left(\frac{\omega_1}{\sigma}\right)\end{pmatrix} + c_0 e^{-\frac{2b_0}{\sigma}} + a_0 e^{-\frac{2b_1}{\sigma}}$ |
| $n_{11}^+$ | $e^{-\frac{b_1}{\sigma}}\begin{pmatrix}c_1 \sin\left(\frac{\omega_1}{\sigma}\right) - \\ (c_0 + 2a_0)\cos\left(\frac{\omega_1}{\sigma}\right)\end{pmatrix} + e^{-\frac{b_0}{\sigma}}\begin{pmatrix}a_1 \sin\left(\frac{\omega_0}{\sigma}\right) - \\ (2c_0 + a_0)\cos\left(\frac{\omega_0}{\sigma}\right)\end{pmatrix}$ |
| $n_{00}^+$ | $a_0 + c_0$ |
| $d_{44}^+$ | $e^{-\frac{2b_0}{\sigma} - \frac{2b_1}{\sigma}}$ |

-continued

| Coefficients | Expressions |
| --- | --- |
| $d_{33}^+$ | $-2\cos\left(\dfrac{\omega_0}{\sigma}\right)e^{-\dfrac{b_0}{\sigma}-\dfrac{2b_1}{\sigma}} -$ $2\cos\left(\dfrac{\omega_1}{\sigma}\right)e^{-\dfrac{b_1}{\sigma}-\dfrac{2b_0}{\sigma}}$ |
| $d_{22}^+$ | $4\cos\left(\dfrac{\omega_1}{\sigma}\right)\cos\left(\dfrac{\omega_0}{\sigma}\right)e^{-\dfrac{b_0}{\sigma}-\dfrac{b_1}{\sigma}} +$ $e^{-\dfrac{2b_1}{\sigma}} + e^{-\dfrac{2b_0}{\sigma}}$ |
| $d_{11}^+$ | $-2e^{-\dfrac{b_1}{\sigma}}\cos\left(\dfrac{\omega_1}{\sigma}\right) - 2e^{-\dfrac{b_0}{\sigma}}\cos\left(\dfrac{\omega_0}{\sigma}\right)$ |

The filter coefficients for m=3 for a Gaussian filter are computed by using the expressions given in following table and the coefficient values given hereinabove. The expression for the filter coefficients in this table are obtained by computing the z-transform of the relevant equation hereinabove.

Expressions to compute the coefficients of the 3rd order filter:

| Coefficients | Expressions |
| --- | --- |
| $n_{22}^+1$ | $e^{\left(-\dfrac{b_0}{\sigma}-\dfrac{b_1}{\sigma}\right)}\left(c_0\cos\left(\dfrac{\omega_1}{\sigma}\right) - c_1\sin\left(\dfrac{\omega_1}{\sigma}\right)\right) +$ $a_0 e^{-\dfrac{2b_1}{\sigma}}$ |
| $n_{11}^+$ | $e^{-\dfrac{b_1}{\sigma}}\left(c_1\sin\left(\dfrac{\omega_1}{\sigma}\right)\right) -$ $(c_0 + 2a_0)\cos\left(\dfrac{\omega_1}{\sigma}\right) - c_0 e^{\dfrac{b_0}{\sigma}}$ |
| $n_{00}^+$ | $a_0 + c_0$ |
| $d_{33}^+$ | $e^{-\dfrac{b_0}{\sigma}-\dfrac{2b_1}{\sigma}}$ |
| $d_{22}^+$ | $2\cos\left(\dfrac{\omega_1}{\sigma}\right)e^{\left(-\dfrac{b_0}{\sigma}-\dfrac{b_1}{\sigma}\right)}$ |
| $d_{11}^+$ | $-2e^{-\dfrac{b_1}{\sigma}}\cos\left(\dfrac{\omega_1}{\sigma}\right) - e^{-\dfrac{b_0}{\sigma}}$ |

The filter coefficients for the non-causal part of the filter (with "−" sign) are computed by using the relation $d_{ii}^- = d_{ii}^+ \quad ii=1 \ldots m$ $n_{ii}^- = n_{ii}^+ - d_{ii}^+ n_{00}^+ \quad ii=1 \ldots m-1$ $n_{ii}^- = -d_{ii}^+ n_{00}^+ \quad ii=m$ as both the CM-Gaussian and Gaussian filters are symmetrical, and by using the coefficients computed in the previous tables.

The filter coefficients required in the equation for H(z) with expressions given in the tables here above are computed offline for each scale for a different bandwidth (b). The (n+2) scales were computed as described hereinabove. The image filtering is performed in constant time as the filter length is constant for any σ, as decided by the order of the approximation filter chosen, which is m=4 for the 1D CM-Gaussian filter and m=3 for the Gaussian filter. Only the filter coefficients change for the different σ. Therefore, image filtering is performed in constant convolution time irrespective of the filter scales (σ).

Scale normalization is necessary for automatic scale detection. Theory for an automatic scale detection has been developed for a Gaussian and its derivatives by scale normalization of the filter response with $\sigma_O$, where O is an order of a Gaussian derivative. We apply a different approach by scaling the filter coefficients for unity gain for each scale filter such that |H(z)|=1 for the pass-band frequency.

The scale norm in $H_{norm}(z) = \text{scale\_norm} \times (H_+(z^{-1}) + H_-(z^1))$ is computed to scale the filter coefficients in the numerator of the filter in the presented equation for H(z) for the CM-Gaussian filter and the Gaussian filter.

To normalize the Gaussian filter with m=3, the expression for H(z) is evaluated by the constraint |H(z)|=1 for unit gain at passband. Since, the Gaussian filter is tuned to zero frequency, scale norm is computed by substituting $z=ej\lambda|\omega=0=1$ in the expression for $H_{norm}(z)$ hereinabove.

To normalize the CM-Gaussian filter with m=4, the expression for H(z) is evaluated by the constraint |H(z)|=1 for unit gain at passband. The center frequency of the CM-Gaussian filter is $\omega=2\pi/\lambda$. Thus, by substituting $z=ej\omega=ej2\pi/\lambda$ in the expression for $H_{norm}(z)$ hereinabove the normalization factor scale_norm can be computed to scale the filter coefficients.

The computed filters to create the filter bank may be normalized with the above method. Then, automatic scale detection is possible by comparison as shown in FIG. 21.

The suitable value of the bandwidth (b) and the number of intervals per octave filtering of scale (K) were identified through experiment for the CM-Gaussian scale-invariant feature detection algorithm. Examples to compare the quality of the feature detection with state-of-art methods are also presented below. Repeatability was used as a measure of quality evaluation for feature location detection and scale detection.

With the repeatability it is evaluated whether the feature point detection algorithm detects the same physical location in the image under different viewing conditions and whether the detected scale in each view overlap over identical image surfaces around the feature regions in both the images. The repeatability (r) is defined as $$r = \frac{\text{number of features repeated}}{\text{number of useful features detected}} \cdot 100$$

To compute the repeatability, the feature points in each image are detected individually. The number of repeated features within the common region of the images is computed by projecting the points $x_b$ in view b to view a by using the ground truth homography (H). The repeated points are counted if they satisfy following two points shown graphically in FIG. 7.

The relative error on the point location after projection from view b to view a using groundtruth (H) is within $\epsilon_{loc}$ (i.e. 1.5) pixels as shown in $\epsilon_{loc} = \|x_a - Hx_b\| < 1.5$ The surface intersection error or overlap error (i.e. scale detection error) is computed by using $$\varepsilon_s = 1 - \frac{\mu_a \cup (A^T \mu_b A)}{\mu_a \cap (A^T \mu_b A)}$$

where $\mu_a$ and $\mu_b$ are second moment matrices that define the elliptic regions in view a and view b respectively. A is an affine transformation computed from the groundtruth homography between the views. Note that a smaller overlap error is needed to match the features with higher precision.

Figure 29:
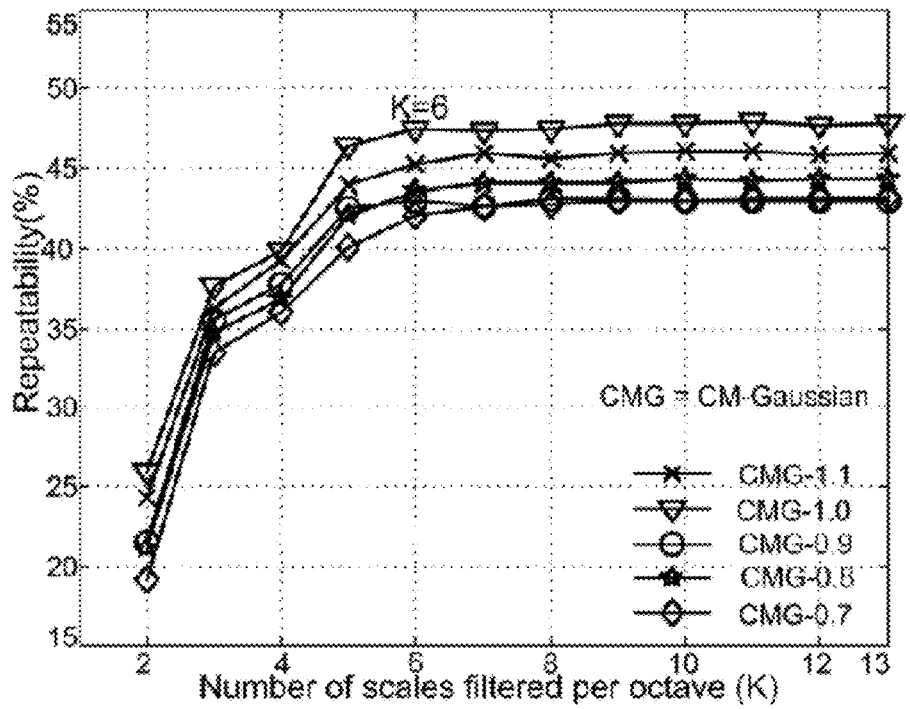
FIG. 29 shows repeatability for a different number of intervals per octave filtering of scales (K), in accordance with embodiments of the present invention.

The number of scales per octave sampling or frequency of sampling of scales (i.e. K) was introduced hereinabove to build an optimally matched filter bank system. FIG. 29 shows the repeatability for $\epsilon_s=10\%$ overlap error for different values of K and b. The repeatability is measured by averaging the results over a large number of images with different scale factors for various image resolutions. These images were captured with a digital camera by varying the zoom factor from 1.2 to 3.4, divided into 7 steps. The database consists of images with various resolutions: 640×480, 1600×1200, 2048×1536, 2592×1944 and 3072×2304. The large image resolutions result in detecting a large number of features in higher octaves than the lower resolution images. FIG. 29 shows that the highest repeatability is obtained at K=6. FIG. 29 also shows that on average, the bandwidth b=1.0 gives the best result. Hence, in all the examples presented here, K=6 was used.

The result in FIG. 29 confirms that according to Heisenberg's principle of uncertainty, narrowing the filter bandwidth adds error in the feature localization; hence the repeatability is not improved. Similarly, narrowing the spatial length of the filter results in stretching the bandwidth of the filter as in the case of the Gaussian derivatives; hence the error in detecting the scale is large. The size of the atom in scale and space with minimal spread is balanced as shown in FIG. 9. This is the case for b=1.0 and hence the highest repeatability is observed for b=1.0 in FIG. 29. From the result in FIG. 29, it is reasonable to select b=1.0 and K=6, which is also selected as a default settings in our algorithm.

The detector according to embodiments of the present invention was compared with the state-of-art detectors SIFT, SURF and MSER. MSER represents the direct-intensity category and SIFT and SURF are chosen from the multi-scale category requiring image filtering. The open source implementation of SIFT was used which produces similar results as the original SIFT, and the original implementation of SURF was used. The image upsampling by 2 versions of the SIFT and SURF were used for comparison, as it detects more stable feature points than the non-upsampled image versions. In contrast, for the method "SIFER" according to embodiments of the present invention the image is not upsampled. In general, MSER detects approximately a factor of 4 less number of feature points than SIFT, SURF and SIFER. The threshold is adjusted for SIFT, SURF and SIFER such that all these detectors detect the same number of feature points. Furthermore, N=12 scales were analyzed.

Figure 34:
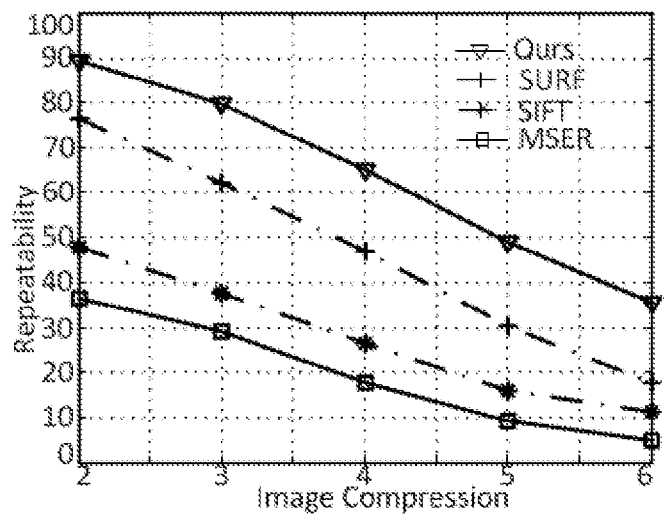
FIG. 34 shows a repeatability score comparison of a method according to embodiments of the present invention to state-of-the-art methods for jpeg compression artifacts.
Figure 35:
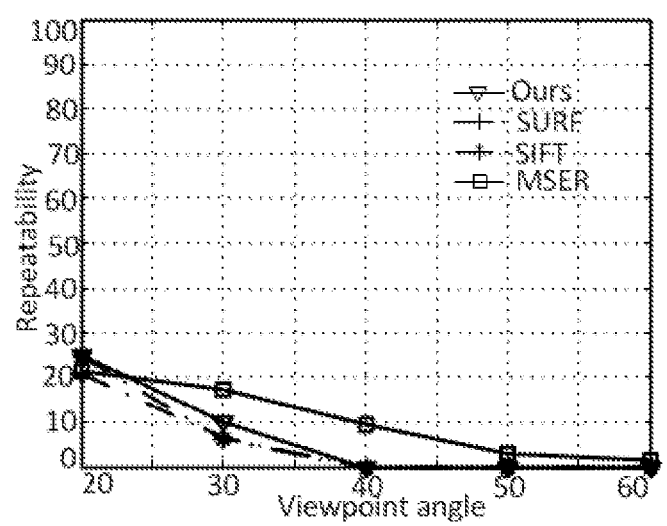
FIG. 35 shows a repeatability score comparison of a method according to embodiments of the present invention to state-of-the-art methods for rotation artifacts.

The repeatability to measure the quality of the feature point detection of SIFER was compared with SIFT, SURF and MSER on data-sets of state of the art and own data-sets. We used the blur, viewpoint angle variation, JPEG compression and illumination variation data-sets for the evaluation from a state of the art database and our own data-sets of images for scale variation and noise. The scale variation images were taken by zooming into the scene for image resolutions (640× 480, 1600×1200, 2048×1536, 2592×1944 and 3072×2304) by adjusting the optical zoom of the camera with the highest zoom factor of 3.4. FIGS. 30 to 35 show the repeatability evaluation on scale, blur, noise, JPEG compression, illumination variation and viewpoint angle variation. As shown in FIG. 30, "SIFER" outperforms the state-of-art detectors in all cases. For scale variation as large as 3.4, the repeatability comparison is shown in FIG. 30. The CM-Gaussian achieves highest repeatability, thus handles the scale change more robustly thanks to its high precision scale detection and feature localization. FIG. 31 shows the repeatability comparison for the various amounts of blur settings. The CM-Gaussian achieves the highest repeatability due to its high precision scale detection and feature localization as the blur variation also introduces a change in the scale of the features. FIGS. 32, 33 and 34 show the repeatability comparison for the noise, decreasing illumination variation and JPEG compression respectively where again CM-Gaussian achieves the highest repeatability. For image noise, MSER does not detect any feature points and hence results in zero repeatability shown in FIG. 32. Since it operates directly on image intensities, due to noise it fails to detect connected regions and hence fails to find feature points. FIG. 35 shows that all the methods achieve comparable repeatability for viewpoint angle rotation.

The method according to embodiments of the present invention is slightly slower than SURF and comparable in speed with the SIFT. For real-time performance, GPU implementations or FPGA implementations are recommended.

To benchmark the SIFER feature detector against state-of-art feature detection at application level, we used SIFT as an alternative feature detector in the image registration algorithm shown in FIG. 21. The feature point correspondences obtained by matching are refined by using the RANSAC scheme to estimate the homography transformation model between the images. LM optimization is applied to optimize the homography parameters by using the inliers subset from RANSAC. The second image is mapped to the coordinate system of the first image using homography for registration.

When applying SIFER-based and SIFT-based feature matching respectively between an image and a copy subjected to motion blur with a magnitude of 16 pixels, the number of matched features based on SIFER is significantly more than the number of matched features obtained using SIFT. In total, 323 features were matched using SIFER, consisting of 287 inliers and 36 outliers whereas 117 features are matched using SIFT, consisting of 59 inliers and 58 outliers. The experimental result in FIG. 31 also showed that SIFER finds a larger number of stable features. In this example, the features at smaller scales are blurred by motion blur and hence the features at smaller scales are lost in the motion blurred image. These features correspond to feature sizes in octaves $O(-1)$, $O(0)$ and partly in $O(1)$ as shown in FIG. 10. Consequently, the subsequent registration algorithm has to rely on the features detected in the larger scales, which are in octaves higher than $O(1)$ in both the original and motion blurred images. It was found that SIFT introduces errors while detecting the scale and location of the features and feature descriptors are less distinctive in higher octaves, due to its GSD filter having unbalanced behavior and due to its poorly matched filter bank system and/or scale-space unbalanced filter bank system. Many features are not matched correctly due to a larger scale identification error, resulting in a large image surface intersection error $\epsilon_s$ and less accurate feature descriptor. Additionally, the features detected using SIFT have a higher localization error ($\epsilon_{loc}$) than those detected using SIFER. The registration result indicated that SIFT failed to register the images correctly. The SIFT-based registration error was furthermore larger than with the SIFER-based method.

SIFER-based and SIFT-based feature matching were performed respectively between images captured by a spectral camera at wavelength 600 nm and 800 nm. The images captured by the spectral cameras are more noisy, blurry, variation in illumination, etc. than the RGB cameras.

The obtained images had different illumination and noise introduced by the spectral cameras. In this scenario, accurate identification of scale, location and distinctive feature descriptors are required to match the features with high correlation. The number of matched features based on SIFER is significantly more than the number of matched features obtained using SIFT. In total, 417 features are matched using SIFER, consisting of 349 inliers and 68 outliers whereas 95 features for SIFER based and SIFT-based are matched using SIFT, consisting of 59 inliers and 36 methods respectively, showing SIFT failed to register outliers. It was also seen in the experimental results in FIGS. 32 and 33 that SIFER finds more number of repeated features. Results showed SIFT failed to register the images correctly. The SIFT-based registration error is larger than for SIFER-based method.

For the image registration result for the images with a large amount of scale variation, in total, 183 feature points are matched successfully. There are 178 inliers and 5 outliers. The number of outliers is very small. The images were captured using a digital camera and by zooming into the scene. The method according to embodiments of the present invention is able to register these images correctly as shown by the accurate localization of feature points spatially, even though there is a large variation in the size of the underlying image structures.

Another embodiment of a registration algorithm according to the present invention is discussed hereinafter. A technique to accurately build a 3D hyperspectral image cube from a 2D imager overlaid with 128 spectral filters, providing time-multiplexed data through scanning is presented. The spectral curve of each pixel in the physical scene being the combination of its spectral information captured over different time stamps, its correctness is directly related to the alignment accuracy and scanning sensitivity. To overcome the accumulated alignment errors from scanning inaccuracies, noise, lens distortions, frequency-dependent scaling and blur, spectral band separations and the imager's spectral filter technology limitations, we have designed a new image alignment algorithm based on Random Sample Consensus model fitting. It estimates all mechanical and optical system model parameters from image feature matching over the spectral bands, further fine-tuned with Levenberg-Marquardt optimization, ensuring a high immunity against the spectral reflectance variations.

One of the biggest challenges for the image alignment algorithm is that of finding the correlation between the image features at different wavelengths, especially in the presence of wavelength dependent luminance variation, scale change, blur, noise, etc.

Feature point matching and system models tackle these error sources robustly, precisely detecting the feature points at their physically correct spatial location, without any drift between spectral bands. This strengthens the feature matching to the high level of accuracy required in reliably aligning up to 128 spectral bands.

Figure 36:
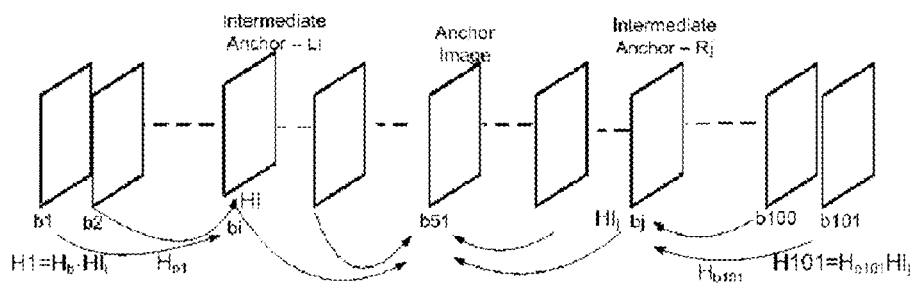
FIG. 36 illustrates an image registration algorithm according to embodiments of the present invention.

To align images, the middle wavelength image is selected at 700 nm as an anchor image for any hyperspectral image captured in the range of 400 nm-1000 nm. This anchor image corresponds to image b51 in FIG. 36. Images at extreme wavelengths such as 400 nm or 1000 nm might have a limited number of features matching with the anchor image, in which case the algorithm can automatically select a more appropriate intermediate wavelength image as an intermediate anchor image, i.e. bi (i=1 ... n, n<50) below 700 nm or $b_j$ (j=50+1 ... n, n<50) above 700 nm in the example of FIG. 36. The final transformation matrix for the images registered with the intermediate anchor image will be the transformation matrix corresponding to the intermediate image, multiplied with all intermediate anchor image transformation matrices. For instance, for image b1 in FIG. 36, one obtains: $H_1 = H_{b1} * HI_i$. Consistency between the sequence of anchor images and their surrounding wavelength images is pursued, allowing a very accurate estimation of the model parameters with minimal fitting error.

Consequently, the average alignment error is reduced to 0.5 pixels, much below the alignment error obtained with other techniques. The image feature correspondences between the images in different bands of the same object are hence consistently produced, resulting in an hardware-software co-designed hyperspectral imager system, conciliating high quality, correct spectral curve responses with low-cost.

The functionality of an exemplary registration algorithm according to embodiments of the present invention is explained in more detail below.

We call view "a" as a reference or anchor image and view "b" as other images in different spectral bands.

a. From feature point correspondences, a model is fitted to estimate the transformation between the image views. A robust model fitting algorithm such as RANdom SAmple Consensus (RANSAC) can be used, which enables finding automatically good matches and bad matches from the feature correspondences. Only good matches are used to estimate the model parameters.

b. Models for physical phenomenon can be used such as scaling (from e.g. chromatic aberration), translation (e.g. scanning error), rotation (e.g. scanning error, different looking angle in the wedge (the spectral color filters) (3D rotation)), perspective transformation, Lens Distortion (e.g. spherical lens (Barrel distortion)) between views.

$$\begin{bmatrix} x \\ y \\ 1 \end{bmatrix}_{corrected} = \begin{bmatrix} h1 & h2 & h3 \\ h4 & h5 & h6 \\ h7 & h8 & h9 \end{bmatrix} \begin{bmatrix} x \\ y \\ 1 \end{bmatrix}_{measured} + (1 + k_1 r^2 + k_2 r^4) \begin{bmatrix} x \\ y \\ 1 \end{bmatrix}_{measured}$$

Figure 37:
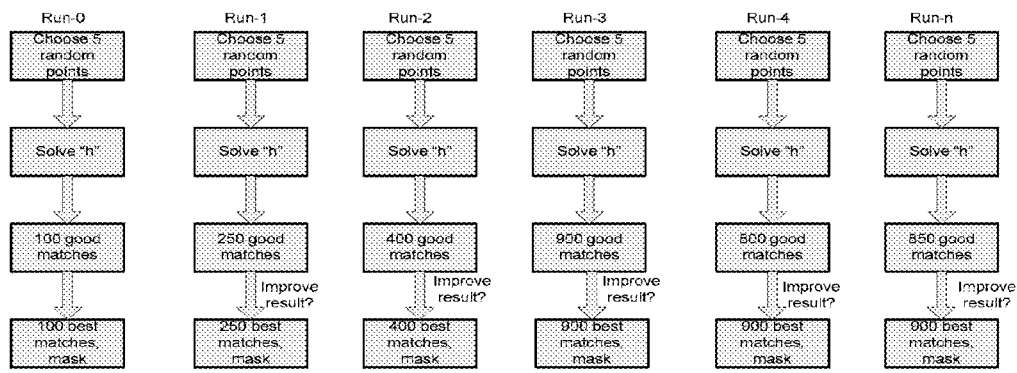
FIG. 37 illustrates the RANSAC algorithm according to embodiments of the present invention.

The first one ("h") models for scaling, rotation, translation and perspective transformation. The second one ("k") models for Lens distortion (Barrel distortion).

c. The algorithm to fit the model consists of two parts. The first part solves for model "h" parameter and the second part solves for model "k" parameter. Both "h" and "k" cannot be solved together, hence they are separated. In contrast, state-of-art approaches try to combine these parameters and hence they are limited to solve only one parameter "k1", without "k2". To solve two parameters "k1" and "k2", the state-of-art approach becomes mathematically intractable and hence they are limited to only "k1". In addition, they do not produce consistent results. The here presented approach can solve "k1" and "k2" robustly, with consistent results.

c. Part-I: This part runs a few iterations to estimate "h" parameter to find the highest number of good matches that fits the model. The execution phase of the algorithm is shown in FIG. 37. In each run, the algorithm chooses 5 random points out of the feature correspondences. Then, we solve for "h" using these 5 points. Then, using the estimated "h", we count the maximum number of good matches that remains within an error threshold, e.g. 1.5 pixels error in position. We will store the result, if the result is improved compared to the previous result. The "mask" is used to identify good matches and bad matches. The algorithm runs for a number of iterations, e.g. 1000. Once the algorithm terminates, it extracts the best estimated "h" and highest good matches.

Figure 38:
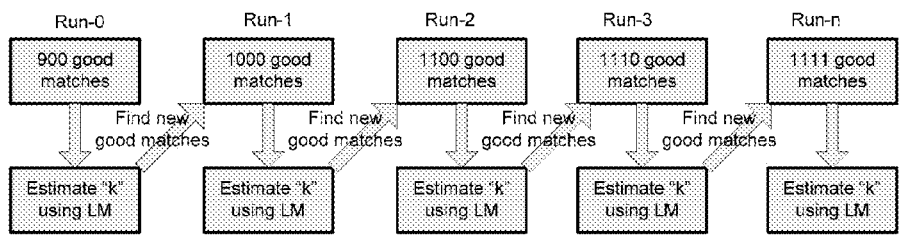
FIG. 38 shows part of method for estimating lens artifacts according to embodiments of the present invention.

From FIG. 37, 900 best feature matches are extracted. By using 900 feature correspondences and corresponding computed "h", the values of "h" can be further fine-tuned using all 900 points using an LM (Levenberg-Marquardt) optimization algorithm. Note that RANSAC uses only 5 points to estimate "h" and hence results will be improved drastically by the LM optimization.

c. Part-II: In this phase, the optimized value of "h" from "Part-I" is used and remains fixed. From estimated good matches (e.g. 900 matches from Part-I), estimate the parameter "k" using the LM optimization. Now, using "h" and the newly computed values of "k", we find new good matches from the feature correspondences. Again solve for "k" using new good matches and the LM optimization algorithm for finding even better matches from feature correspondences. This process is repeated until the algorithm settles down as shown in FIG. 38.

d. Using the "h" and "k" model parameters all the pixels in image "b" are transformed towards image "σ". The image "b" is then aligned with respect to image "σ".

e. The spectral curve of each pixel in the aligned images (i.e. "σ" and "b" correspond to any pair of spectral bands in the 3D hypercube) is correct since the same pixel in each spectral band image will correspond to the same physical location in the scene.

In conclusion, detection of blob and corner local scale-invariant features with the CM-Gaussian filter was disclosed hereinabove. A theoretical background and experimental results were presented, showing that the algorithm outperforms qualitatively existing feature detectors at comparable complexity. In particular, a threefold quality improvement over SIFT and SURF can be achieved, as evaluated by their repeatability over varying image transformations (scaling, rotation, etc.) and noise sources (speckle noise, JPEG artifacts, etc.) and without increase in execution time. This was supported by four different viewpoints. First, the CM-Gaussian scale-space filter is optimally balanced in time and frequency over all scales in the scale-space framework, perfectly matching the requirements for feature detection. Second, the CM-Gaussian filter was designed for scale-space filtering with a perfectly controllable bandwidth and center frequency over all scales. These filters were implemented as a single digital filter in σ-independent space X (designed with X=x/σ), without any image re-sampling. Third, in contrast to the popular solutions using Gaussian derivative filters having unbalanced time-frequency atoms resulting in a poorly matched filter bank, dense sampling was achieved over all scales with an optimally matched filter-bank, drastically reducing the scale detection error for better feature localization accuracy. Finally, low-cost DSP implementation is enabled through four aspects: (i) the CM-Gaussian filter is a real filter, not imposing any complex value calculations as the classical Gabor filter, (ii) our method does not require any image up-sampling, (iii) the digital implementation approximation with the sum of exponentials remains—even with iterative Infinite Impulse Response filters-stable with the filter order, and (iv) this filtering is implemented as a fixed, constant-time convolution over all scales (σ).

Here below, an alternative to the exemplary "SIFER" method described here above will be presented. This alternative scale-invariant image feature detection algorithm "D-SIFER" according to embodiments of the present invention uses a scale-space optimal 10th order Gaussian derivative (GDO-10) filter, which reaches the minimal Heisenberg's uncertainty in scale and space simultaneously. The D-SIFER algorithm using this filter can lead to a good quality of image feature detection, with a factor of three quality improvement over state-of-the-art SIFT and SURF methods that use the second order Gaussian derivative filters. To reach low computational complexity, a technique approximating the GDO-10 filters with a fixed-length implementation which is independent of the scale can be used. The final approximation error remains far below the noise margin, providing constant time, low-cost, but nevertheless high-quality feature detection and registration capabilities. D-SIFER was validated on a real-life hyperspectral image registration application, precisely aligning up to hundreds of successive narrow-band color images, despite their strong artifacts (blurring, low-light noise, . . . ) typically occurring in such delicate optical system setups.

It will be shown that scale-space optimality and minima feature localization error are not reached, unless higher order Gaussian derivative filters (e.g. the 10-th order) are used. The proposed D-SIFER algorithm (Derivative-based Scale Invariant Image Features with Error Resilience) is more invariant to image artifacts such as static and motion blur, noise, variation in luminance, compression etc. than the successful state-of-art solutions SIFT and SURF, allowing a larger scope of applications requiring robust registration. In particular, hyperspectral imaging used for material characterization and hyper-reality photography is a technique that captures up to hundreds of slightly varying color tones in separate narrow bands/channels, which have to be stacked with precise registration into one single, multi-colored image hypercube.

The hypercube is a three dimensional dataset whereas the sensors are two dimensional, thus they combine the scanned 2D slice of spatio-spectral data to create a hypercube, with the constraint that the scene remains unchanged. Therefore, the hyperspectral sensors scan a horizontal 2D slice of spatial data for each spectral band sequentially, a wedge-shaped 2D slice of spatio-spectral data or a vertical 2D slice of spatio-spectral data.

However, the alignment accuracy, scanning sensitivity, narrowband/low-light noisiness, the violation of the constraint that the scene remains unchanged, frequency dependent scaling and blurring from lens, etc. result in misalignments of spectral bands in the hypercube. Consequently, the spectral curve of each pixel (one vertical extract) in the 3D hypercube that characterizes the material is not correct. In order to register these spectral images correctly, the strong invariance of the feature detection algorithm to these image artifacts is required, and D-SIFER has been precisely designed to tackle these challenges.

Figure 39:
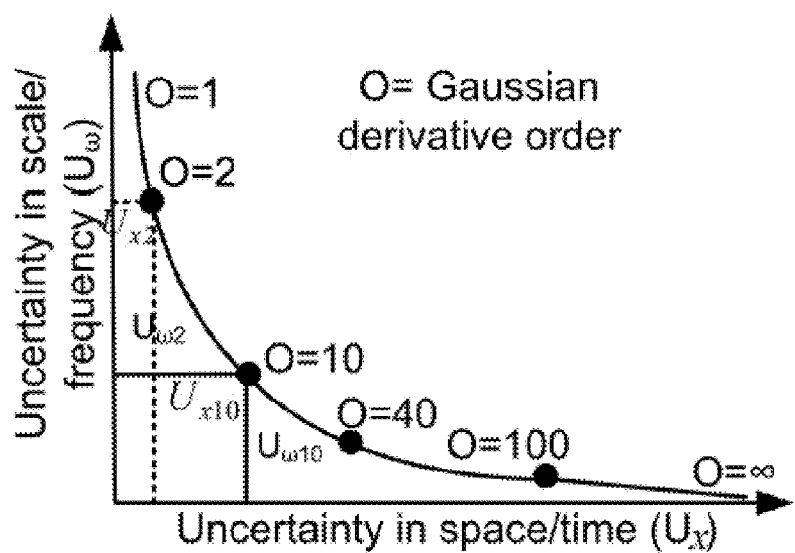
FIG. 39 shows Heisenberg's uncertainty in space and scale for various orders of Gaussian derivative filters according to embodiments of the present invention.

It will be shown that D-SIFER using a 10-th order Gaussian derivative filter (GDO-10), has minimal Heisenberg's uncertainty in both scale and space simultaneously, as suggested by O=10 in FIG. 39, providing a much higher precision in identifying the scale and localization of the features than the GDO-2 filter, typically used in SIFT and SURF. For the different orders of Gaussian derivative filters, their Heisenberg's uncertainty in scale U, and space $U_X$ is modified with the order O as shown in FIG. 39, whereas the area remains bounded with $U_x \cdot U_\omega \geq 0.5$. More precisely, the space and scale response of the various orders of the Gaussian derivative filter is given by $$\frac{\partial^O e^{-x^2/2\sigma^2}}{\partial x^O} \Leftrightarrow (i\omega)^O e^{-\omega^2 \sigma^2/2}$$

where σ appears in the denominator for the space axis, while being present in the nominator in the scale axis. This inverse relationship is advantageously exploited together with O for scale-space optimal filter design.

Moreover, experimental results suggest that the multi-scale based methods (e.g. Log-Gabor wavelet transform, complex wavelets) achieve high-quality results because these algorithms filter the image with a filter bank providing responses at different scales and hence they are more robust than the algorithms operating on image intensities directly (e.g. SUSAN, FAST, MSER, ORB, entropy based method) and/or based on single scale filtering (e.g. Harris, KLT, LOCOCO). Therefore D-SIFER is designed by following a multi-scale filter bank approach.

Two additional parameters may play an important role in designing an optimal, multi-scale feature detector: the match between the feature blob size and the filter length (expressed in a fraction/multiple of its sinusoidal response), as well as the number K of pertinent filter scales per octave, itself related to the scale-space uncertainties of the underlying filters. These two aspects can be elucidated with some intuitive examples. Any feature in an image can be seen as a blob whose shape in the horizontal and vertical directions resembles a sinusoidal pattern that is optimally detected with a filter having a Full Width Half Maximum (FWHM) of at least one wavelength ($\lambda$) of the feature. This wavelength reflects the scale at which the feature can be detected by the corresponding filter. The GDO-10 filter exactly satisfies this condition with its FWHM=$\lambda$, as shown in FIG. 39, while the GDO-2 filter covers only a 0.4 sinusoidal region, thus having a higher uncertainty in identifying the scale or wavelength.

Moreover, the scale uncertainty of such a filter will be projected as an additional uncertainty in space/localization when inserted in a filter bank. Indeed, the filter bank system creates a pattern matching system at various scales, where the image feature $F_i$ is detected by a fictitious filter $S_k$ in the filter bank having a radius $\sigma_k$ that best matches the size of the feature. In practice, such filter $S_k$ is surrounded by two discrete filters $S_n$ and $S_{n+1}$ of the filter bank, and the feature $F_i$ is said to be localized in space within the uncertainty range in space concentrated at the center of these filter blobs, while its actual position is at the center of the feature. This localization difference is exacerbated by the difference in size between $S_n$ and $S_{n+1}$ which is their relative vertical spacing, i.e. their uncertainty in scale. The scale uncertainty range and localization error in space will decrease with the scale-space optimal filter because the consecutive filters in the filter bank are optimally closer. The D-SIFER algorithm using the GDO-10 scale-space optimal filter hence creates an Optimally Matched and scale-space balanced Filter Bank system (OM-FB), with a much higher precision in identifying the scale and localization of the features than the GDO-2 filter, typically used in SIFT and SURF. In particular, D-SIFER consistently detects the same features over different color bands of a hyperspectral image with minimum localization errors, correctly registering the hypercube, even in the presence of image artifacts like blur, color-dependent scaling, etc. Experimental validation on a publicly available data set and in-house acquired hyperspectral images will be given further below.

The better GDO-10 filter scale selectivity yields a more elongated filter in space (without penalizing the localization precision), resulting in a higher computational complexity if no counter-measures are taken.

However a low-complexity image filtering implementation is provided by embodiments according to the present invention which is independent of the filter scale, with a guaranteed approximation error far below the noise margin.

An additional advantage of the higher elongation of the GDO-10 filter compared to the GDO-2 filter used in SIFT and SURF, is that the detection of small sized features can be implemented digitally with sufficient accuracy without the need of the image up-sampling, which is needed in SIFT/SURF that brings an additional complexity. To reduce their respective computational complexity, SIFT coarsely approximates the LoG by DoG, and SURF coarsely approximates the GDO-2 filters by box filters, further increasing the errors in their feature detection.

All aforementioned aspects combined together effectively improve the performance of the D-SIFER with the GDO-10 design compared to the successful state-of-the-art solutions SIFT and SURF at comparable complexity.

The exemplary D-SIFER algorithm according to embodiments of the present invention consists of a scale-space filtering filter bank, a scale-space response computation and some post-processing stages. The post-processing consists of a scale-space extrema detection, edge suppression, interpolation and orientation assignment and computation of the feature descriptor. The scale-space filtering filterbank, scale-space response computation, and edge suppression stages will be discussed in detail below. The scale-space filtering filter bank with number N of filters, filters the image in x- and y-directions and these responses are summed in the scale-space response computation stage shown with $S_j$. The scale-space filtering filterbank stage also refers to Gaussian derivative filters of order N (GDON) with various values of N given in the examples. For example, the D-SIFER-10 algorithm uses the 10th order of the Gaussian derivative filters with N=10. The various orders of the Gaussian derivative filters are approximated using the similar filter approximation technique described here, hence switching to a different order of Gaussian derivative filters does not require to change any implementation, but only requires to change the index in the table holding the filter coefficients for the different orders of the Gaussian derivative filters. This enables one to find the best O experimentally as well.

The scale-space extrema is detected by comparing each pixel's response value to its 8 neighbors in the current scale ($S_j$), 9 neighbors in the preceding scale ($S_{j-i}$) and 9 neighbors in the succeeding scale ($S_{j+i}$) for j=1 . . . n. The scale of the filter at which the pixel reaches its maximum or minimum is the scale of the feature region. In the interpolation and orientation assignment stage, the feature location and its scale are interpolated for a better accuracy and the orientation can also assigned with a method as known to the skilled person. In one implementation for the feature descriptor stage, the feature descriptor of dimension 128 is computed for each feature. Alternatively, the feature descriptors such as DAISY and FREAK can also be computed.

The Gaussian derivative filters of various orders are band-pass filters. The center frequency or wavelength of these filters is given by $$\omega = \frac{\sqrt{O}}{\sigma} \text{ or } \lambda = 2\pi \frac{\sigma}{\sqrt{O}},$$

where $\sigma$ is the width of a Gaussian window or the scale of the filter and $\lambda$ is the wavelength of the filter expressed in pixel units. This can be derived easily by taking the first derivative of the frequency response of the Gaussian derivative filter and by setting it to zero. Note that the terms frequency ($\omega$), wavelength ($\lambda$) or scale ($\sigma$) all express the size/scale of the feature but in different measurement units, thus may be used interchangeably to refer to the scale of the feature. The term $\sqrt{O}/2\pi$ is constant for given order of derivative, $\nu \propto \lambda$, e.g. $\nu=0.5\lambda$ for the GDO-10 filter.

Figure 40:
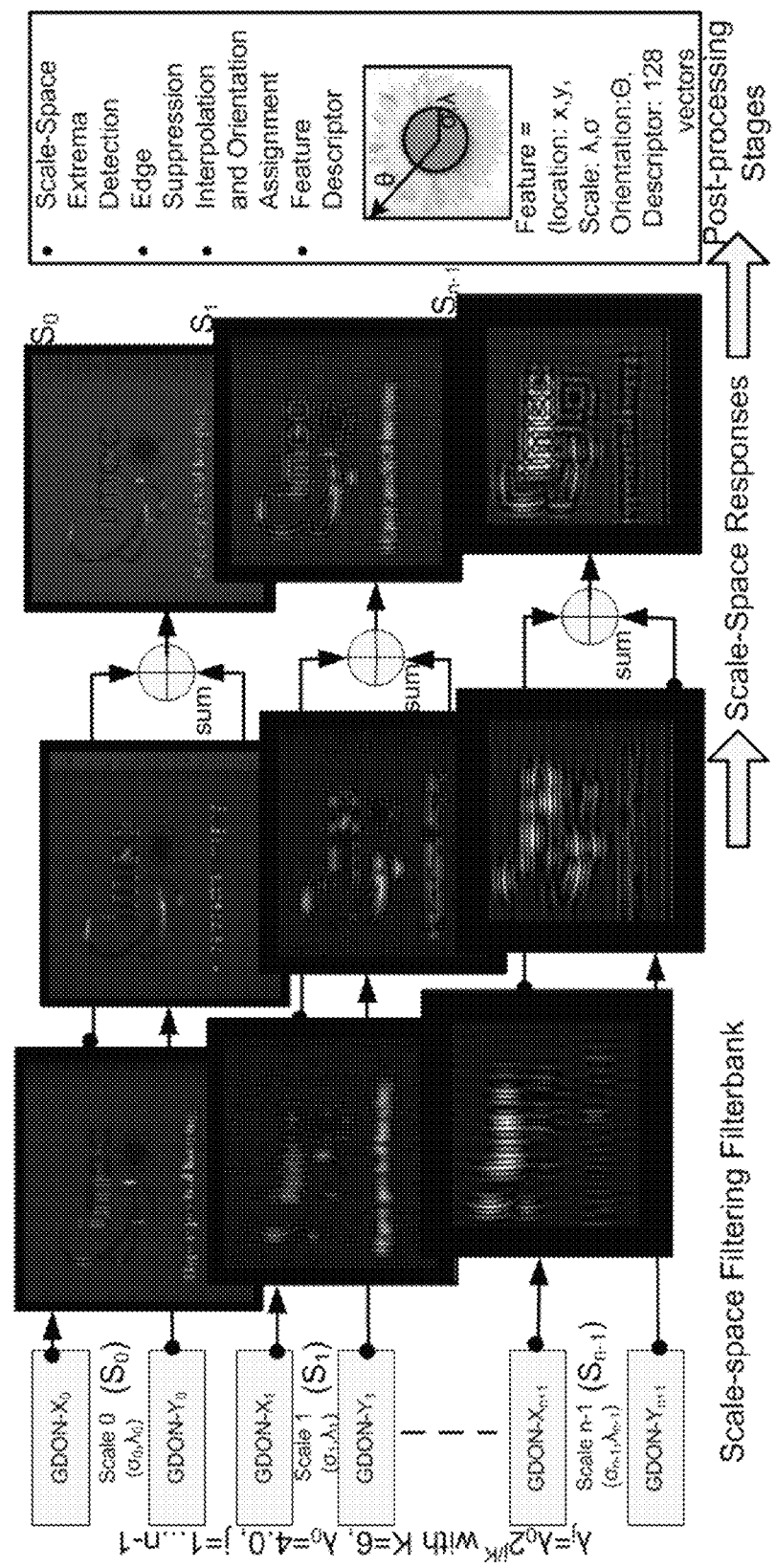
FIG. 40 illustrates different stages of the exemplary D-SIFER algorithm according to embodiments of the present invention.

The filterbank system is constructed by tuning the Gaussian derivative filters to various wavelengths in x- and y-directions as shown in FIG. 40. The consecutive wavelengths that are filtered by the filter bank are computed by the relations in $$\lambda_j = 2^{j/K} \times \lambda_0 \text{ for } j=1 \ldots n-1$$

for the number K scales per octave filtering. The best K can be empirically determined, as further discussed below.

$\lambda_0 = 3.0$ was used in the examples provided below. If the difference of the consecutive wavelengths calculated from the equation here above is smaller than 2, then $\lambda_j$ can be incremented by 2 to avoid sampling wavelengths at sub-pixel level. The corresponding Gaussian filter scales ($\lambda_0 \ldots \lambda_{n-1}$) can then be calculated using the relations between w, X and a shown hereinabove for the corresponding derivative order of the filter.

The band-pass filters in the filter bank filter the images as if they contain a sinusoidal variation of the image patterns at various wavelengths, such as corner and blob features. The filter responds with a large response, when the wavelength ($\lambda$) of the feature is matched with the wavelength of the filter. Consequently, the detected scale of the feature is equal to the scale of the filter. Hence, with the filter bank system, the scale-invariant feature detection algorithms build a matched system for various scales or wavelengths of the features. In fact, the Gaussian derivative filters of different orders are formed by modulating the Gaussian function with the Hermite polynomial approximating the sinusoidal function, forming a pattern matching filter of specific sinusoidal wavelength. The Gaussian derivative filters of orders 2 and 10 are given by:

$$GDO2(x) = \frac{(x^2 - \sigma^2)}{\sigma^2} e^{-(x^2/2\sigma^2)}$$

$$GDO10(x) = \frac{\begin{pmatrix} 945\sigma^{10} - 4725\sigma^8 x^2 + 3150\sigma^6 x^4 - \\ 630\sigma^4 x^6 + 45\sigma^2 x^8 - x^{10} \end{pmatrix}}{945\sigma^{10}} e^{-(x^2/2\sigma^2)}$$

Figure 41:
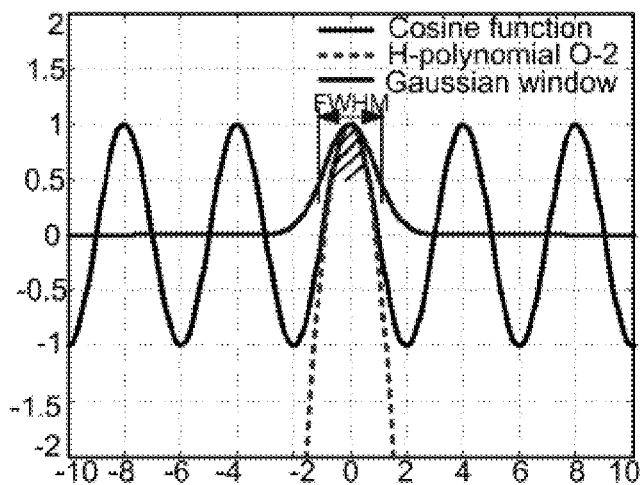
FIG. 41 shows the cosine function, Hermite polynomial and Gaussian derivative for the second derivative order as can be used in embodiments of the present invention.
Figure 42:
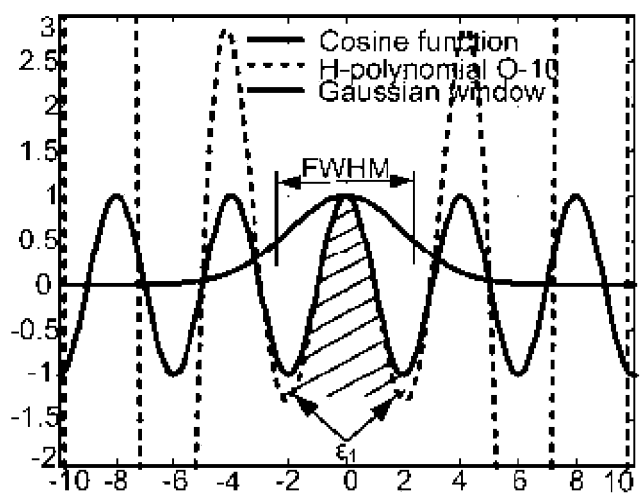
FIG. 42 shows the cosine function, Hermite polynomial and Gaussian derivative for the tenth derivative order as can be used in embodiments of the present invention.
Figure 43:
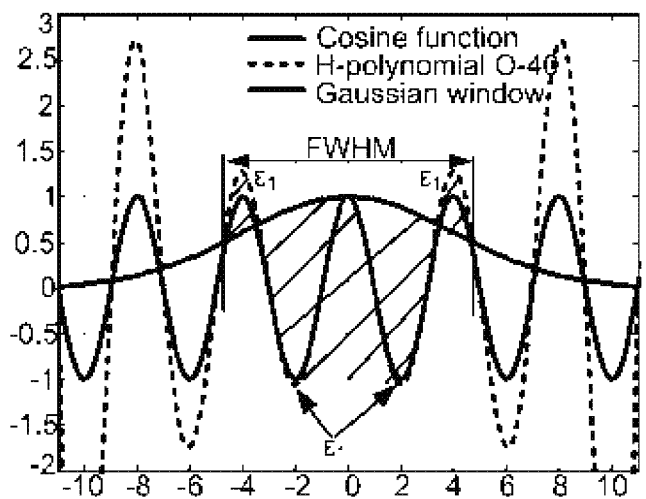
FIG. 43 shows the cosine function, Hermite polynomial and Gaussian derivative for the 40th derivative order as can be used in embodiments of the present invention.

Thus, the Gaussian derivative filters are Gaussian functions modulated with the Hermite polynomial, whose order is equal to the order of the derivative (O). The polynomials generated by even order derivatives and odd order derivatives will further be referred to as $P_{even}^O(x)$ and $P_{odd}^O$ respectively. Basically, the $P_{even}^O(x)$ and $P_{odd}^O(x)$ polynomials are trying to approximate the cosine and sine functions respectively within a Gaussian window as shown by $$e^{-x^2/2\sigma^2} p_{even}^O(x) + \epsilon_1 = e^{-x^2/2\sigma^2} \cos(\omega x)$$

$$e^{-x^2/2\sigma^2} p_{odd}^O(x) + \epsilon_2 = e^{-x^2/2\sigma^2} \sin(\omega x)$$

which is also shown graphically in FIGS. 41, 42 and 43 for various even orders of the Gaussian derivative filters. FIGS. 41, 42 and 43 plot the actual cosine function $\cos(2\pi x/\lambda)$, the $p_{even}^O(x)$ polynomial and the Gaussian window for the even Gaussian derivative orders (O) 2, 10 and 40 respectively. These graphs are plotted for filters of order 2 used by SIFT and SURF, 10 used by D-SIFER and 40 for detecting the signal for features having a wavelength ($\lambda$) of 4 pixels. The scale of the Gaussian window that is required to tune all the filters to detect this wavelength of the feature is computed by using $\lambda=4.0$ and the corresponding filter order O. The Gaussian scale ($\sigma$) required to detect this feature $\lambda=4.0$ increases with the increase in filter order O, as $\sigma \propto \sqrt{O}$, with higher uncertainty in space. The approximation error $\epsilon_1$ is also graphically shown in FIGS. 41, 42 and 43. A feature is well detected when it covers at least one wavelength of the cosine wave representing the filter. This cosine wave is approximated by the Hermite polynomials in FIGS. 41, 42 and 43, where the Gaussian window selects the spatial extent as a multiple (or fraction) of the wavelength $\lambda$, effectively creating the Full Width Half Maximum spatial bandwidth (FWHM) of the filter.

FIG. 42 shows with the hatched lines that the GDO-10 filter contains one wavelength $\lambda$ of the cosine wave, with a small error $\epsilon_1$ occurring at the end point of its FWHM. The FWHM thus covers a region of size is $2\sigma = 2\sqrt{O}/2\pi \approx \lambda$, outside which the deviation of the Hermite polynomial from the cosine function is disabled. In contrast, the Gaussian window in the GDO-2 filter selects only 0.4 k of the cosine wave, as shown with the hatched lines in FIG. 41, yielding a narrow uncertainty in space, but consequently also a large uncertainty in scale. At the other extreme, the GDO-40 filter shown in FIG. 43 covers within its FWHM a region $2.1\lambda$ of the cosine wave, which is actually more than what is needed for proper scale analysis. This high order filter has hence narrowed its uncertainty in scale, but at the expense of an elongated uncertainty in space.

Figure 44:
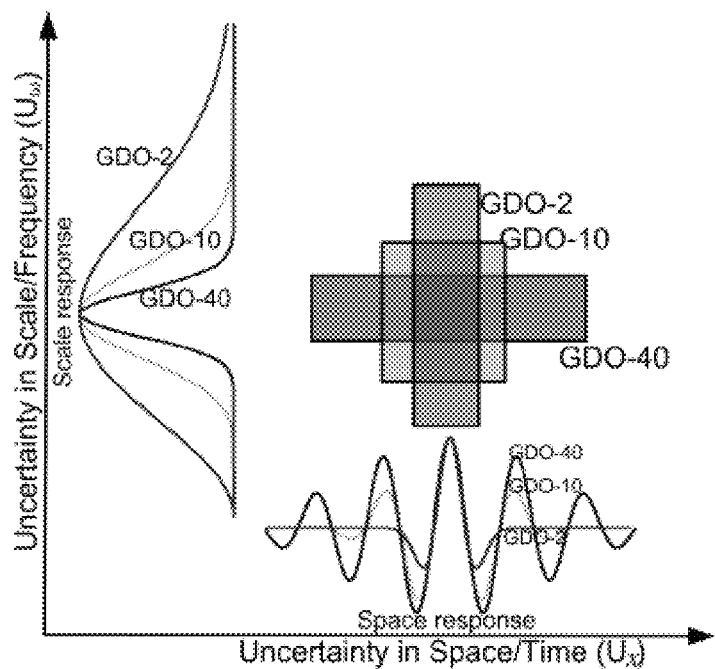
FIG. 44 shows the Heisenberg uncertainty comparison between GDO-2, GDO-10 and GDO-40 as can be used in embodiments of the present invention.

The scale-space uncertainties of these filters are summarized in FIG. 44, clearly showing that the GDO-10 filter achieves the best compromise in both scale and space uncertainty, while the GDO-2 and GDO-40 filters asymptotically reach extreme conditions respectively of high uncertainty in scale and high uncertainty in space. This property of the GDO-10 has two benefits for scale-invariant feature detection. The first one is that it allows creating a filter bank system with a characteristic of minimum scale and space errors of detected features and second is that the image up-sampling is not required to detect smaller feature sizes.

The GDO-10 filter being the scale-space optimal filter creates an Optimally Matched and scale-space balanced Filter-Bank system, thanks to its better scale selectivity shown in FIG. 44, which herein is also referred to as the OM-FB system of D-SIFER, filtering K=6 scales per octave, and validated experimentally. In contrast, the GDO-2 filter used by SIFT and SURF creates a Poorly Matched Filter-Bank system because of its poor scale selectivity shown in FIG. 44, which will be referred to as the PMFB system, filtering K=3 scales per octave.

Figure 45:
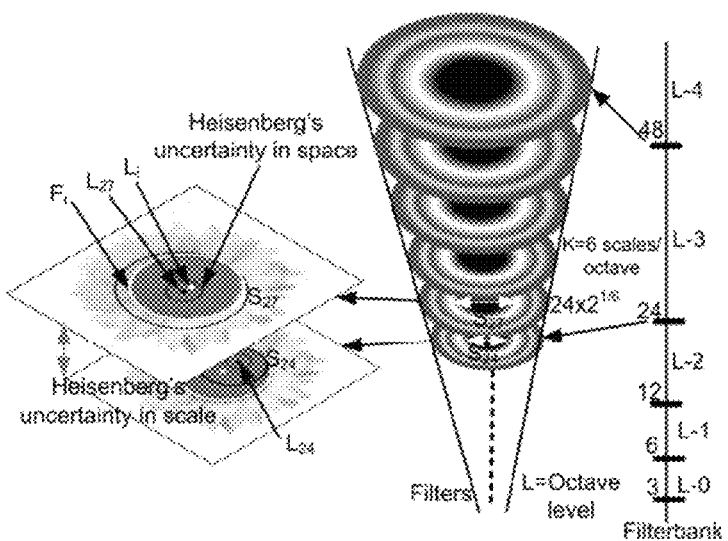
FIG. 45 shows feature localization in scale and space by D-SIFER according to embodiments of the present invention.

FIG. 45 shows the OM-FB filter bank of D-SIFER and its octaves. The filter scales at the start and end of each octave are expressed in wavelength or pixels units of the filter. In octave level 3, six filters are shown with a two dimensional pattern of the filter having a blob at the center, where the feature is detected when the size of the feature blob is matched with the size of the blob pattern of the filter.

Figure 46:
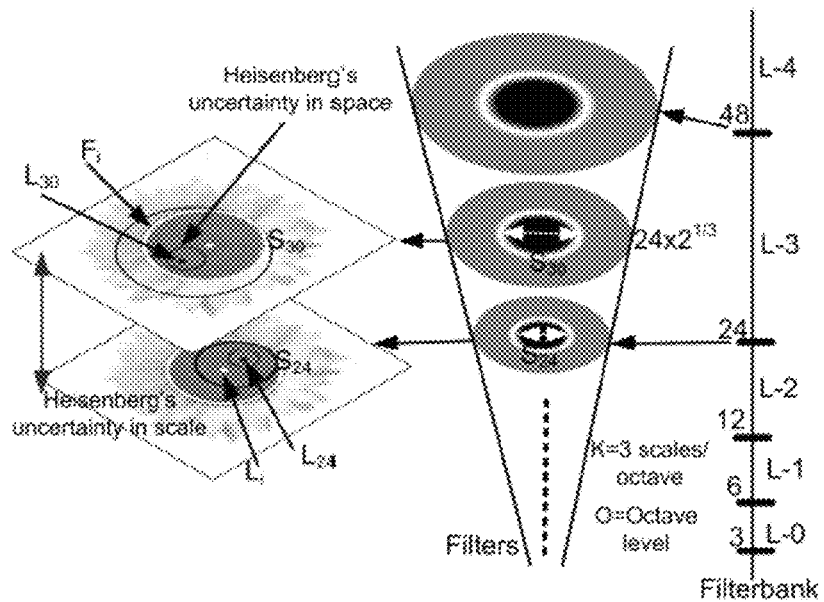
FIG. 46 shows feature localization in scale and space by the state-of-the-art method SIFT.

FIG. 46 shows a similar figure for the PM-FB system of SIFT. Since a higher number of scales filtering is possible in the OM-FB system, this system makes smaller error in identifying the scale of the feature and the center of these filter blobs are also quite close to the intrinsic location of the feature. Furthermore, both the errors can be corrected more robustly by interpolating the filter responses in scale and space. Thus, the features are localized with the characteristics of minimum scale-space localization errors by the OM-FB system.

Examples of feature localization in scale and space by the OM-FB and PM-FB system are shown in FIG. 45 and FIG. 46 respectively, while detecting the intrinsic scale of the blob feature $F_i=27$ as indicated with the white circle of diameter 27 pixels on the top of blob of the flower. $L_i$ is the intrinsic location of the feature $F_i$. For the OM-FB system shown in FIG. 45, the interval filters $S_{24}$ and $S_{27}$ are filter scales that are smaller and bigger than $F_i$ respectively. These interval filters are shown with the black circle of diameter that is equal to the diameter of the dark blob of the filter, which are 24 and 27 pixels respectively in wavelength units. The feature $F_i$ is detected by the $S_{27}$ filter because it is closer to this filter in scale or more precisely within the uncertainty range of this filter, resulting in the feature localization at $L_{27}$, localizing the feature in space where the feature of size $S_{27}$ should be localized. The feature location $L_{27}$ is closer to the intrinsic location $L_i$. The error in identifying the location $\epsilon_{loc}=(L_i-L_{27})$ and the scale $\epsilon_s=(S_{27}-F_i)$ are small.

In contrast, for the PM-FB system shown in FIG. 46, the feature scales $S_{24}$ and $S_{30}$ are smaller and bigger than $F_i$, but within the scale uncertainty range of $S_{24}$. Consequently, the feature $F_i=27$ is detected by the interval filter $S_{24}$ and localized in space at $L_{24}$ shown in FIG. 45, localizing the feature in space where the feature of size $S_{24}$ should be localized, far away from the intrinsic location $L_i$ of feature $F_i$. This implies that the small scale uncertainty can be very important, to determine the feature location in space. The error in feature localization ($\epsilon_{loc}=(L_i-L_{24})$) is large and the error in scale ($\epsilon_s=S_{24}-F_i$) identification is also large for the PM-FB system as compared to the OM-FB system. FIG. 44 and FIG. 45 also show the Heisenberg's uncertainty in space at the filter's true locations $L_{28}$ and $L_{24}$ with dotted circles. It is difficult to pin-point exactly the localization within this dotted circle. Accounting this, the actual errors in the scale and space are measured by using the ground-truth images of different artifacts settings and by the feature repeatability in the examples provided further below. Additionally, both systems try to reduce these errors by interpolating the filter response values, the correction is more accurate for the OM-FB system as the consecutive filters are quite close. In summary, the overall feature localization in space is near to the intrinsic location $L_i$ and the error in scale identification for the OM-FB system is small, because for each intrinsic scale of the feature there exists an optimally matching filter scale in the filter bank.

The size of the image structure that is detected by the GDO-2 filter of scale $\sigma=1.6$ is the feature of size $\lambda=7.0$ pixels. Thus, image upsampling by 2 is required to detect smaller features of sizes in the range 3-6 pixels, for GDO-2 based methods. Conversely, to detect features of size 3.0 pixels, for the GDO-2 filter we need a filter of size $\sigma=0.6$, which is basically a filter of half the pixel size, which is too small in the physical world to be implemented digitally with a sufficient accuracy for the scale-space image processing. On the contrary, for the GDO-10 filter the feature of size $\lambda=3.0$ pixels is detected for $\sigma=1.6$. Hence, the complete feature scale detection range is achieved without image upsampling for the D-SIFER algorithm. Consequently, for some derivative orders, if the computed a is smaller than 1.6 for $\lambda_0=3.0$ while creating the filterbank, the process may be reversed by computing the $\lambda_0$ for $\sigma=1.6$ and use this $\lambda_0$ to build the filter bank.

The scale-space response is computed by summing the response image obtained by filtering the image in x- and y directions by $S_j=GDX_j+GDY_j$, for $j=0,\ldots,(n-1)$, responding to features such as corners, blobs and edges.

The edge regions are only well defined in one direction and hence they are not considered as good feature locations. Hence the second moment matrix can be evaluated to reject edge regions.

$$R(x) = \sum_{x \in W} \begin{bmatrix} GDX_j^2(x) & GDX_j(x)GDY_j(x) \\ GDX_j(x)GDY_j(x) & GDY_j^2(x) \end{bmatrix}$$

where $X=(x, y)$, j is an index to the scale of the filter in the filter bank and $W=\lambda$ the detected scale of the feature. Those feature regions for which the ratio of the eigenvalues of R given by $\gamma_{max}/\gamma_{min} \geq 12$, are rejected. This allows one to detect both the blob and corner feature regions and reject edges.

For the GDO-10 filter, the size of the filter in space is elongated as compared to the GDO-2 filter shown in FIG. 44, a direct implementation using a finite impulse response (FIR) filter approach results in a very high computational complexity for a filter with a large $\sigma$. To enable low complexity computation, a method can be developed to design the approximation filter that allows one to perform constant convolution time image filtering, independently of $\sigma$. An approximation filter of fixed length that approximates the Gaussian derivative filter of any $\sigma$ and any order O can be designed.

The 2D Gaussian Derivative filters to filter the image in the x- and y-directions are separable into two 1D-kernels as shown by $$GDX(x, y; \sigma) = \underbrace{GDON(x)}_{1D-GD(x-dir.)} \underbrace{e^{\frac{-y^2}{2\sigma^2}}}_{y-dir.}$$

$$GDY(x, y; \sigma) = \underbrace{e^{\frac{-x^2}{2\sigma^2}}}_{x-dir.} \underbrace{GDON(y)}_{1D-GD(y-dir.)}$$

The GDON filters were defined hereinabove, with N corresponding to the order of the derivative.

The GDON filters can be approximated by integrating the scale normalization method discussed hereinabove for the automatic scale detection. The approximation filter design is performed on a-independent space X with $X=x/\sigma$. This allows designing and implementing a single filter in X space that approximates the filter over all scales, thus all the filters have the same approximation error. The 4th and 3rd orders of the approximation filter were used to approximate the GDON filter and the Gaussian filter. The 4th order approximation filter is given by $$h_a(x;\sigma)=(a_0 \cos(\omega_0 x/\sigma)+a_1 \sin(\omega_0 x/\sigma))e^{-b0x/\sigma}+ (c_0 \cos(\omega_1 x/\sigma)+c_1 \sin(\omega_1 x/\sigma))e^{-b1x/\sigma}$$

Consequently, the filter design is an optimization problem for parameters ($a_0, a_1, b_0, b_1, c_0, c_1, \omega_0, \omega_1$) in a mean square error sense such that this equation approximates the 1D GDON filter. The normalized mean square error optimization function given by $$\epsilon^2 = \sum_{X=0}^{10\sigma_{max}} \frac{(GDON(X) - h_a(X))^2}{GDON(X)^2}$$

is solved to estimate these parameters.

The coefficients for the 4th order approximation filter to approximate the GDO filter of order O=10 are given by

| | | |
|---|---|---|
| $a_0 = 0.2636$ | $a_1 = -0.8512$ | $\omega_0 = -2.2594$ |
| $c_0 = -1.2054$ | $c_1 = -1.0476$ | $\omega_1 = 3.5137$ |
| $b_0 = 0.9220$ | $b_1 = 0.9612$ | | yielding an approximation error $\epsilon_2=1.0\times10^{-3}$. The coefficients can be easily computed for other orders O of Gaussian derivative filters as well.

The coefficients for the 3rd order approximation filter to approximate the Gaussian filter are given by

| | | |
|---|---|---|
| $a_0 = 1.898$ | $c_0 = 0.8929$ | $c_1 = -1.021$ |
| $\omega_1 = 1.475$ | $b_0 = 1.556$ | $b_1 = 1.512$ | yielding a mean square error $\epsilon_2=6.4215\times10^{-6}$.

FIG. 47 and FIG. 48 compare the accuracy of these approximation filters in approximating the 1D GDON filter for order 10 for the scales σ=2.0 and σ=32.0 respectively. The approximation filters closely follow the original filters for any scale.

The z-transform of the approximation filter is given by $$H(z) = \frac{n_{00}^+ + n_{11}^+ z^{-1} + \ldots + n_{(m-1)(m-1)}^+ z^{-(m-1)}}{1 + d_{11}^+ z^{-1} + \ldots + d_{mm}^+ z^{-m}} + \frac{n_{11}^- z^1 + n_{22}^- z^2 \ldots + n_{mm}^- z^m}{1 + d_{11}^- z^1 + d_{22}^- z^2 \ldots + d_{mm}^- z^m}$$

with m equal to 4 and 3 for the 1D GDON filter and the 1D Gaussian filter respectively. The coefficients of the causal and non-causal part of the filter are indicated with "+" and "−" respectively in this equation.

The filter is implemented by the differential equations:

$$y_k^+ = n_{00}^+ x_k + n_{11}^+ x_{k-1} + \ldots + n_{(m-1)(m-1)}^+ x_{k-(m-1)} - d_{11}^+ y_{k-1}^+ - d_{22}^+ y_{k-2}^+ - \ldots - d_{mm}^+ y_{k-m}^+$$

$$K = 1 \ldots N$$

$$y_k^- = n_{11}^- x_{k+1} + n_{22}^- x_{k+2} + \ldots + n_{mm}^- x_{k+m} - d_{11}^- y_{k+1}^- - d_{22}^- y_{k+2}^- - \ldots - d_{mm}^- y_{k+m}^-$$

$$K = N \ldots 1$$

$$y_k = y_k^+ + y_k^-$$

This implements the image filtering with the Gaussian derivative filter of any scale and any order.

Only the filter coefficients vary according to the scale of the filter and the order of Gaussian derivative filter. The filter coefficients are computed by using the expressions given in the tables below for the 1D GDON filter and 1D Gaussian filters respectively and by using the values obtained from the optimization.

Expressions for the coefficients for the 4th order approximation filter:

| Coefficients | Expressions |
| --- | --- |
| $n_{22}^+$ | $e^{\left(-\frac{b0}{\sigma} - \frac{b_1}{\sigma}\right)} \left(c_0 \cos\left(\frac{\omega_1}{\sigma}\right) - c_1 \sin\left(\frac{\omega_1}{\sigma}\right)\right) + a_0 e^{-\frac{2b_1}{\sigma}}$ |
| $n_{11}^+$ | $e^{-\frac{b_1}{\sigma}} \left( c_1 \sin\left(\frac{\omega_1}{\sigma}\right) - (c_0 + 2a_0) \cos\left(\frac{\omega_1}{\sigma}\right) \right) - c_0 e^{\frac{b_0}{\sigma}}$ |
| $n_{00}^+$ | $a_0 + c_0$ |
| $d_{33}^+$ | $e^{-\frac{b_0}{\sigma} - \frac{2b_1}{\sigma}}$ |
| $d_{22}^+$ | $2\cos\left(\frac{\omega_1}{\sigma}\right) e^{\left(-\frac{b0}{\sigma} - \frac{b_1}{\sigma}\right)}$ |
| $d_{11}^+$ | $-2e^{-\frac{b_1}{\sigma}} \cos\left(\frac{\omega_1}{\sigma}\right) - e^{-\frac{b0}{\sigma}}$ |

Expressions for the coefficients for the 3rd order approximation filter:

| Coefficients | Expressions |
| --- | --- |
| $n_{22}^+$ | $e^{\left(-\frac{b0}{\sigma} - \frac{b_1}{\sigma}\right)} \left(c_0 \cos\left(\frac{\omega_1}{\sigma}\right) - c_1 \sin\left(\frac{\omega_1}{\sigma}\right)\right) + a_0 e^{-\frac{2b_1}{\sigma}}$ |
| $n_{11}^+$ | $e^{-\frac{b_1}{\sigma}} \left( c_1 \sin\left(\frac{\omega_1}{\sigma}\right) - (c_0 + 2a_0) \cos\left(\frac{\omega_1}{\sigma}\right) \right) - c_0 e^{\frac{b_0}{\sigma}}$ |
| $n_{00}^+$ | $a_0 + c_0$ |
| $d_{33}^+$ | $e^{-\frac{b_0}{\sigma} - \frac{2b_1}{\sigma}}$ |
| $d_{22}^+$ | $2\cos\left(\frac{\omega_1}{\sigma}\right) e^{\left(-\frac{b0}{\sigma} - \frac{b_1}{\sigma}\right)}$ |
| $d_{11}^+$ | $-2e^{-\frac{b_1}{\sigma}} \cos\left(\frac{\omega_1}{\sigma}\right) - e^{-\frac{b0}{\sigma}}$ |

The filter coefficients for the non-causal part of the filter (with "−" sign) are computed by using the relation in following table, for even orders (symmetric) and odd orders (antisymmetric) respectively and by using the coefficients computed from the tables above for the corresponding filters.

Coefficients for the non-causal part of the filter:

| | Symmetric | Antisymmetric | |
| --- | --- | --- | --- |
| $d_{ii}^-$ | $d_{ii}^+$ | $-d_{ii}^+$ | ii = 1 ... m |
| $n_{ii}^-$ | $n_{ii}^+ - d_{ii}^+ n_{00}^+$ | $-(n_{ii}^+ - d_{ii}^+ n_{00}^+)$ | ii = 1 ... m − 1 |
| $n_{ii}^-$ | $-d_{ii}^+ n_{00}^+$ | $d_{ii}^+ n_{00}^+$ | ii = m |

The filter coefficients in the differential equations hereinabove may be computed offline for each scale for a different order of the Gaussian derivative filters. The image filtering is performed in constant time as the filter length is constant and independent of the filter σ. Only the filter coefficients vary for the different σ and the different orders of the Gaussian derivatives.

The filters computed above may be scale normalized to enable automatic scale detection by comparison of the responses ($S_j$) with neighbors in scale and space. To enable this, all the filters should the same gain value because the gain of the filters varies according to their scale. The scale normalization technique can be integrated in the filter design itself. The filter coefficients of each filter are scaled for unity gain |H(z)|=1 at its passband frequency or scale, so that all the filters reach 0 dB gain. Consequently, one can compare their responses to find the maximum in scale, and the scale where the filter reaches its maximum corresponds to the scale of the feature.

The scale norm in $$H_{norm}(z) = \text{scale\_norm} \times (H_+(z^{-1}) + H_-(z^1))$$

is computed to scale the filter coefficients in the numerator of the filter H(z) for the 1D GDON filter and the 1D Gaussian filter with the constraint |H(z)|=1 for unit gain in the passband.

The Gaussian filter is tuned to zero frequency, scale norm is computed by substituting $z = e^{j\omega}|_{\omega=0} = 1$ in the equation for $H_{nom}(z)$.

The center frequency of the Gaussian derivative filter is $w=\sqrt{O}/\sigma$. Thus, by substituting $z=e^{jw}=e^{j\sqrt{O}/\sigma}$, one can compute the normalization factor scale norm to scale the filter coefficients.

The D-SIFER algorithm was validated for the best order O and the ideal number K scales per octave filtering in the filter bank. Furthermore, examples are provided to compare the quality of the feature detection with state-of-the-art methods.

Repeatability is used to evaluate the scale-space localization characteristics of the algorithms. With the repeatability, one can evaluate whether the feature point detection algorithm detects the same physical location (i.e. localized correctly in space) in the image under different viewing conditions and whether the detected scale in each view overlaps over identical image surfaces around the feature regions (i.e. localized correctly in scale) in both images, using groundtruth transformation between the views. The repeatability (r) is computed by using $$r = \frac{\text{number of features repeated}}{\text{number of useful features detected}} \cdot 100$$

To compute the repeatability, the feature points in each image are detected individually and the number of repeated features within the common region of the images is computed by projecting the points $x_b$ in view b to view a by using the ground truth homography (H). The features are considered repeated if they are detected within $E_{loc}=|x_a-Hx_b v|<1.5$ pixels and when the scale overlap error $\epsilon_s < S_{err}$, where $S_{err}$ was less than 10% in these examples.

In this example, it is validated experimentally that the D-SIFER algorithm version of order 10 is optimum and the number of scales per octave sampling (i.e. K) are identified for building an optimally matched filter bank system. To measure the best O and K, the feature repeatability of the various versions of the D-SIFER algorithm are measured that give the best repeatability. The feature repeatability is measured by averaging the results over a large number of images with different scale factors for various image resolutions. These images were captured with a digital camera by varying the zoom factor from 1.2 to 3.4, divided into 7 steps for image resolutions: 640×480, 1600×1200, 2048×1536, 2592×1944 and 3072×2304. The groundtruth Homography transformation between the images in the sequence is known. With the images undergoing various amounts of scaling, the same features should be scaled accordingly and detected again in the corresponding scale of the filters, hence using such images with groundtruth data allows one to analyze the scale-space behavior of the different D-SIFER algorithm versions. If the detected features are also scaled with the same scale factor and correctly localized in space, these features are considered repeated if they are detected within a certain error threshold.

FIG. 49 shows the repeatability for $\epsilon_s=10\%$ scale error for different values of K and O. FIG. 49 shows that the highest repeatability is obtained for O=10 with K=6, which is in accordance with the theoretical considerations hereinabove that the 10th order is optimal. Hence, in the further examples provided herein, K=6 and O=10 are used.

The D-SIFER detector is compared with the state-of-the-art detectors SIFT and SURF. The open source implementation of SIFT was used, which produces similar results as the original SIFT and the original implementation of SURF was used, using the default setting of image upsampling by 2, as this setting detects more stable feature points. In contrast, for D-SIFER upsampling the image was not needed. The threshold is adjusted for SIFT, SURF and D-SIFER such that all these detectors detect the same number of feature points.

The repeatability results for the scale variation, blur, viewpoint angle variation, JPEG compression, noise and illumination variation are shown in FIG. 50 to FIG. 55 for $\epsilon_s=10\%$ overlap error. As shown in these figures, one can see that D-SIFER outperforms the SIFT and SURF detectors in all the cases. The repeatability comparison for variation in scale of the image is shown in FIG. 50. The D-SIFER achieves the highest repeatability, thus handles the scale changes more robustly, thanks to its high precision scale detection and feature localization. FIG. 51 shows the repeatability comparison for the various amounts of blur settings, showing the D-SIFER achieving the highest repeatability. FIGS. 52, 53 and 54 show the repeatability comparison for the noise, decreasing illumination variation and JPEG compression respectively, where again D-SIFER achieves the highest repeatability. FIG. 55 shows that all the methods achieve comparable repeatability for 3D viewpoint angle rotation.

The D-SIFER algorithm was used to register the images captured by a hyperspectral imager at various spectral wavelengths. In FIG. 50 to FIG. 55 was shown that D-SIFER has the capability to detect stable features even on images having a high amount of image artifacts. Consequently, D-SIFER still continues to generate enough feature matches to register the narrow-band hyperspectral color images, thus enabling correct operation of the registration application. The image registration algorithm consisted of: a feature matching, a model fitting using RANSAC with the feature correspondences generated by the feature matching and an optimization of the model parameters using Levenberg-Marquardt (LM) optimization and remapping of the pixels. The feature point correspondences obtained by matching were refined by using the RANSAC scheme to identify the good matches known as inliers and to estimate the Homography transformation model parameters between the images. LM optimization was applied to optimize the Homography parameters by using the inliers subset from RANSAC. The second image is then mapped to the coordinate system of the first image by using the computed Homography for registration.

In the description provided above, numerous specific details are set forth. However, it is understood that embodiments of the invention may be practiced without these specific details, embodiments of the present invention only being limited by the independent claims. In other instances, well-known methods, structures and techniques have not been shown in detail in order not to obscure an understanding of this description.

What is claimed is:

1. A method for detecting features in digital numeric data, the method comprising:
    obtaining, by a processing unit, digital numeric data comprising values corresponding to a plurality of sampling points over a domain space having at least one dimension;
    computing, by the processing unit, a plurality of scale-space data, each of the plurality of scale-space data comprising data over the domain space at a corresponding scale in the domain space, wherein the computing of the plurality of scale-space data comprises filtering the digital numeric data using a filter bank;
    determining, by the processing unit, a plurality of feature regions in the plurality of scale-space data, each feature region corresponding to a local extremum in scale and location of the scale-space data; and determining, by the processing unit, a feature region descriptor for each of the plurality of feature regions;

wherein the filter bank is a Cosine Modulated Gaussian filter bank in which a standard deviation parameter of the Gaussian equals $$\frac{1}{\pi}\sqrt{\frac{\ln(2)}{2}\frac{2^b+1}{2^b-1}}$$

multiplied by a cosine wavelength, in which b is in the range of 0.75 to 1.25, or the filter bank is an $N^{th}$-order Gaussian Derivative filter bank with N being in the range of 5 to 20.

2. The method according to claim 1, wherein the filter bank comprises a plurality of infinite impulse response filters, each infinite impulse response filter corresponding to a different scale parameter value for a common mathematical filter kernel having a controllable scale parameter, the common mathematical filter kernel being either:

$$e^{-\frac{x^2}{2\sigma^2}} \cdot \cos\left(\frac{2\pi x \cdot \hat{e}}{\lambda}\right),$$

in which $$\sigma = \frac{1}{\pi}\sqrt{\frac{\ln(2)}{2}\frac{2^b+1}{2^b-1}}\lambda$$

with b in the range of 0.75 to 1.25; or $$\frac{\partial^N}{\partial x^N} e^{-\frac{x^2}{2\sigma^2}},$$

in which N is in the range of 5 to 20.

3. The method according to claim 2, in which the filter bank is constructed by approximating the common mathematical filter kernel by a sum of exponentials.

4. The method according to claim 1, wherein computing the plurality of scale-space data further comprises filtering the digital numeric data along a plurality of directions in the domain space, and for each scale aggregating the filtered digital numeric data over the plurality of directions in the domain space.

5. The method according to claim 4, wherein the aggregating the filtered digital numeric data comprises summing corresponding data over the plurality of directions.

6. The method according to claim 1, wherein determining the feature region descriptor comprises computing a histogram of gradient orientations or sum of gradients.

7. The method according to claim 1, wherein the obtaining digital numeric data comprises providing an image.

8. The method according to claim 7, wherein the computing the plurality of scale-space data comprises:

creating a plurality of filtered images by filtering the image in one or a plurality of directions using the Cosine Modulated Gaussian filterbank or the $N^{th}$-order Gaussian Derivative filter bank to compute a Cosine Modulated Gaussian response or $N^{th}$-order Gaussian Derivative response for each direction; and computing a Cosine Modulated Gaussian Summation or $N^{th}$-order Gaussian Derivative Summation response for each filtered image representing a scale.

9. The method according to claim 8, wherein determining the feature regions comprises extracting of each Cosine Modulated Gaussian Summation or $N^{th}$-order Gaussian Derivative Summation response a maximal/minimal point corresponding to a scale and location of a feature region.

10. The method according to claim 7, further comprising:

performing edge suppression and shape detection on each of the feature regions;

performing interpolation to fine-tune determined location and scale; and assigning an orientation to each of the plurality of feature regions.

11. The method according to claim 1, wherein the digital numeric data comprises a plurality of images, and the method further comprising:

detecting scale-invariant image features of each of the plurality of images based on the determined feature region descriptors;

selecting an anchor image from the plurality of images;

detecting common image features between the plurality of images and the anchor image; and aligning the plurality of images based on the detected common image features.

12. The method according to claim 11, wherein aligning the plurality of images comprises performing a scaling, rotation and translation on the plurality of images.

13. The method according to claim 11, wherein selecting the anchor image from the plurality of images comprises selecting an image from the plurality of images comprising a largest number of image features.

14. The method according to claim 11, wherein selecting the anchor image from the plurality of images comprises selecting an image from the plurality of images featuring the least optical errors.

15. A device for detecting features in digital numeric data, the device comprising:

an image sensor for obtaining digital numeric data, the digital numeric data comprising values corresponding to a plurality of sampling points over a domain space having at least one dimension; and a processing unit adapted for:

computing a plurality of scale-space data, each of the plurality of scale-space data comprising data over the domain space at a corresponding scale in the domain space, in which the computing of the plurality of scale-space data comprises filtering the digital numeric data using a filter bank, determining a plurality of feature regions in the plurality of scale-space data, each feature region corresponding to a local extremum in scale and location of the scale-space data, and determining a feature region descriptor for each of the plurality of feature regions;

wherein the filter bank is a Cosine Modulated Gaussian filter bank in which the standard deviation parameter of the Gaussian equals $$\frac{1}{\pi}\sqrt{\frac{\ln(2)}{2}\frac{2^b+1}{2^b-1}}$$

multiplied by the cosine wavelength, in which b is in the range of 0.75 to 1.25, or the filter bank is an $N^{th}$-order Gaussian Derivative filter bank with N being in the range of 5 to 20.

16. A computer-readable medium having stored thereon a computer program product that, when executed by a programmable computer, causes the programmable computer to perform a method comprising:
- obtaining, by programmable computer, digital numeric data comprising values corresponding to a plurality of sampling points over a domain space having at least one dimension;
- computing, by programmable computer, a plurality of scale-space data, each of the plurality of scale-space data comprising data over the domain space at a corresponding scale in the domain space, wherein the computing of the plurality of scale-space data comprises filtering the digital numeric data using a filter bank;
- determining, by the programmable computer, a plurality of feature regions in the plurality of scale-space data, each feature region corresponding to a local extremum in scale and location of the scale-space data; and
- determining, by the programmable computer, a feature region descriptor for each of the plurality of feature regions;
- wherein the filter bank is a Cosine Modulated Gaussian filter bank in which a standard deviation parameter of the Gaussian equals $$\frac{1}{\pi}\sqrt{\frac{\ln(2)}{2}\frac{2^b+1}{2^b-1}}$$

multiplied by a cosine wavelength, in which b is in the range of 0.75 to 1.25, or the filter bank is an $N^{th}$-order Gaussian Derivative filter bank with N being in the range of 5 to 20.

* * * * *